United States Patent
Cavatassi et al.

(10) Patent No.: US 12,530,604 B2
(45) Date of Patent: Jan. 20, 2026

(54) METHODS AND SYSTEMS FOR SOURCE CODING USING A NEURAL NETWORK

(71) Applicants: Adam Christian Cavatassi, Mississauga (CA); Yiqun Ge, Kanata (CA); Harsh Aurora, Montreal (CA)

(72) Inventors: Adam Christian Cavatassi, Mississauga (CA); Yiqun Ge, Kanata (CA); Harsh Aurora, Montreal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 541 days.

(21) Appl. No.: 17/459,606

(22) Filed: Aug. 27, 2021

(65) Prior Publication Data

US 2023/0079744 A1 Mar. 16, 2023

(51) Int. Cl.
*G06N 7/01* (2023.01)
*G06N 3/02* (2006.01)

(52) U.S. Cl.
CPC .............. *G06N 7/01* (2023.01); *G06N 3/02* (2013.01)

(58) Field of Classification Search
CPC ........... G06N 7/01; G06N 3/02; G06N 3/048; G06N 3/0455; G06N 3/0464; G06N 3/047; G06N 3/0475; G06N 3/084; G06N 3/0442; H04B 7/02; H04L 1/0014; H04L 1/0042

See application file for complete search history.

(56) References Cited

U.S. PATENT DOCUMENTS

| | | | |
|---|---|---|---|
| 2020/0382929 A1 | 12/2020 | Ge et al. | |
| 2022/0224926 A1* | 7/2022 | Lu | G06N 3/082 |
| 2022/0375024 A1* | 11/2022 | Luo | G06N 3/08 |
| 2022/0383118 A1* | 12/2022 | Nair | G06N 3/0455 |
| 2023/0367996 A1* | 11/2023 | Ajay | G06N 3/092 |

FOREIGN PATENT DOCUMENTS

| | | |
|---|---|---|
| JP | 2020047010 A | 3/2020 |
| WO | 2020239126 A1 | 12/2020 |

OTHER PUBLICATIONS

Kingma, Diederik P. and Welling, Max, "Auto-Encoding Variational Bayes", arXiv e-prints, art. arXiv:1312.6114v10, May 1, 2014 (retrieved online at https://arxiv.org/pdf/1312.6114.pdf), 14 pages.

\* cited by examiner

*Primary Examiner* — Michael A Keller

(57) ABSTRACT

An apparatus for feature-based communications is provided that includes a probabilistic encoder and a transmitter. The probabilistic encoder is configured to encode source information into a set of probability distributions over a latent space. Each probability distribution represents one or more aspects of a subject of the source information. The transmitter is configured to transmit over a transmission channel, to a receiving electronic device, a set of transmission features representing the subject. Each transmission feature provides information about a respective one of the probability distributions in the latent space. The probabilistic encoder is configured to enforce constraints on distribution parameters of the probability distributions over the latent space based on a condition of the transmission channel. Enforcing constraints on the latent space in this manner enables the apparatus to transmit features that are at least as unreliable as the transmission channel.

25 Claims, 30 Drawing Sheets

METHODS AND SYSTEMS FOR SOURCE CODING USING A NEURAL NETWORK

TECHNICAL FIELD

The present disclosure relates to source coding for communications in a network.

BACKGROUND

In a typical modern radio communication system such as wide band code division multiple access (WCDMA), long-term evolution (LTE), 5th Generation (5G), Wi-Fi and so on, a number of electronic devices (EDs) (which may also be referred to as clients, terminals, user equipments (UEs), mobile stations, etc.) may be connected to or associated with a base station (BS) (which may also be referred to as a base transceiver station (BTS), Node-B, eNodeB, gNB, access point (AP), transmission point (TP), etc.) over-the-air. As the number and density of EDs increase, it becomes challenging to support good quality wireless communications using conventional wireless systems.

Machine-to-machine (M2M) communications may be one type of high density wireless communications. M2M communications is a technology that realizes a network for collecting information from devices (e.g., sensors, smart meters, Internet of Things (IoT) devices, and/or other low-end devices) that are typically massively and densely deployed, and for transmitting information captured by those devices to other applications in the network. M2M networks may be wired or wireless and may have a relatively large geographical distribution (e.g., across a country or across the world). M2M communications typically do not involve direct human intervention for information collection.

Developments for 5G New Radio (NR) systems include features to support massive machine type communications (mMTC) that connect large numbers (e.g., millions or billions) of IoT equipment by a wireless system. It is expected in the near future that the amount of M2M communications conducted over-the-air will bypass those of human-related communications.

In some examples, wireless communications may involve a human end user (e.g., a human owner of an ED) receiving information collected by one or more machine sensors. The machine sensors may be densely deployed and may generate a high amount of wireless traffic. The machine sensors may generate more information than the human user actually requires.

Accordingly, it would be desirable to provide a way to improve wireless communications, including communications from one ED to another ED.

SUMMARY

According to a broad aspect, the present disclosure provides an apparatus for feature-based communications. The apparatus includes a probabilistic encoder and a transmitter. The probabilistic encoder is configured to encode source information into a set of probability distributions over a latent space. Each probability distribution represents one or more aspects of a subject of the source information. The transmitter is configured to transmit over a transmission channel, to a receiving electronic device, a set of transmission features representing the subject. Each transmission feature provides information about a respective one of the probability distributions in the latent space. The probabilistic encoder is configured to enforce constraints on distribution parameters of the probability distributions over the latent space based on a condition of the transmission channel. Enforcing constraints on the latent space in this manner enables the apparatus to transmit features that are at least as unreliable as the transmission channel, and therefore can potentially be successfully received over the unreliable/hostile transmission channel.

In some embodiments, the latent space is a Gaussian distributed latent space and the probabilistic encoder is configured to enforce bounds on the means and variances of the probability distributions over the latent space. For example, in such embodiments the probabilistic encoder may be configured to enforce a minimum variance of the probability distributions over the latent space based on a variance value of a Gaussian distributed model of the transmission channel.

In some embodiments, the latent space is a Bernoulli distributed latent space and the probabilistic encoder is configured to enforce a maximum bit flip probability of the probability distributions over the latent space based on a bit flip probability of a Bernoulli distributed model of the transmission channel.

In some embodiments, the probabilistic encoder is implemented using an encoder deep neural network (DNN). In some such embodiments, the probabilistic encoder uses non-linear activation functions to enforce the constraints on the distribution parameters of the probability distributions over the latent space. For example, in such embodiments the latent space may be a Gaussian distributed latent space and the non-linear activation functions may enforce the following constraints on a mean value, $\mu$, and a variance value, $\sigma^2$, of each probability distribution in the latent space:

$$\mu \in [\mu_{min}, \mu_{max}],$$

$$\sigma^2 \in [\sigma_W^2, \infty],$$

wherein $\mu_{min}$ and $\mu_{max}$ are lower and upper bounds, respectively, on the mean value and $\sigma_W^2$, is a variance value of a Gaussian distributed model of the transmission channel. In such embodiments, the encoder DNN may be trained using a prior distribution and a Kullback-Leibler (KL) divergence loss term that are functions of the variance value, $\sigma_W^2$, of the Gaussian distributed model of the transmission channel between the apparatus and the receiving ED. In some embodiments, the non-linear activation functions may include a sigmoid activation function for generating the means of the probability distributions and a rectified linear unit (ReLU) activation function for generating the variances of the probability distributions.

In some embodiments, the probabilistic encoder is a first probabilistic encoder for encoding source information into a set of probability distributions over a first latent space to support a first task, and the apparatus further includes a second probabilistic encoder for encoding source information into a set of probability distributions over a second latent space to support a second task. Knowledge about the task may allow for a higher compression ration to be used for certain tasks, such as classification or detection tasks, as opposed to other tasks, such as reconstruction tasks. For example, the second task may be different from the first task, and dimensionality of the second latent space may be different from dimensionality of the first latent space. For example, the first task may be a reconstruction task and the second task may be a classification task or a detection task.

In some embodiments, the transmitter is configured to transmit a first set of transmission features to the receiving ED that each provides information about a respective one of the probability distributions in a first subset of less than all of the probability distributions in the latent space. In such embodiments, subsequent to transmitting the first set of transmission features, the transmitter may transmit a second set of transmission features to the receiving ED that each provides information about a respective one of the probability distributions in a second subset of the probability distributions in the latent space, the second subset being different than the first subset. For example, the second subset may be non-overlapping with the first subset.

In some embodiments, the transmitter is configured to successively transmit different sets of transmission features providing information about different subsets of the probability distributions in the latent space until either a confirmation message is received from the receiving ED or a predetermined number of transmissions have been made. In this way, the apparatus supports a practical HARQ mechanism allowing for incremental redundancy by incrementally transmitting needed latent information until a success condition is met.

In some embodiments, the transmitter is configured to transmit the transmission features providing information about respective ones of the probability distributions in the latent space without applying channel coding to the transmission features. In such embodiments, the probabilistic encoder is configured such that the features into which the raw/source information about the subject are encoded are compliant with the channel distribution. For example, in such embodiments the probabilistic encoder may be configured to enforce constraints on distribution parameters of the probability distributions over the latent space such that the transmission features each have an entropy that matches or exceeds an entropy of the transmission channel.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION

For illustrative purposes, specific example embodiments will now be explained in greater detail below in conjunction with the figures.

Example Communication Systems and Devices

Figure 1:
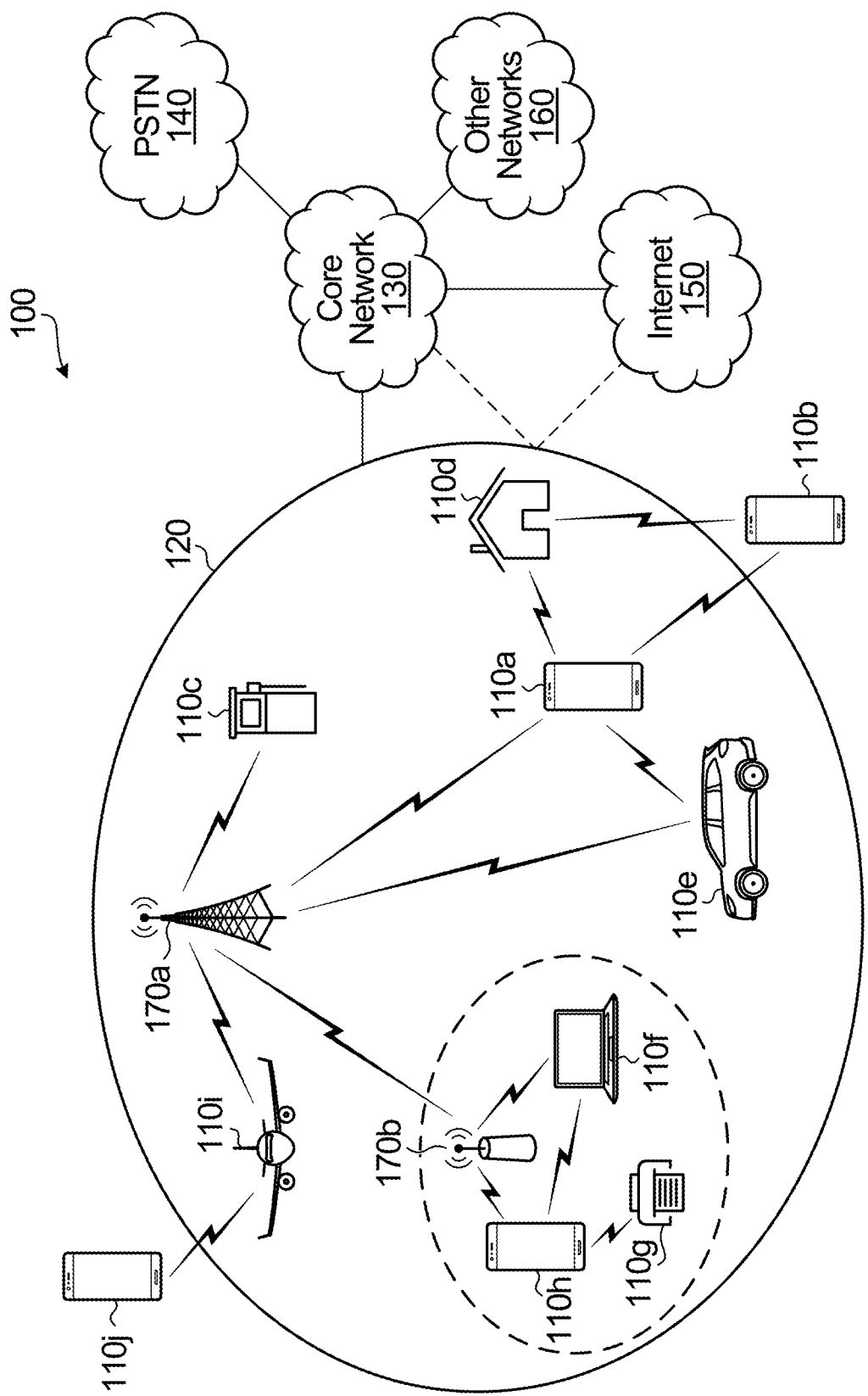
FIG. 1 is a simplified schematic illustration of a communication system, according to one example.

Referring to FIG. 1, as an illustrative example without limitation, a simplified schematic illustration of a communication system is provided. The communication system 100 comprises a radio access network 120. The radio access network 120 may be a next generation (e.g. sixth generation (6G) or later) radio access network, or a legacy (e.g. 5G, 4G, 3G or 2G) radio access network. One or more communication electric device (ED) 110a-120j (generically referred to as 110) may be interconnected to one another or connected to one or more network nodes (170a, 170b, generically referred to as 170) in the radio access network 120. A core network 130 may be a part of the communication system and may be dependent or independent of the radio access technology used in the communication system 100. Also, the communication system 100 comprises a public switched telephone network (PSTN) 140, the internet 150, and other networks 160.

Figure 2:
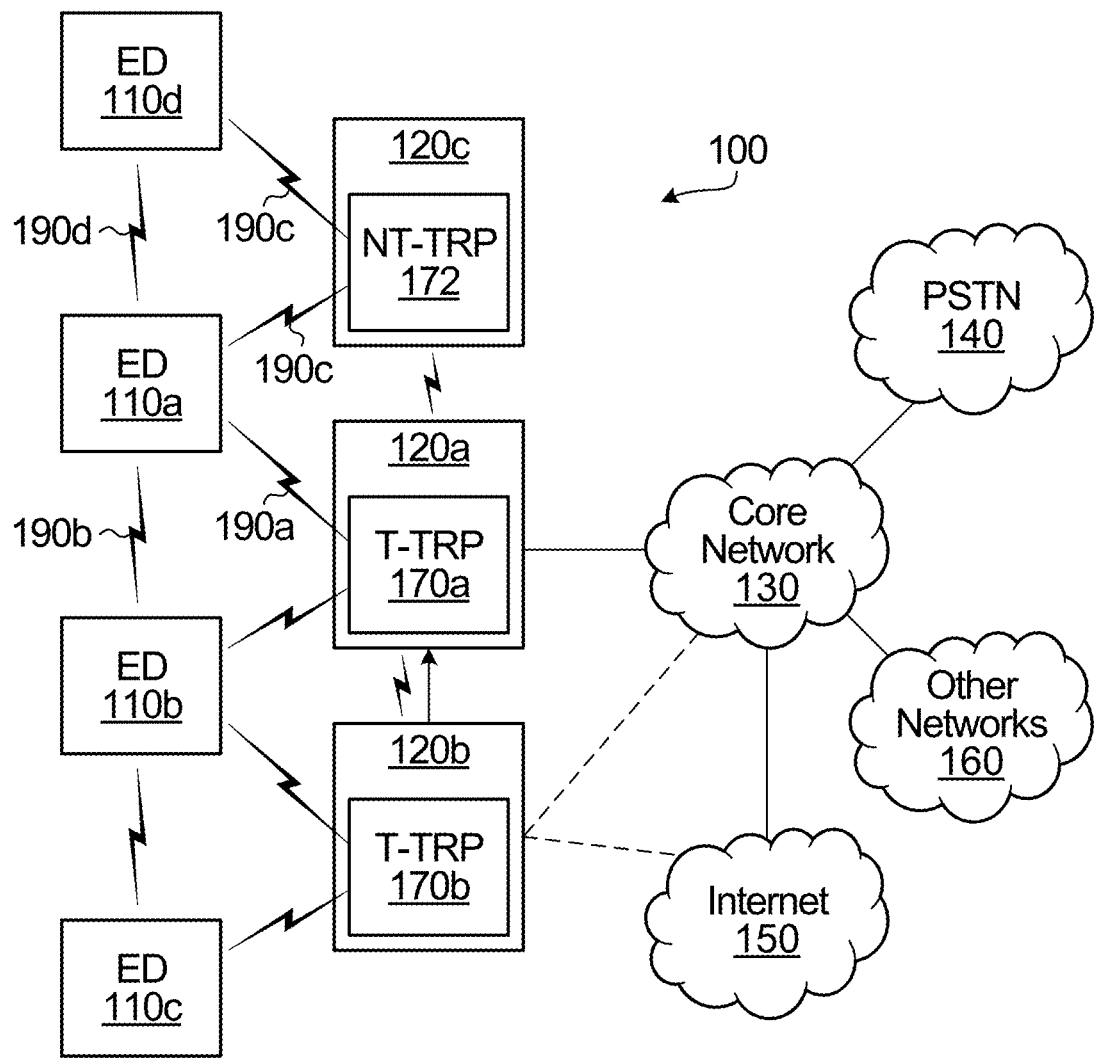
FIG. 2 illustrates another example of a communication system.

FIG. 2 illustrates an example communication system 100. In general, the communication system 100 enables multiple wireless or wired elements to communicate data and other content. The purpose of the communication system 100 may be to provide content, such as voice, data, video, and/or text, via broadcast, multicast and unicast, etc. The communication system 100 may operate by sharing resources, such as carrier spectrum bandwidth, between its constituent elements. The communication system 100 may include a terrestrial communication system and/or a non-terrestrial communication system. The communication system 100 may provide a wide range of communication services and applications (such as earth monitoring, remote sensing, passive sensing and positioning, navigation and tracking, autonomous delivery and mobility, etc.). The communication system 100 may provide a high degree of availability and robustness through a joint operation of the terrestrial communication system and the non-terrestrial communication system. For example, integrating a non-terrestrial communication system (or components thereof) into a terrestrial communication system can result in what may be considered a heterogeneous network comprising multiple layers. Compared to conventional communication networks, the heterogeneous network may achieve better overall performance through efficient multi-link joint operation, more flexible functionality sharing, and faster physical layer link switching between terrestrial networks and non-terrestrial networks.

The terrestrial communication system and the non-terrestrial communication system could be considered sub-systems of the communication system. In the example shown, the communication system 100 includes electronic devices (ED) 110a-110d (generically referred to as ED 110), radio access networks (RANs) 120a-120b, non-terrestrial communication network 120c, a core network 130, a public switched telephone network (PSTN) 140, the internet 150, and other networks 160. The RANs 120a-120b include respective base stations (BSs) 170a-170b, which may be generically referred to as terrestrial transmit and receive points (T-TRPs) 170a-170b. The non-terrestrial communication network 120c includes an access node 120c, which may be generically referred to as a non-terrestrial transmit and receive point (NT-TRP) 172.

Any ED 110 may be alternatively or additionally configured to interface, access, or communicate with any other T-TRP 170a-170b and NT-TRP 172, the internet 150, the core network 130, the PSTN 140, the other networks 160, or any combination of the preceding. In some examples, ED 110a may communicate an uplink and/or downlink transmission over an interface 190a with T-TRP 170a. In some examples, the EDs 110a, 110b and 110d may also communicate directly with one another via one or more sidelink air interfaces 190b. In some examples, ED 110d may communicate an uplink and/or downlink transmission over an interface 190c with NT-TRP 172.

The air interfaces 190a and 190b may use similar communication technology, such as any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190a and 190b. The air interfaces 190a and 190b may utilize other higher dimension signal spaces, which may involve a combination of orthogonal and/or non-orthogonal dimensions.

The air interface 190c can enable communication between the ED 110d and one or multiple NT-TRPs 172 via a wireless link or simply a link. For some examples, the link is a dedicated connection for unicast transmission, a connection for broadcast transmission, or a connection between a group of EDs and one or multiple NT-TRPs for multicast transmission.

The RANs 120a and 120b are in communication with the core network 130 to provide the EDs 110a 110b, and 110c with various services such as voice, data, and other services. The RANs 120a and 120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a and 120b or EDs 110a 110b, and 110c or both, and (ii) other networks (such as the PSTN 140, the internet 150, and the other networks 160). In addition, some or all of the EDs 110a 110b, and 110c may include functionality for communicating with different wireless networks over different wireless links using different wireless technologies and/or protocols. Instead of wireless communication (or in addition thereto), the EDs 110a 110b, and 110c may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110a 110b, and 110c may be multimode devices capable of operation according to multiple radio access technologies and incorporate multiple transceivers necessary to support such.

Figure 3:
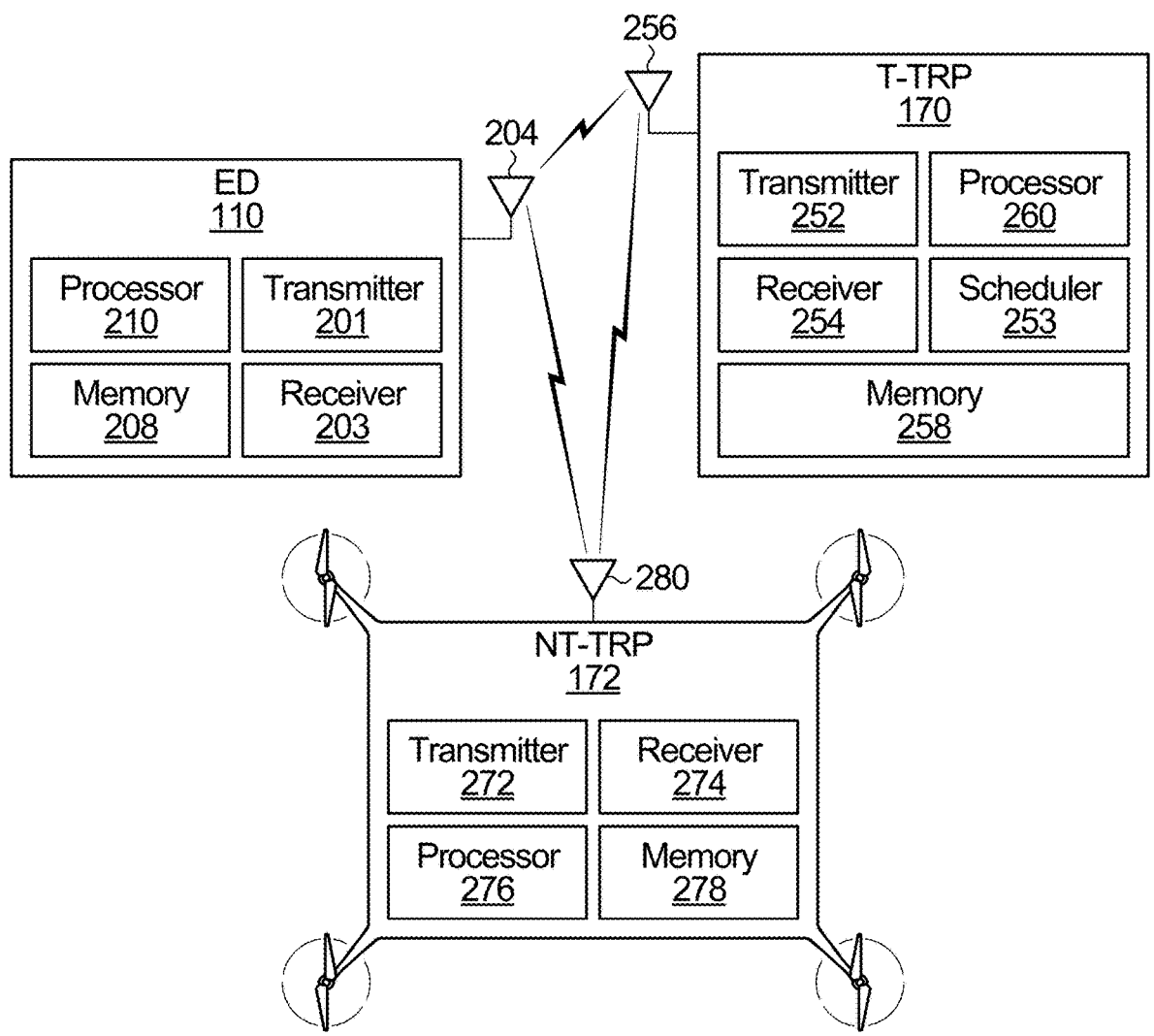
FIG. 3 illustrates an example of an electronic device (ED), a terrestrial transmit and receive point (T-TRP), and a non-terrestrial transmit and receive point (NT-TRP)

FIG. 3 illustrates another example of an ED 110 and a base station 170a, 170b and/or 170c. The ED 110 is used to connect persons, objects, machines, etc. The ED 110 may be widely used in various scenarios, for example, cellular communications, device-to-device (D2D), vehicle to everything (V2X), peer-to-peer (P2P), machine-to-machine (M2M), machine-type communications (MTC), internet of things (IOT), virtual reality (VR), augmented reality (AR), industrial control, self-driving, remote medical, smart grid, smart furniture, smart office, smart wearable, smart transportation, smart city, drones, robots, remote sensing, passive sensing, positioning, navigation and tracking, autonomous delivery and mobility, etc.

Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, a consumer electronics device, a smart book, a vehicle, a car, a truck, a bus, a train, or an IoT device, an industrial device, or apparatus (e.g. communication module, modem, or chip) in the forgoing devices, among other possibilities. Future generation EDs 110 may be referred to using other terms. The base station 170a and 170b is a T-TRP and will hereafter be referred to as T-TRP 170. Also shown in FIG. 3, a NT-TRP will hereafter be referred to as NT-TRP 172. Each ED 110 connected to T-TRP 170 and/or NT-TRP 172 can be dynamically or semi-statically turned-on (i.e., established, activated, or enabled), turned-off (i.e., released, deactivated, or disabled) and/or configured in response to one of more of: connection availability and connection necessity.

The ED 110 includes a transmitter 201 and a receiver 203 coupled to one or more antennas 204. Only one antenna 204 is illustrated. One, some, or all of the antennas may alternatively be panels. The transmitter 201 and the receiver 203 may be integrated, e.g. as a transceiver. The transceiver is configured to modulate data or other content for transmission by at least one antenna 204 or network interface controller (NIC). The transceiver is also configured to demodulate data or other content received by the at least one antenna 204. Each transceiver includes any suitable structure for generating signals for wireless or wired transmission and/or processing signals received wirelessly or by wire. Each antenna 204 includes any suitable structure for transmitting and/or receiving wireless or wired signals.

The ED 110 includes at least one memory 208. The memory 208 stores instructions and data used, generated, or collected by the ED 110. For example, the memory 208 could store software instructions or modules configured to implement some or all of the functionality and/or embodiments described herein and that are executed by the processing unit(s) 210. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, on-processor cache, and the like.

The ED 110 may further include one or more input/output devices (not shown) or interfaces (such as a wired interface to the internet 150 in FIG. 1). The input/output devices permit interaction with a user or other devices in the network. Each input/output device includes any suitable structure for providing information to or receiving information from a user, such as a speaker, microphone, keypad, keyboard, display, or touch screen, including network interface communications.

The ED 110 further includes a processor 210 for performing operations including those related to preparing a transmission for uplink transmission to the NT-TRP 172 and/or T-TRP 170, those related to processing downlink transmissions received from the NT-TRP 172 and/or T-TRP 170, and those related to processing sidelink transmission to and from another ED 110. Processing operations related to preparing a transmission for uplink transmission may include operations such as encoding, modulating, transmit beamforming, and generating symbols for transmission. Processing operations related to processing downlink transmissions may include operations such as receive beamforming, demodulating and decoding received symbols. Depending upon the embodiment, a downlink transmission may be received by the receiver 203, possibly using receive beamforming, and the processor 210 may extract signaling from the downlink transmission (e.g. by detecting and/or decoding the signaling). An example of signaling may be a reference signal transmitted by NT-TRP 172 and/or T-TRP 170. In some embodiments, the processor 276 implements the transmit beamforming and/or receive beamforming based on the indication of beam direction, e.g. beam angle information (BAI), received from T-TRP 170. In some embodiments, the processor 210 may perform operations relating to network access (e.g. initial access) and/or downlink synchronization, such as operations relating to detecting a synchronization sequence, decoding and obtaining the system information, etc. In some embodiments, the processor 210 may perform channel estimation, e.g. using a reference signal received from the NT-TRP 172 and/or T-TRP 170.

Although not illustrated, the processor 210 may form part of the transmitter 201 and/or receiver 203. Although not illustrated, the memory 208 may form part of the processor 210.

The processor 210, and the processing components of the transmitter 201 and receiver 203 may each be implemented by the same or different one or more processors that are configured to execute instructions stored in a memory (e.g. in memory 208). Alternatively, some or all of the processor 210, and the processing components of the transmitter 201 and receiver 203 may be implemented using dedicated circuitry, such as a programmed field-programmable gate array (FPGA), a graphical processing unit (GPU), or an application-specific integrated circuit (ASIC).

The T-TRP 170 may be known by other names in some implementations, such as a base station, a base transceiver station (BTS), a radio base station, a network node, a network device, a device on the network side, a transmit/receive node, a Node B, an evolved NodeB (eNodeB or eNB), a Home eNodeB, a next Generation NodeB (gNB), a transmission point (TP)), a site controller, an access point (AP), or a wireless router, a relay station, a remote radio head, a terrestrial node, a terrestrial network device, or a terrestrial base station, base band unit (BBU), remote radio unit (RRU), active antenna unit (AAU), remote radio head (RRH), central unit (CU), distribute unit (DU), positioning node, among other possibilities. The T-TRP 170 may be macro BSs, pico BSs, relay node, donor node, or the like, or combinations thereof. The T-TRP 170 may refer to the forging devices or apparatus (e.g. communication module, modem, or chip) in the forgoing devices.

In some embodiments, the parts of the T-TRP 170 may be distributed. For example, some of the modules of the T-TRP 170 may be located remote from the equipment housing the antennas of the T-TRP 170, and may be coupled to the equipment housing the antennas over a communication link (not shown) sometimes known as front haul, such as common public radio interface (CPRI). Therefore, in some embodiments, the term T-TRP 170 may also refer to modules on the network side that perform processing operations, such as determining the location of the ED 110, resource allocation (scheduling), message generation, and encoding/decoding, and that are not necessarily part of the equipment housing the antennas of the T-TRP 170. The modules may also be coupled to other T-TRPs. In some embodiments, the T-TRP 170 may actually be a plurality of T-TRPs that are operating together to serve the ED 110, e.g. through coordinated multipoint transmissions.

The T-TRP 170 includes at least one transmitter 252 and at least one receiver 254 coupled to one or more antennas 256. Only one antenna 256 is illustrated. One, some, or all of the antennas may alternatively be panels. The transmitter 252 and the receiver 254 may be integrated as a transceiver. The T-TRP 170 further includes a processor 260 for performing operations including those related to: preparing a transmission for downlink transmission to the ED 110, processing an uplink transmission received from the ED 110, preparing a transmission for backhaul transmission to NT-TRP 172, and processing a transmission received over backhaul from the NT-TRP 172. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. The processor 260 may also perform operations relating to network access (e.g. initial access) and/or downlink synchronization, such as generating the content of synchronization signal blocks (SSBs), generating the system information, etc. In some embodiments, the processor 260 also generates the indication of beam direction, e.g. BAI, which may be scheduled for transmission by scheduler 253. The processor 260 performs other network-side processing operations described herein, such as determining the location of the ED 110, determining where to deploy NT-TRP 172, etc. In some embodiments, the processor 260 may generate signaling, e.g. to configure one or more parameters of the ED 110 and/or one or more parameters of the NT-TRP 172. Any signaling generated by the processor 260 is sent by the transmitter 252. Note that "signaling", as used herein, may alternatively be called control signaling. Dynamic signaling may be transmitted in a control channel, e.g. a physical downlink control channel (PDCCH), and static or semi-static higher layer signaling may be included in a packet transmitted in a data channel, e.g. in a physical downlink shared channel (PDSCH).

A scheduler 253 may be coupled to the processor 260. The scheduler 253 may be included within or operated separately from the T-TRP 170, which may schedule uplink, downlink, and/or backhaul transmissions, including issuing scheduling grants and/or configuring scheduling-free ("configured grant") resources. The T-TRP 170 further includes a memory 258 for storing information and data. The memory 258 stores instructions and data used, generated, or collected by the T-TRP 170. For example, the memory 258 could store software instructions or modules configured to implement some or all of the functionality and/or embodiments described herein and that are executed by the processor 260.

Although not illustrated, the processor 260 may form part of the transmitter 252 and/or receiver 254. Also, although not illustrated, the processor 260 may implement the scheduler 253. Although not illustrated, the memory 258 may form part of the processor 260.

The processor 260, the scheduler 253, and the processing components of the transmitter 252 and receiver 254 may each be implemented by the same or different one or more processors that are configured to execute instructions stored in a memory, e.g. in memory 258. Alternatively, some or all of the processor 260, the scheduler 253, and the processing components of the transmitter 252 and receiver 254 may be implemented using dedicated circuitry, such as a FPGA, a GPU, or an ASIC.

Although the NT-TRP 172 is illustrated as a drone only as an example, the NT-TRP 172 may be implemented in any suitable non-terrestrial form. Also, the NT-TRP 172 may be known by other names in some implementations, such as a non-terrestrial node, a non-terrestrial network device, or a non-terrestrial base station. The NT-TRP 172 includes a transmitter 272 and a receiver 274 coupled to one or more antennas 280. Only one antenna 280 is illustrated. One, some, or all of the antennas may alternatively be panels. The transmitter 272 and the receiver 274 may be integrated as a transceiver. The NT-TRP 172 further includes a processor 276 for performing operations including those related to: preparing a transmission for downlink transmission to the ED 110, processing an uplink transmission received from the ED 110, preparing a transmission for backhaul transmission to T-TRP 170, and processing a transmission received over backhaul from the T-TRP 170. Processing operations related to preparing a transmission for downlink or backhaul transmission may include operations such as encoding, modulating, precoding (e.g. MIMO precoding), transmit beamforming, and generating symbols for transmission. Processing operations related to processing received transmissions in the uplink or over backhaul may include operations such as receive beamforming, and demodulating and decoding received symbols. In some embodiments, the processor 276 implements the transmit beamforming and/or receive beamforming based on beam direction information (e.g. BAI) received from T-TRP 170. In some embodiments, the processor 276 may generate signaling, e.g. to configure one or more parameters of the ED 110. In some embodiments, the NT-TRP 172 implements physical layer processing, but does not implement higher layer functions such as functions at the medium access control (MAC) or radio link control (RLC) layer. As this is only an example, more generally, the NT-TRP 172 may implement higher layer functions in addition to physical layer processing.

The NT-TRP 172 further includes a memory 278 for storing information and data. Although not illustrated, the processor 276 may form part of the transmitter 272 and/or receiver 274. Although not illustrated, the memory 278 may form part of the processor 276.

The processor 276 and the processing components of the transmitter 272 and receiver 274 may each be implemented by the same or different one or more processors that are configured to execute instructions stored in a memory, e.g. in memory 278. Alternatively, some or all of the processor 276 and the processing components of the transmitter 272 and receiver 274 may be implemented using dedicated circuitry, such as a programmed FPGA, a GPU, or an ASIC. In some embodiments, the NT-TRP 172 may actually be a plurality of NT-TRPs that are operating together to serve the ED 110, e.g. through coordinated multipoint transmissions.

Note that "TRP", as used herein, may refer to a T-TRP or a NT-TRP.

The T-TRP 170, the NT-TRP 172, and/or the ED 110 may include other components, but these have been omitted for the sake of clarity.

Figure 4:
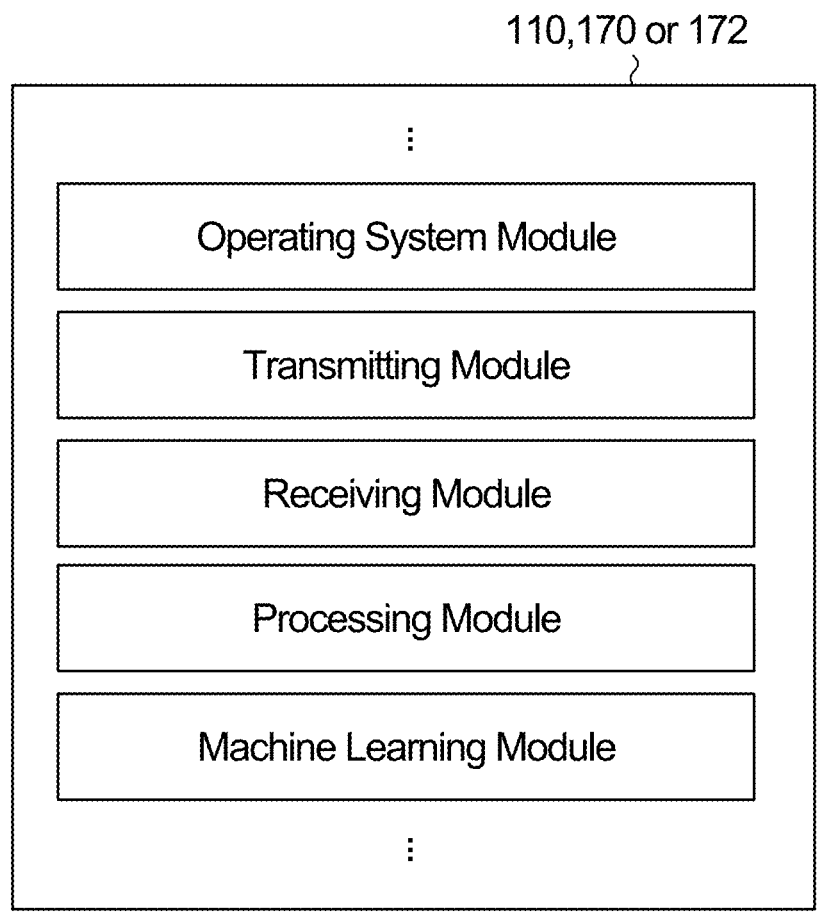
FIG. 4 illustrates example units or modules in a device.

One or more steps of the embodiment methods provided herein may be performed by corresponding units or modules, according to FIG. 4. FIG. 4 illustrates units or modules in a device, such as in ED 110, in T-TRP 170, or in NT-TRP 172. For example, a signal may be transmitted by a transmitting unit or a transmitting module. For example, a signal may be transmitted by a transmitting unit or a transmitting module. A signal may be received by a receiving unit or a receiving module. A signal may be processed by a processing unit or a processing module. Other steps may be performed by an artificial intelligence (AI) or machine learning (ML) module. The respective units or modules may be implemented using hardware, one or more components or devices that execute software, or a combination thereof. For instance, one or more of the units or modules may be an integrated circuit, such as a programmed FPGA, a GPU, or an ASIC. It will be appreciated that where the modules are implemented using software for execution by a processor for example, they may be retrieved by a processor, in whole or part as needed, individually or together for processing, in single or multiple instances, and that the modules themselves may include instructions for further deployment and instantiation.

Additional details regarding the EDs 110, T-TRP 170, and NT-TRP 172 are known to those of skill in the art. As such, these details are omitted here.

Control signaling is discussed herein in some embodiments. Control signaling may sometimes instead be referred to as signaling, or control information, or configuration information, or a configuration. In some cases, control signaling may be dynamically indicated, e.g. in the physical layer in a control channel. An example of control signaling that is dynamically indicated is information sent in physical layer control signaling, e.g. downlink control information (DCI). Control signaling may sometimes instead be semi-statically indicated, e.g. in RRC signaling or in a MAC control element (CE). A dynamic indication may be an indication in lower layer, e.g. physical layer/layer 1 signaling (e.g. in DCI), rather than in a higher-layer (e.g. rather than in RRC signaling or in a MAC CE). A semi-static indication may be an indication in semi-static signaling. Semi-static signaling, as used herein, may refer to signaling that is not dynamic, e.g. higher-layer signaling, RRC signaling, and/or a MAC CE. Dynamic signaling, as used herein, may refer to signaling that is dynamic, e.g. physical layer control signaling sent in the physical layer, such as DCI.

An air interface generally includes a number of components and associated parameters that collectively specify how a transmission is to be sent and/or received over a wireless communications link between two or more communicating devices. For example, an air interface may include one or more components defining the waveform(s), frame structure(s), multiple access scheme(s), protocol(s), coding scheme(s) and/or modulation scheme(s) for conveying information (e.g. data) over a wireless communications link. The wireless communications link may support a link between a radio access network and user equipment (e.g. a "Uu" link), and/or the wireless communications link may support a link between device and device, such as between two user equipments (e.g. a "sidelink"), and/or the wireless communications link may support a link between a non-terrestrial (NT)-communication network and user equipment (UE). The followings are some examples for the above components:

A waveform component may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

A frame structure component may specify a configuration of a frame or group of frames. The frame structure component may indicate one or more of a time, frequency, pilot signature, code, or other parameter of the frame or group of frames. More details of frame structure will be discussed below.

A multiple access scheme component may specify multiple access technique options, including technologies defining how communicating devices share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, multiple access technique options may include: scheduled access vs. non-scheduled access, also known as grant-free access; non-orthogonal multiple access vs. orthogonal multiple access, e.g., via a dedicated channel resource (e.g., no sharing between multiple communicating devices); contention-based shared channel resources vs. non-contention-based shared channel resources, and cognitive radio-based access.

A hybrid automatic repeat request (HARQ) protocol component may specify how a transmission and/or a re-transmission is to be made. Non-limiting examples of transmission and/or re-transmission mechanism options include those that specify a scheduled data pipe size, a signaling mechanism for transmission and/or re-transmission, and a re-transmission mechanism.

A coding and modulation component may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

In some embodiments, the air interface may be a "one-size-fits-all concept". For example, the components within the air interface cannot be changed or adapted once the air interface is defined. In some implementations, only limited parameters or modes of an air interface, such as a cyclic prefix (CP) length or a multiple input multiple output (MIMO) mode, can be configured. In some embodiments, an air interface design may provide a unified or flexible framework to support below 6 GHz and beyond 6 GHz frequency (e.g., mmWave) bands for both licensed and unlicensed access. As an example, flexibility of a configurable air interface provided by a scalable numerology and symbol duration may allow for transmission parameter optimization for different spectrum bands and for different services/devices. As another example, a unified air interface may be self-contained in a frequency domain, and a frequency domain self-contained design may support more flexible radio access network (RAN) slicing through channel resource sharing between different services in both frequency and time.

Frame Structure

A frame structure is a feature of the wireless communication physical layer that defines a time domain signal transmission structure, e.g. to allow for timing reference and timing alignment of basic time domain transmission units. Wireless communication between communicating devices may occur on time-frequency resources governed by a frame structure. The frame structure may sometimes instead be called a radio frame structure.

Depending upon the frame structure and/or configuration of frames in the frame structure, frequency division duplex (FDD) and/or time-division duplex (TDD) and/or full duplex (FD) communication may be possible. FDD communication is when transmissions in different directions (e.g. uplink vs. downlink) occur in different frequency bands. TDD communication is when transmissions in different directions (e.g. uplink vs. downlink) occur over different time durations. FD communication is when transmission and reception occurs on the same time-frequency resource, i.e. a device can both transmit and receive on the same frequency resource concurrently in time.

One example of a frame structure is a frame structure in long-term evolution (LTE) having the following specifications: each frame is 10 ms in duration; each frame has 10 subframes, which are each 1 ms in duration; each subframe includes two slots, each of which is 0.5 ms in duration; each slot is for transmission of 7 OFDM symbols (assuming normal CP); each OFDM symbol has a symbol duration and a particular bandwidth (or partial bandwidth or bandwidth partition) related to the number of subcarriers and subcarrier spacing; the frame structure is based on OFDM waveform parameters such as subcarrier spacing and CP length (where the CP has a fixed length or limited length options); and the switching gap between uplink and downlink in TDD has to be the integer time of OFDM symbol duration.

Another example of a frame structure is a frame structure in new radio (NR) having the following specifications: multiple subcarrier spacings are supported, each subcarrier spacing corresponding to a respective numerology; the frame structure depends on the numerology, but in any case, the frame length is set at 10 ms, and consists of ten subframes of 1 ms each; a slot is defined as 14 OFDM symbols, and slot length depends upon the numerology. For example, The NR frame structure for normal CP 15 kHz subcarrier spacing ("numerology 1") and the NR frame structure for normal CP 30 kHz subcarrier spacing ("numerology 2") are different. For 15 kHz subcarrier spacing a slot length is 1 ms, and for 30 kHz subcarrier spacing a slot length is 0.5 ms. The NR frame structure may have more flexibility than the LTE frame structure.

Another example of a frame structure is an example flexible frame structure, e.g. for use in a 6G network or later. In a flexible frame structure, a symbol block may be defined as the minimum duration of time that may be scheduled in the flexible frame structure. A symbol block may be a unit of transmission having an optional redundancy portion (e.g. CP portion) and an information (e.g. data) portion. An OFDM symbol is an example of a symbol block. A symbol block may alternatively be called a symbol. Embodiments of flexible frame structures include different parameters that may be configurable, e.g. frame length, subframe length, symbol block length, etc. A non-exhaustive list of possible configurable parameters in some embodiments of a flexible frame structure include:

(1) Frame: The frame length need not be limited to 10 ms, and the frame length may be configurable and change over time. In some embodiments, each frame includes one or multiple downlink synchronization channels and/or one or multiple downlink broadcast channels, and each synchronization channel and/or broadcast channel may be transmitted in a different direction by different beamforming. The frame length may be more than one possible value and configured based on the application scenario. For example, autonomous vehicles may require relatively fast initial access, in which case the frame length may be set as 5 ms for autonomous vehicle applications. As another example, smart meters on houses may not require fast initial access, in which case the frame length may be set as 20 ms for smart meter applications.

(2) Subframe duration: A subframe might or might not be defined in the flexible frame structure, depending upon the implementation. For example, a frame may be defined to include slots, but no subframes. In frames in which a subframe is defined, e.g. for time domain alignment, then the duration of the subframe may be configurable. For example, a subframe may be configured to have a length of 0.1 ms or 0.2 ms or 0.5 ms or 1 ms or 2 ms or 5 ms, etc. In some embodiments, if a subframe is not needed in a particular scenario, then the subframe length may be defined to be the same as the frame length or not defined.

(3) Slot configuration: A slot might or might not be defined in the flexible frame structure, depending upon the implementation. In frames in which a slot is defined, then the definition of a slot (e.g. in time duration and/or in number of symbol blocks) may be configurable. In one embodiment, the slot configuration is common to all UEs or a group of UEs. For this case, the slot configuration information may be transmitted to UEs in a broadcast channel or common control channel(s). In other embodiments, the slot configuration may be UE specific, in which case the slot configuration information may be transmitted in a UE-specific control channel. In some embodiments, the slot configuration signaling can be transmitted together with frame configuration signaling and/or subframe configuration signaling. In other embodiments, the slot configuration can be transmitted independently from the frame configuration signaling and/or subframe configuration signaling. In general, the slot configuration may be system common, base station common, UE group common, or UE specific.

(4) Subcarrier spacing (SCS): SCS is one parameter of scalable numerology which may allow the SCS to possibly range from 15 KHz to 480 KHz. The SCS may vary with the frequency of the spectrum and/or maximum UE speed to minimize the impact of the Doppler shift and phase noise. In some examples, there may be separate transmission and reception frames, and the SCS of symbols in the reception frame structure may be configured independently from the SCS of symbols in the transmission frame structure. The SCS in a reception frame may be different from the SCS in a transmission frame. In some examples, the SCS of each transmission frame may be half the SCS of each reception frame. If the SCS between a reception frame and a transmission frame is different, the difference does not necessarily have to scale by a factor of two, e.g. if more flexible symbol durations are implemented using inverse discrete Fourier transform (IDFT) instead of fast Fourier transform (FFT). Additional examples of frame structures can be used with different SCSs.

(5) Flexible transmission duration of basic transmission unit: The basic transmission unit may be a symbol block (alternatively called a symbol), which in general includes a redundancy portion (referred to as the CP) and an information (e.g. data) portion, although in some embodiments the CP may be omitted from the symbol block. The CP length may be flexible and configurable. The CP length may be fixed within a frame or flexible within a frame, and the CP length may possibly change from one frame to another, or from one group of frames to another group of frames, or from one subframe to another subframe, or from one slot to another slot, or dynamically from one scheduling to another scheduling. The information (e.g. data) portion may be flexible and configurable. Another possible parameter relating to a symbol block that may be defined is ratio of CP duration to information (e.g. data) duration. In some embodiments, the symbol block length may be adjusted according to: channel condition (e.g. multi-path delay, Doppler); and/or latency requirement; and/or available time duration. As another example, a symbol block length may be adjusted to fit an available time duration in the frame.

(6) Flexible switch gap: A frame may include both a downlink portion for downlink transmissions from a base station, and an uplink portion for uplink transmissions from UEs. A gap may be present between each uplink and downlink portion, which is referred to as a switching gap. The switching gap length (duration) may be configurable. A switching gap duration may be fixed within a frame or flexible within a frame, and a switching gap duration may possibly change from one frame to another, or from one group of frames to another group of frames, or from one subframe to another subframe, or from one slot to another slot, or dynamically from one scheduling to another scheduling.

Cell/Carrier/Bandwidth Parts (BWPs)/Occupied Bandwidth

A device, such as a base station, may provide coverage over a cell. Wireless communication with the device may occur over one or more carrier frequencies. A carrier frequency will be referred to as a carrier. A carrier may alternatively be called a component carrier (CC). A carrier may be characterized by its bandwidth and a reference frequency, e.g. the center or lowest or highest frequency of the carrier. A carrier may be on licensed or unlicensed spectrum. Wireless communication with the device may also or instead occur over one or more bandwidth parts (BWPs). For example, a carrier may have one or more BWPs. More generally, wireless communication with the device may occur over spectrum. The spectrum may comprise one or more carriers and/or one or more BWPs.

A cell may include one or multiple downlink resources and optionally one or multiple uplink resources, or a cell may include one or multiple uplink resources and optionally one or multiple downlink resources, or a cell may include both one or multiple downlink resources and one or multiple uplink resources. As an example, a cell might only include one downlink carrier/BWP, or only include one uplink carrier/BWP, or include multiple downlink carriers/BWPs, or include multiple uplink carriers/BWPs, or include one downlink carrier/BWP and one uplink carrier/BWP, or include one downlink carrier/BWP and multiple uplink carriers/BWPs, or include multiple downlink carriers/BWPs and one uplink carrier/BWP, or include multiple downlink carriers/BWPs and multiple uplink carriers/BWPs. In some embodiments, a cell may instead or additionally include one or multiple sidelink resources, including sidelink transmitting and receiving resources.

A BWP is a set of contiguous or non-contiguous frequency subcarriers on a carrier, or a set of contiguous or non-contiguous frequency subcarriers on multiple carriers, or a set of non-contiguous or contiguous frequency subcarriers, which may have one or more carriers.

In some embodiments, a carrier may have one or more BWPs, e.g. a carrier may have a bandwidth of 20 MHz and consist of one BWP, or a carrier may have a bandwidth of 80 MHz and consist of two adjacent contiguous BWPs, etc. In other embodiments, a BWP may have one or more carriers, e.g. a BWP may have a bandwidth of 40 MHz and consists of two adjacent contiguous carriers, where each carrier has a bandwidth of 20 MHz. In some embodiments, a BWP may comprise non-contiguous spectrum resources which consists of non-contiguous multiple carriers, where the first carrier of the non-contiguous multiple carriers may be in mmW band, the second carrier may be in a low band (such as 2 GHz band), the third carrier (if it exists) may be in THz band, and the fourth carrier (if it exists) may be in visible light band. Resources in one carrier which belong to the BWP may be contiguous or non-contiguous. In some embodiments, a BWP has non-contiguous spectrum resources on one carrier.

Wireless communication may occur over an occupied bandwidth. The occupied bandwidth may be defined as the width of a frequency band such that, below the lower and above the upper frequency limits, the mean powers emitted are each equal to a specified percentage of the total mean transmitted power, for example, the value of the specified percentage may be taken as 0.5%.

The carrier, the BWP, or the occupied bandwidth may be signaled by a network device (e.g. base station) dynamically, e.g. in physical layer control signaling such as Downlink Control Information (DCI), or semi-statically, e.g. in radio resource control (RRC) signaling or in the medium access control (MAC) layer, or be predefined based on the application scenario; or be determined by the UE as a function of other parameters that are known by the UE, or may be fixed, e.g. by a standard.

Figure 5:
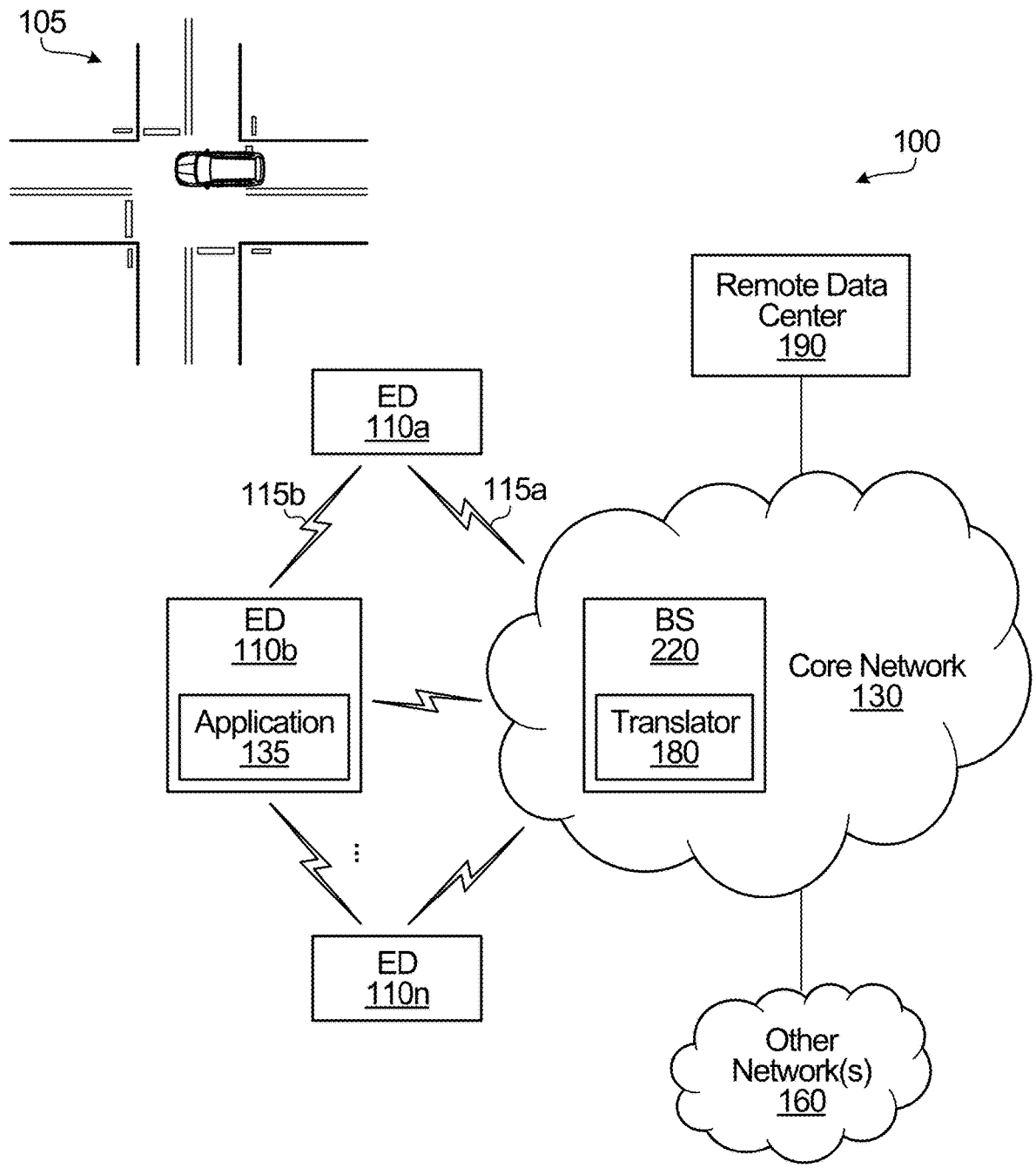
FIG. 5 is a schematic diagram of another example of a communication system suitable for implementing examples described herein.

FIG. 5 is a schematic diagram illustrating an example system for feature-driven communications, in which examples described herein may be implemented. The feature-driven communications described herein may be used for machine-to-machine (M2M) communications, machine-to-human communications and/or human-based communications.

In the example shown, the system 100 includes a plurality of electronic devices (EDs) 110*a*-110*n* (generically referred to as ED 110). An ED 110 may be a part of, or may itself be, an end user device for wireless operation, for example a user equipment/device (UE), a wireless transmit/receive unit (WTRU), a mobile station, a fixed or mobile subscriber unit, a cellular telephone, a station (STA), a personal digital assistant (PDA), a smartphone, a laptop, a computer, a tablet, or a consumer electronics device, among other possibilities. An ED 110 may be a sensor device, such as an Internet of Things (IoT) device, a smart meter, a wireless sensor, a machine type communication (MTC) device or other such information-gathering device. An ED 110 may implement a machine application, for example, which may be configured to process information (e.g., to make machine-based decisions or interventions). In the example shown, the ED 110*b* implements a machine application 135. An ED 100 may be used to gather information about a subject 105 of interest. Different EDs 110 may be used to monitor a common subject 105, and to gather information from different perspectives and/or to gather different types of information. For example, one ED may gather visual information from one angle, another ED may gather visual information from another angle, and another ED may gather audio information.

In FIG. 5, each ED 110 is in communication, over a wireless radio channel, with a T-TRP 170, e.g., a base station (BS) 220, via a wireless connection 115*a*. The EDs 110 may also communicate directly with one another via one or more sidelink wireless connections 115*b*. The wireless connections 115*a* and 115*b* may be generally referred to as wireless connections 115. BS-ED communications over wireless connections 115*a* and ED-ED communications over wireless connections 115*b* may use similar communication technology. The BS 220 may include (or be) one or more of several well-known devices, such as a base transceiver station (BTS), a radio base station, a Node-B (NodeB), an evolved NodeB (eNodeB), a Home eNodeB, a gNodeB (sometimes called a "gigabit" Node B), a transmission point (TP), a transmit and receive point (TRP), a site controller, an access point (AP), or a wireless router, among other possibilities. Although only one BS 220 is shown in FIG. 5, it should be understood that there may be a plurality of BSs 220 in the system 100. A plurality of BSs 220 may be managed by a radio network controller (RNC) or a base station controller (BSC). In examples where an RNC or BSC is present in the system 100, one or more functions described herein as being implemented at the BS 220 may instead by implemented at the RNC or BSC. For simplicity, the present disclosure will discuss implementation at the BS 220 (instead of at the RNC or BSC), however it should be understood that this is not intended to be limiting. Each BS 220 may communicate with and manage a respective plurality of EDs 110. Each ED 110 may communicate with and be managed by a respective one BS 220. In some cases, an ED 110 may communicate with and/or be managed by a plurality of BSs 220. In some examples, different EDs 110 may transmit information to different BSs 220, and may use different channels for the wireless communication 115. For convenience, the BS 220 will be referenced in the singular, however it should be understood that there may be a plurality of BSs 220, and the functions described for a BS 220 may be performed by multiple BSs 220.

The BS 220 may be part of a core network 130. Alternatively, the BS 220 may be outside of the core network 130 (e.g., part of a separate radio access network (RAN)) and may be used to relay information between the EDs 110 and the core network 130. Other network(s) 150 (e.g., the Internet) and/or a remote data center 190 may be connected with the core network 130. The core network 130 may serve as a gateway access from the EDs 110 to the remote data center 190 and/or other network(s) 160.

The BS 220 in this example implements a translator 180 that may be used to facilitate feature-driven communications between two EDs 110, as discussed further below. In the example of FIG. 5, the translator 180 is shown as being part of the BS 220. In other examples, the translator 180 might not be part of the BS 220. For example, the translator 180 may be implemented at another component of the core network 130 outside of the BS 220, may be implemented at the remote data center 190, or in the other network(s) 150, or another relaying equipment (not shown), among other possibilities. In the present disclosure, for convenience, examples are described in which the translator 180 is at the BS 220. However, it should be understood that such examples are not intended to be limiting. In an example where feature-driven communication from a first ED 110*a* to a second ED 110*b* is managed by two or more BSs 220 (e.g., the transmitting ED 110*a* is associated with a first BS 220 and the receiving ED 110*b* is associated with a second BS 220 (not shown)), a translator 180 of any one BS 220 may be used. Other such variations may be possible.

In the example shown, one or more EDs (e.g., the ED 110*a*) is a transmitting ED that obtains information about the subject 105, and one or more EDs (e.g., the ED 110*b*) is a receiving ED that receives information about the monitored subject 105. In the present disclosure, ED 110*a* may be used to refer to the transmitting ED in general, and multiple transmitting EDs may be indicated with the notation ED 110*a*-1, ED 110*a*-2, etc. Similarly, ED 110*b* may be used to refer to the receiving ED in general, and multiple receiving EDs may be indicated with the notation ED 110*b*-1, ED 110*b*-2, etc. It should be understood that, although the present disclosure refers to "transmitting" ED and "receiving" ED, this is only for ease of reference. Each ED 110 may be capable of transmitting and/or receiving at any time. Further, an ED 110 that serves to monitor and transmit information about one subject may (at the same time or at a different time) be a recipient of information about another subject.

The ED 110*b* implements an application 135 (e.g., a machine application) that may synthesize and process the received information, for example in order to make a decision or intervention based on observations about the subject 105. The application 135 may be implemented at the ED 110*b* itself (e.g., as shown in FIG. 5), or the ED 110*b* may forward the information to an external application 135 (e.g., implemented at another physical component, not shown). In the present disclosure, for convenience, examples may be described in which the application 135 is at the ED 110*b*. However, it should be understood that such examples are not intended to be limiting.

Different transmitting EDs 110*a* may obtain information about different aspects of the subject 105. The information transmitted by each transmitting ED 110*a* may be transmitted using a common information representation scheme or using different schemes. For example, three EDs 110*a* may be used to observe a crossroad as the subject 105. Information from the EDs 110*a* may be used by a transportation service provider application 135, for example. Two EDs 110*a* may be video monitors that capture video information of the subject 105 from different angles, and another ED 110*a* may be an audio monitor that records surrounding audio information. Visual information from different angles and audio information are all examples of different aspects of the subject 105. All three EDs 110*a* may encode and transmit the observed or measured information to the BS 220 via wireless connections 115. The two video EDs 110*a* may be considered the same type of sensor and may use the same information representation scheme and transmission scheme for extracting information from the subject 105 and transmitting information to the BS 220; and the audio ED 110*a* may be considered a different type of sensor and may use a different information representation scheme and transmission scheme, as discussed further below.

In some examples, such transmission of information may take place only when an event of interest occurs (e.g., a car drives by) in the observed subject 105. The BS 220 may receive the information, decode the information, and converge or synthesize the information into a synthesized set of information about the subject 105. The BS 220 may use the translator 180 to translate (or remap) the information to be received by the receiving ED 110b. The information is received by the ED 110b and used as input to the application 135 (which may then make a decision based on the information). In the example where a car is driving by the observed crossroad, if the car is connected to the core network 130 (e.g., as a vehicle-to-everything (V2X) device), the car itself may also provide uplink channel measurement information and may also serve as a type of transmitting ED 110a. In an example scenario, an event of interest in the observed subject 105 may trigger a cascade of actions, such as observation, measurement and reporting by the transmitting EDs 110a, then synthesis and translation at the core network 130, then receiving and decision at the receiving ED 110b.

Generally, the transmission of information (whether from the transmitting ED 110a to the BS 220, or from the BS 220 to the receiving ED 110b) is in accordance with an information representation scheme and a transmission scheme (which may be referred to together as an information representation and transmission scheme, or simply as a scheme). An information representation scheme defines the format (e.g., sampling rates, compression rates, quantization, source encoding) used for the information to be transmitted. A transmission scheme defines the characteristics of the transmission signal (e.g., segmentation, coding length, coding rate, channel coding, modulation, and waveform). Generally, the information representation scheme is implemented by a source encoder (also referred to as a feature encoder), and the transmission scheme is implemented by a channel encoder. There may be multiple schemes available for use by one transmitting ED 110a. For example, multiple schemes may be defined, and may be stored in a local memory (e.g., the memory 258) of the ED 110a. The ED 110a may use one scheme for a particular transmission, and use another scheme for another transmission. Similarly, the BS 220 may have multiple schemes for transmitting to the receiving ED 110b, and may select a scheme to use as appropriate. Some transmitting EDs 110a may have a degree of autonomy. For example, an ED 110a may be capable of adjusting or choosing its own information representation scheme and transmission scheme. Some transmitting EDs 110a may be more passive. For example, an ED 110a may rely on the BS 220 and/or other component of the core network 130 to issue commands or messages via wireless downlink channels to adjust or choose the information representation scheme and transmission scheme.

A conventional approach to designing an information representation scheme for a M2M communication, machine-to-human communication, or human-to-human communication may be based on what has been done for enhanced mobile broadband (eMBB) communications. In the eMBB scenario, the information representation scheme was designed separately from the information transmission scheme, with the aim of satisfying human perception. That is, the goal was to enable an average human to recover as much of the source information as possible. In the eMBB scenario, the information representation scheme was built on the assumption that the transmission scheme would establish a one-to-one solid connection between a device and the core network to ensure the completeness, entirety, and low-latency of a block transmission.

In contrast to the eMBB scenario, it may be expected that at least some of the information transmitted in M2M or machine-to-human communications would be targeted to a machine (e.g., the application 135). Accordingly, the design principles used for developing information representation schemes in eMBB may not be appropriate, especially when the number of transmitting EDs 110a is large.

Figure 6:
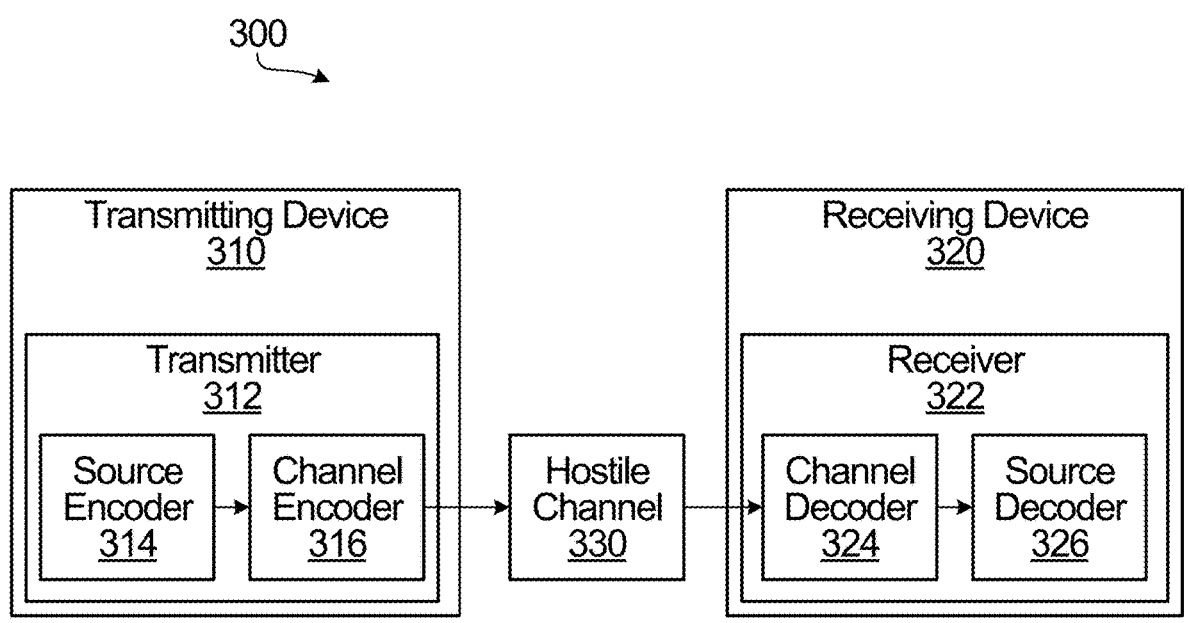
FIG. 6 is a simplified block diagram illustrating an example of a conventional transceiver chain between a transmitting device and a receiving device.

FIG. 6 illustrates an example of a conventional transceiver chain 300 between a transmitting device 310 and a receiving device 320. The transmitting device 310 includes a transmitter 312 that includes a source encoder 314 and a channel encoder 316. The receiving device 320 includes a receiver 322 that includes a channel decoder 324 and a source decoder 326.

In operation, the source encoder 314 firstly encodes original information (also referred to as raw information or source information) into K independent identical distribution (i.i.d.) source bits. This coding step is called source coding, compression, or quantization. The channel encoder 316 then continues to encode these K source bits into N coded bits (N>K). This coding step is called channel coding or forward error correction (FEC) encoding and is done to protect against detriments of the following hostile transmission channel 330. At the receiving device 320, the receiver 322 firstly decodes the N received signals back into K bits using the channel decoder 324 and then continues to recover the original information to K decoded bits using the source decoder 326.

Source Coding

The fundamental relationship between source coding and channel coding are introduced in Claude Shannon's landmark paper: C. E. Shannon, "A mathematical theory of communication," in The Bell System Technical Journal, vol. 27, no. 3, pp. 379-423, July 1948, doi: 10.1002/j.1538-7305.1948.tb01338.x. This paper forms the basis of information theory.

Source coding is a method of data transformation that aims to extract from a message, or source, only its fundamental or most typical information. By removing extraneous or least typical information from a source, the size of the message prior to transmission or storage can be reduced. Data compression allows scarce resources such as disk space or channel bandwidth to be conserved. Source coding can be completed in either a lossless or lossy fashion. Lossless compression ensures that the source can be later reconstructed error-free or with an arbitrarily small error due to the Law of Large Numbers. In other words, a lossless source code maps source information onto a typical set that is "typical" enough to cover nearly all possible information. Strictly speaking, there is no "lossless" coding but an arbitrary small loss that is negligible in the context of a given task/purpose for the coding. Alternatively, a lossy source code scheme can allow for more aggressive compression at the expense of permanent information loss. Although a chosen "typical set" is not typical enough to cover the entire information, the loss is less important for the applications, which implies that a lossy source code is purpose-dependent. In both cases, the degree to which a source can be compressed is referred to as code rate and is limited by the entropy of the source information.

Various types of source coding schemes exist for various purposes or domains. The compression rate or code rate of a source code, either lossy or lossless, is addressed by Shannon's rate distortion theorem (1st theorem).

Channel Coding

Channel coding is a method of data transformation that maximizes the robustness of a message by extending it with redundancy. The added robustness is essential for transmitting a message over a disruptive and hostile channel. The degree to which a message must be expanded is dictated by the channel's capacity. Historically, channel coding has been studied as a lossless process. Many channel coding schemes are able to detect errors and initiate a retransmission to ensure the message is completely intact without error.

The channel capacity of a channel code is addressed by Shannon's channel capacity theorem (2nd theorem).

Source-Channel Dichotomy

Ostensibly, source coding and channel coding are counterproductive tasks. These two layers of encoding have opposing goals. The source encoder aims to compress the message to transport it more efficiently, and the channel encoder aims to expand the message to transport it more robustly. Almost always, these two goals are completed independently: source coding aims to minimize the size of the output given a binary input, with no regard for the channel capacity; channel coding aims to maximize the robustness of its output given a binary input, with no regard for the source entropy.

The dichotomy is addressed by Shannon's source and channel separation theorem ($3^{rd}$ theorem). The philosophy behind the source and channel separation raised by Shannon is:

Original information consists of a number of topologies. However, not all the topologies are "strong" enough against a hostile channel that includes noise.

Therefore, Shannon's source and channel separation theorem suggested that a typical set with i.i.d distribution be found to represent the original information, and then let the channel encoder build more "robust" topologies over the typical set. The way to construct the topologies is code construction that is known to the receiver.

Thus, in Shannon's context, a perfect source coding would turn original information into K i.i.d bits. David A. Huffman designed the first source code that meets that criterion and is now commonly referred to as a Huffman code. Following that philosophy, a good channel coding scheme not only adds the redundant (N-K) bits but also provides a robust topology that allows original information retrieval against noise. For example, with the development of the channel coding technique, the topology constructed is more and more complicated and robust.

However, a joint source-channel coding scheme, as opposed to the separate source and channel coding schemes commonly in use today, could potentially offer significant performance gains. Firstly, it is generally hard to build a perfect source coding for varying and complicated original information. Secondly, a piece of information (for example an image) is just a sample for a large data category. A source code is built for that data type category. From one sample to another, it inevitably results in different performance for any two samples. Both of these issues associated with separate source and coding schemes leave performance improvement room for joint source-channel coding schemes.

mMTC Communication

Fifth generation (5G) or new radio (NR) communication systems are expected to support a massive machine type communication (mMTC) wireless system connecting millions or billions of Internet-of-things (IoT) equipment. It is forecast that the communication traffic consumed by machine-to-machine (M2M) communications will bypass those by humans in the near future, along with an exponentially increasing number of IoT devices deployed into 5G NR and future generation wireless communication systems.

Two of the key differences between machine-oriented and human-oriented communications are: 1) different types of machines have different perception; and 2) different types of machine receivers have specific but different purposes or goals.

If human sensing system were to be regarded as a machine, all the human-machines in the world would share a common potential perception range. For example, out-of-band light signal is invisible to all human vision systems; the human acoustic system fails to process any out-of-band acoustic signal; a video of a higher resolution than human brain processing speed makes no sense for human eyes. Thanks to the fact that human sensing system as whole has such a narrow range of perception, a series of global source coding schemes, such as Moving Picture Experts Group (MPEG), MPEG-4, H.264, etc., have been standardized in the past decades for compatibility with human receivers. In comparison, driven by different application purposes or goals, machine perceptors are generally too diverse for any universal and common standard. For example, a machine perceptor that counts the number of trucks passing a crossroad based on image data probably requires much lower resolution images than a machine that detects drivers' ID of each passing vehicle. In general, machine with different perception range is mainly determined by their application purpose.

New types of IoT applications and equipment with currently unknown purposes and perception ranges will be added into wireless systems in the future. If a source coding scheme is based on worst case machine perceptions of today, there might be a machine-perception redundancy if a simpler machine perceptor is introduced. This redundancy would mean that certain information transmitted and received using the worst case source coding would be redundant and thus unnecessary for the simpler machine preceptor of the future, thereby preventing an optimally efficient exploitation of available channel and power capacity. However, it is hard to establish a self-adaptive information representation and transmission scheme to an unknown future machine perceptor. It is also impractical to build a new global standardized source coding scheme whenever a new IoT application or device is introduced into a wireless system. Moreover, even an established and known machine perceptor may adjust its perception level automatically and gradually in the field. These are all new challenges for source coding for IoT communication.

The density and number of IoT terminals would be much higher and greater than human phones. For human-oriented source coding schemes, the goal is generally to minimize the error or loss between the original source information and the recovered information at the receiver. In most cases, lossless source coding has been pursued for human satisfaction. Thus, the procedures and standards of wireless communications are generally designed to fulfill each user as fairly as possible. For example, when a user device suffers from a deep fading channel, more radio resources may be allocated to it in an effort to provide a substantially equivalent user experience to every user device. However, this may be untrue for M2M communication. An IoT application may involve a large number of associated IoT sensors. It doesn't matter that one associated IoT sensor may suffer from deep channel fading, because the rest of the IoT sensors may have channel conditions that are good enough to provide an overall good IoT service. In such circumstances, it would be unnecessary and inefficient for a base-station or other network node to allocate more transmission resources (for example using a lower channel coding rate and/or retransmission) to the "unlucky" IoT sensor to compensate for its deep fading.

Some embodiments of the present disclosure provide source coding schemes that take into account channel variances for IoT devices. For example, instead of fixing a source coding scheme and adapting a channel coding scheme to compensate poor channel condition, in some embodiments of the present disclosure the source coding scheme is adapted to these channel changes, as discussed further below.

In addition to the notion of source conditions and channel conditions, some embodiments of the present disclosure provide source coding schemes that take into account the notion of task conditions. For example, not all M2M tasks are equal in that not all tasks will require the same amount of information to be extracted from the source. For example, consider the possibility of a wireless drone with a camera observing automobile traffic. If the drone is configured to transmit raw video information, minimal compression may be allowed in order to reconstruct the video after source coding. However, if the drone is instead configured to communicate only a piece of information based on the video footage, such as whether or not a collision has occurred on a freeway, then fewer video details/features may be required and thus higher compression levels may be permitted. This simple scenario is merely one example that outlines the potential benefits of considering task conditions when designing source and channel coding.

Purpose, Channel, Information Topology

As discussed earlier, information is transmitted from one entity to another in a communication system in order to server a target, goal, or purpose. In an IoT or M2M communication, the target may be related to a recovery error rate or detection error rate, for example. Unlike human perception, which typically prefers to receive an entirety of information, machine perception is more typically purpose-driven by focusing on useful details. For example, a detection task is different from a reconstruction/recovery task. Even among the detection tasks, different objectives (in the foreground or background) may result in different detection rates and difficulties. Intuitively, more detailed detection may be more challenging, which in turn may consume more computation power and transmission power and/or resources.

Besides the different targets, M2M communication is typically carried out via wireless communication and therefore wireless channel conditions may impact the feasibility of different targets. For example, in an extreme case, a full-detailed recovery task may become impossible or very bandwidth-expensive for a poor channel condition. Therefore, it may be beneficial to consider the task and channel together.

Last but not least is a consideration of the information itself. Not every IoT sensor might capture "good" information. For those with "poor" information, even if allocated more resources with excellent channel conditions, they may be unable to contribute to the final purpose.

However, integrating these three factors together when building a source coding scheme has historically been a difficult problem. Therefore, Shannon made a compromise and developed the source channel separation theorem. Some embodiments of the present disclosure leverage artificial intelligence (AI) or machine learning (ML) techniques to provide novel source coding schemes that integrate these factors, and therefore may offer performance gains relative to separate source and coding schemes.

Before discussing specific embodiments of the present disclosure, some background on AI/ML techniques and previous source coding schemes utilizing such techniques will now be provided, as well as a brief summary regarding the problems and/or limitations associated with those techniques/schemes.

Autoencoder

Figure 7A:
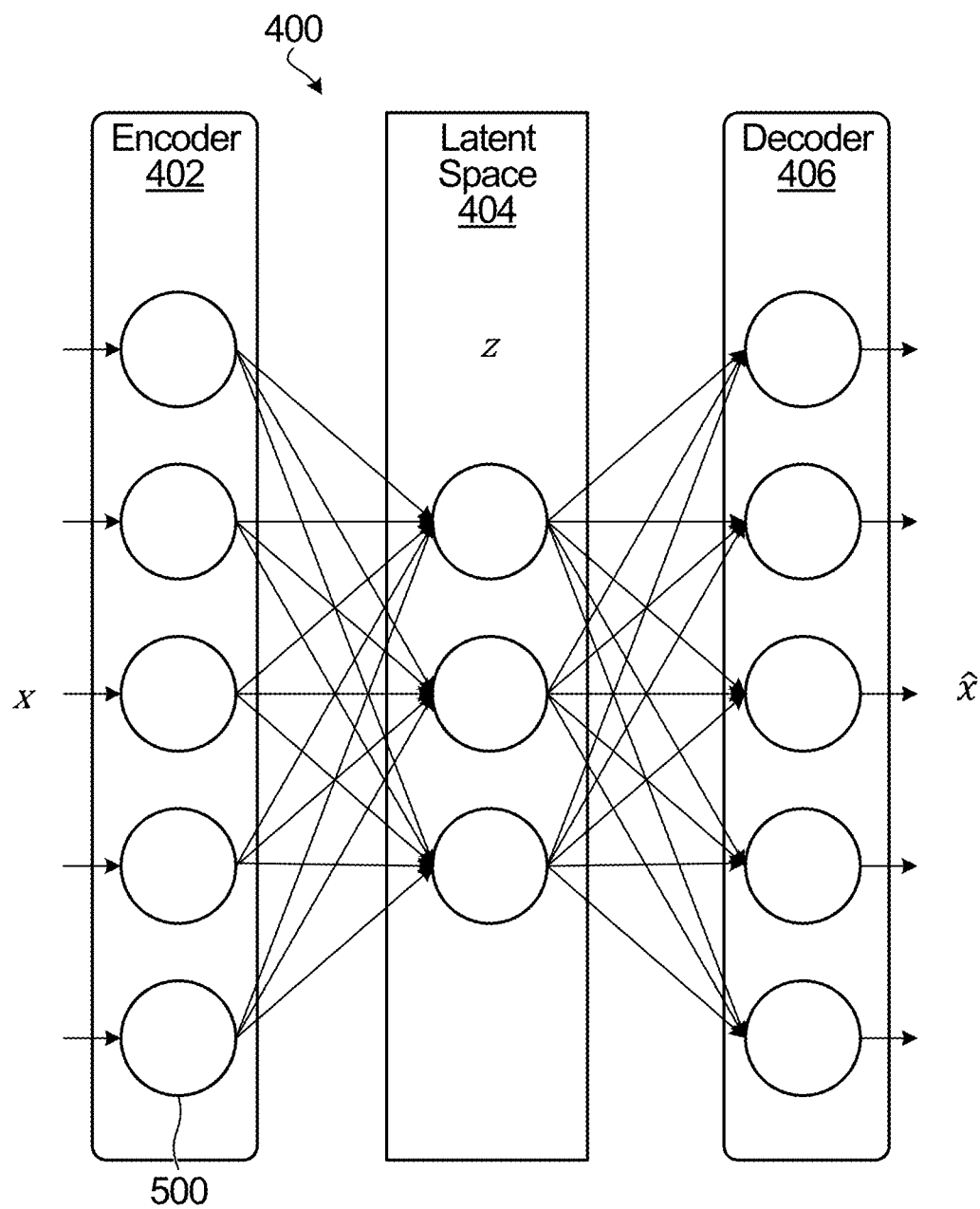
FIG. 7A illustrates an example of an autoencoder (AE) structure that includes an encoder, a latent space and a decoder.

The autoencoder (AE) is a type of artificial neural network (NN) with a particular architecture that is suited for specific applications. Unlike a classification or regression-purposed NN, an AE aims to reproduce its input vector x at the output vector x̂ with maximal accuracy. The caveat is that the AE has a hidden layer, called a latent space z, with a dimensionality less than that of the input layer. The latent space can be thought of as a compressed representation, and the layers before and after the latent space are the encoder and decoder, respectively. The latent space or dimensionality should be minimized in size while maintaining the accuracy of the decoder. FIG. 7A illustrates an example of an AE 400 that includes an encoder 402, a latent space 404 and a decoder 406. In this example, the encoder 402 input has a dimensionality of 5, which is reduced to 3 at the latent space 404 and expanded again to 5 by the decoder 406.

Figure 7B:
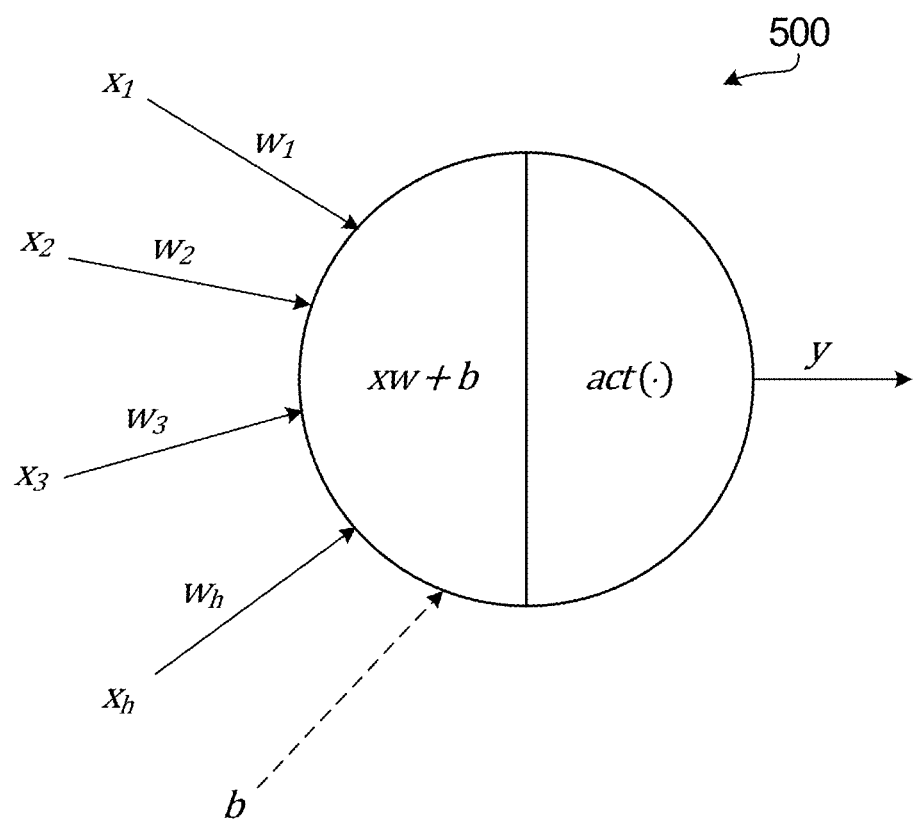
FIG. 7B illustrates an example of a neuron that may be used as a building block for a neural network.

The fundamental computation unit in a NN is the neuron, as shown at 500 in FIG. 7A. FIG. 7B illustrates an example of a neuron 500 that may be used as a building block for a NN. As shown in FIG. 7B, the neuron 500 takes a vector x as an input and performs a dot-product with an associated vector of weights w with a bias offset value b. The final output y is the result of a nonlinear activation function act( ) on the dot product.

A NN may have multiple "layers" of neurons. A layer in a NN comprises a series of h neurons. The outputs of each neuron in layer i act as the input vector to each neuron in the proceeding layer i+1. For example, referring again to FIG. 7A, it can be seen that the output of each of the five neurons in the output layer of the encoder 402 is included in the input vector to each of the three neurons in the latent space 404. Similarly, the output of each of the three neurons of the latent space 404 is included in an input vector to each of the five neurons in the decoder 406.

Recurrent Neural Network

A recurrent neural network (RNN) is a type of NN with an architecture that is suited towards working with sequences. An RNN is similar in operation to any other NN, except that there are multiple frames of input vectors. An RNN will accept a sequence of inputs and will use correlations between each time step in the sequence in computing the output. Correlations are detected between time steps using a feedback-based architecture; the outputs of each neuron serve as inputs to themselves for the next time step. Additionally, special neurons known as long short-term memory (LSTM) are specially designed for RNN architectures and make use of an additional feedback value known as the hidden state.

Figure 8:
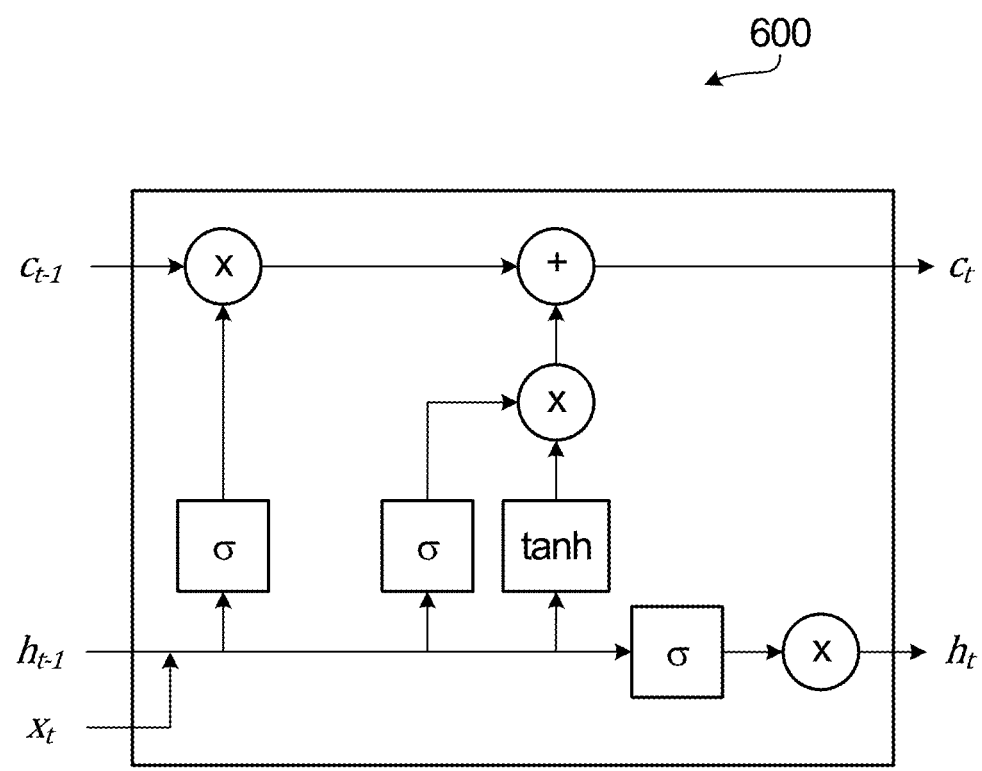
FIG. 8 illustrates an example of a long short term memory (LSTM) neuron that may be used as a building block for a recurrent neural network (RNN)

FIG. 8 illustrates an example of an LSTM neuron 600. As shown in FIG. 8, for each time step t, the LSTM neuron 600 will accept an input vector $x_t$, the output from the previous time step $h_{t-1}$, and the hidden state from the previous time step $c_{t-1}$. The LSTM neuron 600 will then compute an output $h_t$ and new hidden state $c_t$.

In FIG. 8, each line carries an entire vector, from the output of one node to the inputs of others. The circles represent pointwise operations, such as vector addition, whereas the rectangular boxes are learned neural network layers. Lines merging denote concatenation, and a line forking denotes its content being copied and the copies going to different locations. LSTM neurons can be arranged into a layer of any size, just as a conventional neuron. LSTM neurons require the storage of 4 times as many weights as a conventional neuron.

Variational Autoencoder

A variational autoencoder (VAE) is similar to an AE except the latent space is instead made up of a distribution rather than a deterministic value. Typically, the latent space is assumed to be a multivariate Gaussian distribution. However, VAEs are not limited to such distributions. For example, a latent space may be assumed to have a Bernoulli distribution in some cases.

Figure 9:
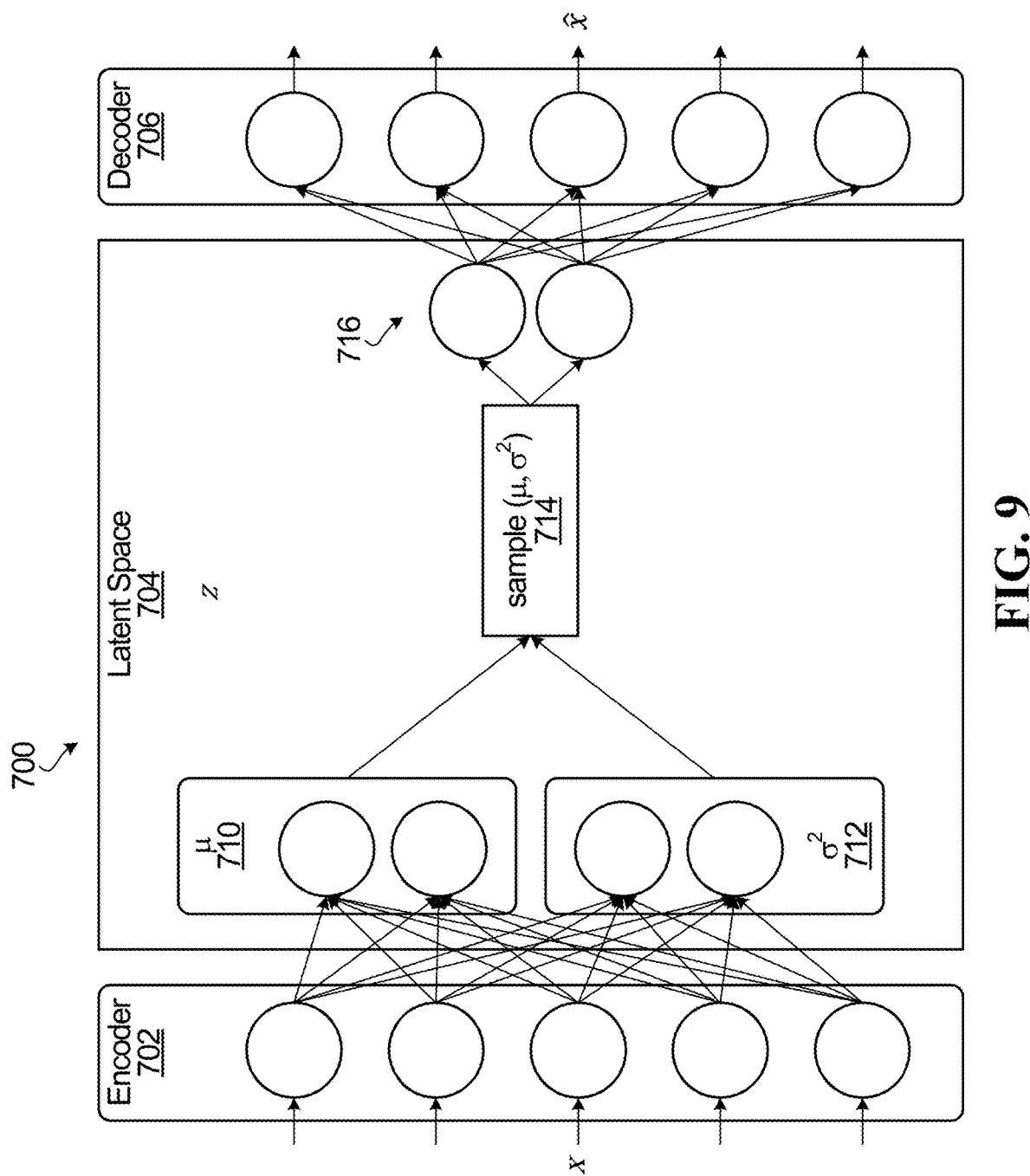
FIG. 9 illustrates an example of a variational autoencoder structure that includes an encoder, a Gaussian distributed latent space and a decoder.

FIG. 9 illustrates an example of a VAE 700 that includes an encoder 702, a Gaussian distributed latent space 704 and a decoder 706. On the forward pass of the VAE 700, the encoder 702 computes a set of means $\mu$ and variances $\sigma^2$ from the input x. In FIG. 9, the means $\mu$ and variances $\sigma^2$ generated by the encoder 702 are indicated at 710 and 712, respectively. The latent space 704 is then sampled according to those parameters, as indicated at 714 in FIG. 9, and the sampled values are passed to the decoder, as indicated at 716 in FIG. 9.

This change in the behavior of the latent space compared to an AE allows the VAE to perform useful tasks in the machine learning world. Rather than encoding to a compressed representation, the VAE encodes to a feature space that is specific to the source data. A feature space with known distribution allows, but is not limited to, the following facilities:

Natural regularization during training
Novel data/image generation by latent space sampling
Interpretable features for data manipulation VAEs are trained similarly to typical NNs: with back-propagation aimed at minimizing a reconstruction loss. However, VAEs additionally require a Kullback-Leibler (KL) divergence loss term to encourage the latent space to tend towards a target probability distribution, such as a Gaussian distribution. For example, the conventional KL term used for a Gaussian distributed latent space measures the distance between the current latent distribution and the unity Gaussian or normal distribution, $N(0,1)$. The training process attempts to minimize this divergence in addition to the reconstruction loss. Further, VAEs are not required to have Gaussian-distributed latent space. In theory, any arbitrary distribution will work. For example, binary Bernoulli distributions have been known to work as well, but may make training more difficult.

Feature-Based Communication Using VAE

Figure 10:
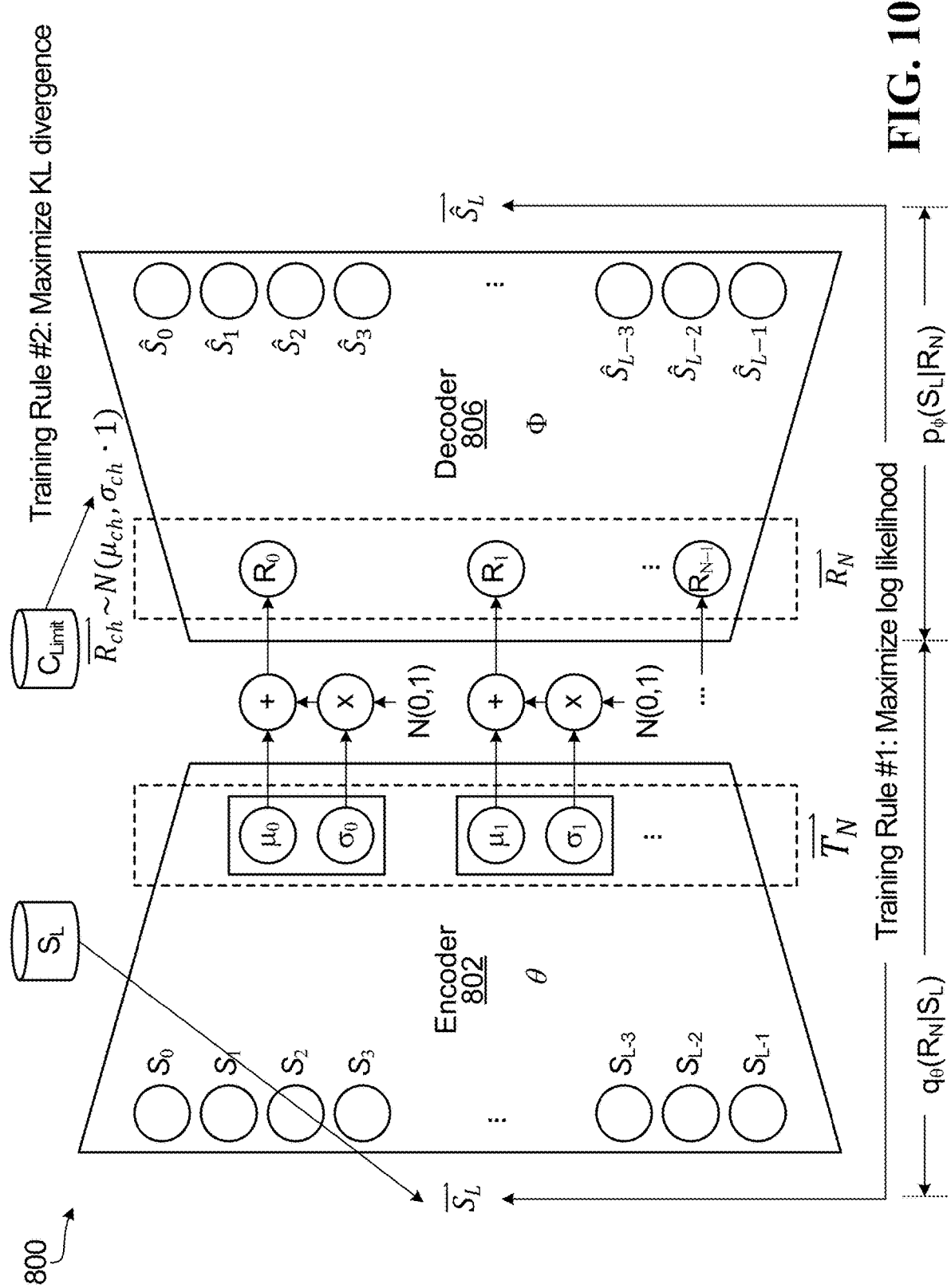
FIG. 10 illustrates an example of a VAE implementing a feature-driven source coding scheme.

A feature-driven VAE-based source code was proposed in U.S. patent application Ser. No. 16/884,892 filed on May 27, 2020 by G E et al. and entitled "METHODS AND SYSTEMS FOR RELAYING FEATURE-DRIVEN COMMUNICATIONS" (hereinafter G E et al.), which is hereby incorporated by reference in its entirety. FIG. 10 illustrates an example of a VAE 800 implementing the feature driven source coding disclosed in G E et al. The VAE is implemented by a DNN and includes an encoder 802 and decoder 806. The DNN is trained with the goal of reconstructing an L-dimensional set of information from the input of the encoder 802 at the output of a decoder 806 after the encoder has compressed the L-dimensional set of information to a smaller N-dimensional latent space (N<L). The training may be done using a deep learning back-propagation method, in which the reconstruction error at the output after a forward pass is propagated backwards to the weights of each layer of the DNN structure for iterative optimization. In the middle, N outputs $T_N$ are projected to a normal distribution by KL divergence. In this way, the neural network layers to generate these N distributions in the latent space are used as a source encoder 802, and the neural network layers to receive the noised N distributions $R_N$ and to recover the original information are used as a source decoder 806.

The decoder 806 in this example is a probabilistic decoder that aims to recover the L-dimensional set of raw information $S_L$, given the N-dimensional set of received features $R_N$. Mathematically, the feature decoder 806 outputs the L-dimensional set of recovered information given an N-dimensional set of received features $R_N$, based on the likelihood probability $p(S_L|R_N)$, and the received features $R_N$ may be treated as the latent layer. Correspondingly, the encoder 802 implements a probabilistic encoder that encodes the set of raw information $S_L$ into the set of received features $R_N$. Mathematically, the encoder 802 outputs the set of received features $R_N$ based on the likelihood probability $q(R_N)$.

Both the probabilistic encoder 802 and the probabilistic decoder 806 are jointly optimized to maximize the likelihood between $S_L$ and $S_L$ and to minimize the mutual information between $S_L$ and $R_N$ for a given subject and channel capacity limit. Optimization may be performed using a machine-learning based approach, with the aim of transmitting as much essential information as possible and consuming as little physical radio resource as possible.

First, consider the decoder 806 that receives an N-dimensional vector $\vec{R}_N$ of soft-values. The decoder 806 uses the likelihood probability $p(\ )$ to decode (or decompress) $\vec{R}_N$ into a vector $\vec{S}_L$. $\vec{S}_L$ is an L-dimensional signal, each dimension independently following a target probability distribution. For example, non-limiting examples of a target probability distribution could include a Gaussian distribution or a Bernoulli distribution. It should be noted that $L \neq N$, and typically $L > N$. Mathematically, this can be represented as:

$$\vec{R}_N = \begin{pmatrix} R_0 \\ \dots \\ R_{N-1} \end{pmatrix}; p(\vec{R}_N) \sim N(\vec{\mu}_R, \textstyle\sum_R)$$

$$\vec{S}_L = \begin{pmatrix} S_0 \\ \dots \\ S_{L-1} \end{pmatrix}; p(\vec{S}_L) \sim N(\vec{\mu}_S, \textstyle\sum_S)$$

where NO is a Gaussian distribution, $\vec{\mu}_R$ is a vector of the expectation value (or mean) of each received feature Gaussian distribution, $\vec{\mu}_S$ is a vector of the expectation value (or mean) of each recovered information Gaussian distribution, and $\Sigma$ is a covariance matrix.

In this example, it is assumed that $\vec{S}_L$, also has a Gaussian distribution; however, in other examples $\vec{S}_L$, may have, for example, a Bernoulli distribution. As shown, each of the N received features $\vec{R}_N$, i.e., $R_0$ to $R_{N-1}$, describes a respective probability distribution in terms of expectation value and variance. These values are inputted to the feature decoder 806, which converts $\vec{R}_N$ into a set of L recovered information $\vec{S}_L$. Because in this example $\vec{S}_L$ is assumed to be Gaussian distributed, each of the recovered information $\hat{S}_0$ to $\hat{S}_{L-1}$ describes a respective recovered probability distribution in terms of expectation value and variance. It should be noted that $L > N$, and the probability distributions recovered in $\vec{S}_L$ may be different from the probability distributions of the received features $\vec{R}_N$.

For a given $\vec{R}_N$, the probabilistic decoder 806 outputs $\vec{S}_{L\ L}$ using $p(\vec{S}_{L\ L}|\vec{R}_N)$. Mathematically, it is hard to exhaustively find $p(\vec{S}_{L\ L}|\vec{R}_N)$ in a high dimensional signal space. In examples described herein, a deep neural network (DNN) $p_\phi(\vec{S}_{L\ L}|\vec{R}_N)$ is used to approximate the true $p(\vec{S}_{L\ L}|\vec{R}_N)$, where $\phi$ is the set of the neuron weights and thresholds. A loss/reward function based on maximum log likelihood, with the input samples $\vec{R}_N$ and output samples $\vec{S}_{L\ L}$ is defined as follows:

$$\phi^* = \underset{\phi}{\operatorname{argmax}}\left\{E_{\vec{R}_N \sim p(\vec{R}_N), \vec{S}_L \sim p(\vec{S}_L)}[\ln(p_\phi(\vec{S}_L|\vec{R}_N))]\right\}$$

In theory, the DNN training can be done using stochastic gradient descent (SGD) backward propagation. If $p(\vec{S}_{L\ L})$ is a Bernoulli distribution, the maximum-log-likelihood becomes a cross-entropy measurement. If $p(\vec{S}_{L\ L})$ is a Guassian distribution, the maximum-log-likelihood becomes a mean square error (MSE) minimization.

However, in practice, this approach is not feasible. $\vec{R}_N$ includes the effect of added noise on $\vec{S}_{L\ L}$. How much noise is added affects the statistics of $\vec{R}_N$ and the noise is unknown to the DNN $p_\phi(\vec{S}_{L\ L}|\vec{R}_N)$. Mathematically, the DNN is required to search for a maximum likelihood (ML) optimal solution. It may not be possible for the DNN to fully explore the entire high dimensional space occupied by $\vec{R}_N$.

Similarly, the feature encoder 802 may be implemented using another DNN $q_\theta(\vec{R}_N|\vec{S}_L)$ where $\theta$ is the set of the neuron weights and thresholds for a probabilistic encoder. G E et al. teaches that $q_\theta(\vec{R}_L, \vec{S}_N)$ should meet the requirement that the information bottleneck is within the Shannon capacity of the channel. That is, $q_\theta(\vec{R}_L, \vec{S}_N)$ must compress $\vec{R}_L$ into an $\vec{S}_N$ that fits within the channel capacity $C_{limit}$. The information bottleneck may be conceptually thought of as the upper boundary of the mutual information between $\vec{R}_L$ and $\vec{S}_N$. Mathematically, this may be represented as:

$$I(\vec{R}_L, \vec{S}_N) \leq C_{limit}$$

where I( ) is mutual information, and where $C_{limit}$ can be calculated using the Shannon-Hartley theorem as follows:

$$C_{limit} = W\ln\left(1 + \frac{S}{N}\right)$$

where W represents the occupied bandwidth, S represents the signal power, and N represents the channel noise power. The ratio S/N may also be referred to as the signal-to-noise ratio (SNR).

The goal of the training is to make the joint probability $p_\phi(\vec{R}_L, \vec{S}_N)$ and the joint probability $q_\theta(\vec{R}_L, \vec{S}_N)$ as similar to each other as possible. The similarity between two probabilities can be indicated by their Kullback-Leibler (KL) divergence as follows:

$$KL(q_\theta(\vec{S}_L, \vec{R}_N) \| p_\phi(\vec{S}_L, \vec{R}_N)) = \int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N$$

The aim of training the DNN is to find $\langle\theta^*, \phi^*\rangle$ that minimizes this KL divergence, where the notation * indicates the weights $\langle\theta^*, \theta^*\rangle$ have been found by this optimization. In particular, the ideal case is KL=0, $q_\theta(\vec{S}_L, \vec{R}_N) = p_\phi(\vec{S}_L, \vec{R}_N)$. The minimization function may be represented as:

$$\langle\theta^*, \phi^*\rangle = \underset{\langle\theta,\phi\rangle}{\operatorname{argmin}}\{KL(q_\theta(\vec{S}_L, \vec{R}_N) \| p_\phi(\vec{S}_L, \vec{R}_N))\}$$

Although the DNN training to determine the set of neuron weights and thresholds would try to minimize the KL divergence between each distribution/feature and a normal distribution, i.e., N(0,1), their divergence distances are different. Some features would be closer than others. But all exhibit a Gaussian distribution profile including an expectation value and variance (or standard deviation) value.

The VAE-based source encoder 802 could be configured to only transmit the expectation values. The natural noise channel between the encoder 802 and the decoder 806 would add some noise over those expectation values. If the received signals fall in the Gaussian distribution profiled by the expectation and variance values, the VAE-based source decoder 806 could recover the original information with an error below the designed target. In this sense, VAE-based source code is purpose-driven: for two different purposes, two different tolerated recovery errors result in two source coding schemes (both encoder and decoder). Besides, a VAE-based source code is noise-tolerable. It is not necessary to ensure an error-free transmission over the features, because if the additive noises are within a reasonable range, the recovery target can still be ensured. This means that: 1) the VAE-based source coding scheme is lossy; and 2) a looser channel coding scheme may be possible.

Furthermore, we observe that some features may have smaller variances than others, which means that they are more vulnerable to channel noise. By determining the variance values of the distributions/features given a target/purpose, it is possible to determine which features can tolerate more noise and which cannot. It should be noted that if the training target is changed, the variances of these features (even if the number of features is unchanged) may be changed as well.

Because the VAE source coding scheme disclosed in G E et al. can result in a number of features with different vulnerabilities to noise (i.e., features having different variances), they have to be protected differently for transmission over a hostile channel. In G E et al., sub-channelization based on the variance values is proposed in order to provide different protection to different features. In particular, features with similar variance values are grouped together into one sub-channel that is subjected to one channel coding scheme and modulation scheme. For the smaller-variance sub-channels, more robust channel coding schemes can be allocated, such as lower coding rate and lower modulation order, in order to provide a higher level of protection. For the larger-variance sub-channels, less robust channel coding schemes can be allocated, such as higher coding rate and higher modulation orders.

In theory, the VAE-based source coding and sub-channelization based channel coding schemes disclosed in G E et al. have some important advantages in terms of efficient channel usage. In other words, they serve to couple a source coding scheme and a channel coding scheme more closely in order to efficiently utilize available channel bandwidth.

In conventional source coding schemes, original source information is coded into a number of i.i.d bits that must be treated equally, because each of them is equally important for a source decoder, and therefore a uniform channel coding (and modulation) scheme would be chosen in term of the most vulnerable bits. In contrast, in the VAE-based source coding disclosed in G E et al., the distributions/features into which original source information is encoded are not equally important (distributions/features having higher variances are considered to be more important).

As discussed earlier, Shannon's source channel separation theorem can be viewed as a compromise in the face of the historical difficulties associated with integrating the three factors of differing tasks, differing channel conditions and differing information topologies when building a source coding scheme.

G E et al. tries to use VAE to solve the above problem. For example, the back-propagation-based training of the VAE structure disclosed in G E et al. passes the target from the last layer to the first layer of the VAE so that the training of the VAE takes into account the target/purpose of the communication, i.e., the source encoder and decoder are trained to implement a particular target/purpose.

The VAE contains an inherent statistical structure; the input is encoded to a feature space (also referred to as a latent space) that is sampled before the decoder. Alternatively, the VAE can be viewed as a new type of communication model that aims to transmit only the features, or the minimum essential information, across a noisy channel. The means of the features can be thought of as the transmissible data, and the sampling process can be thought of as the transmission over unreliable media. So long as the feature variance is compatible with the reliability of the channel, the VAE can decode successfully. For example, suppose an input is encoded to a feature space with a single Gaussian distribution with mean=1 and variance=0.5, a value of 1 can be transmitted across an AWGN channel with variance 0.5 or less and then be decoded. This process works the same way as though the feature space were sampled in the conventional VAE method.

This new viewpoint of the VAE transforms it into a type of source code. The source code is designed specifically for a particular dataset through VAE training. For example, this method can be used to encode data that is real-valued (e.g., in a Gaussian distribution) or binary-valued (e.g., in a Bernoulli distribution). The foregoing are merely non-limiting examples; Complex numbers or other discrete non-binary alphabets are feasible as well, for example.

Figure 11A:
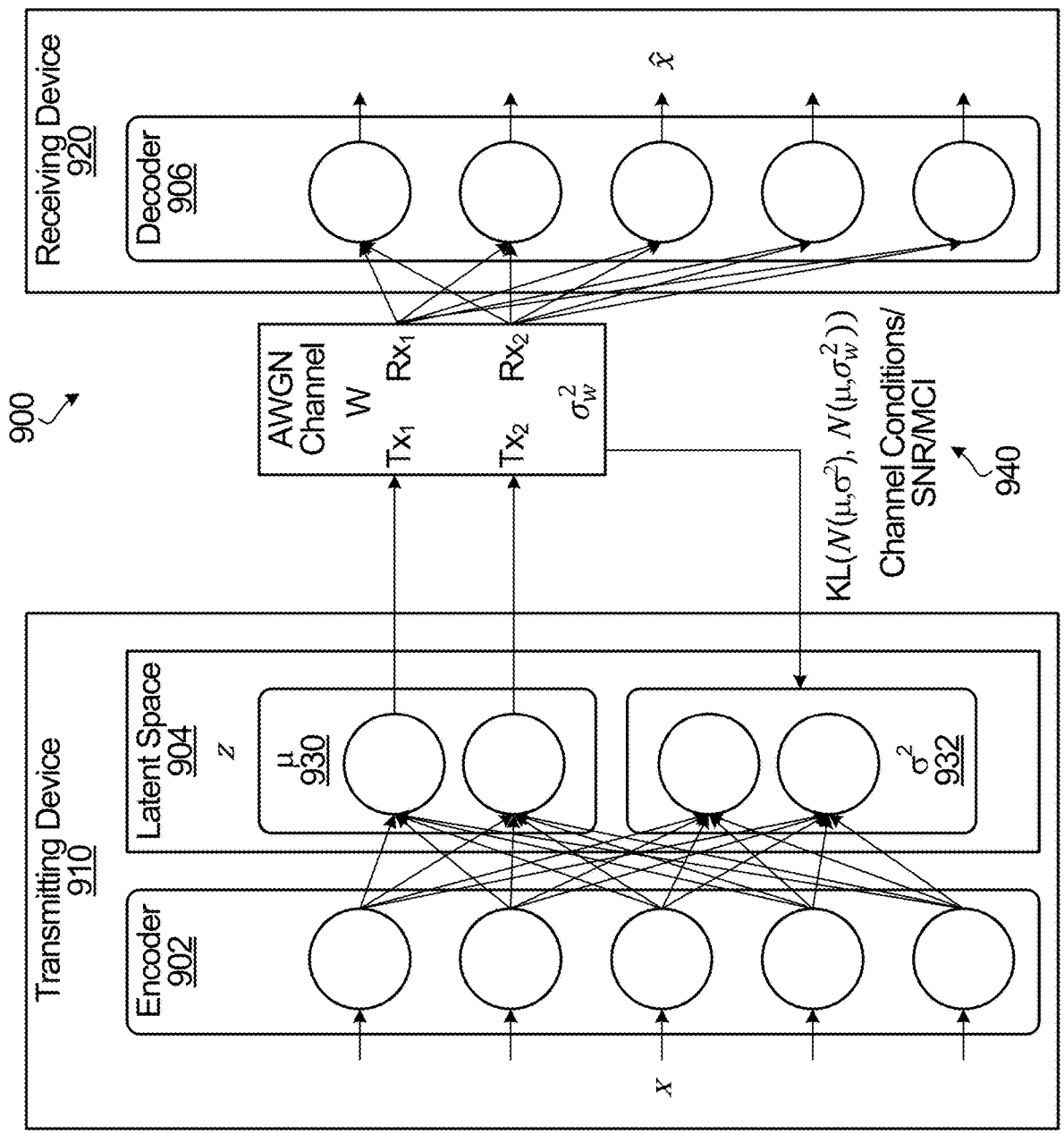
FIG. 11A illustrates an example of a VAE-based transceiver chain that includes a Gaussian distributed latent space.

For example, FIG. 11A illustrates an example of a VAE-based transceiver chain 900 that includes a Gaussian distributed latent space 904. In particular, in this example the VAE-based transceiver chain 900 is between a transmitting device 910 and a receiving device 920, and includes an encoder 902 and latent space 904 at the transmitting device 910, a transmission channel W that is modeled as an Additive White Gaussian Noise (AWGN) channel, and a decoder 906 at the receiving device 920.

In operation, the encoder 902 computes a set of means μ 930 and variances $\sigma^2$ 932 from the input x. The set of means μ 930 in the latent space 904 are then sampled, and the sampled mean values are transmitted to the receiving device 920 over the AWGN channel W. As indicated at 940 in FIG. 11A, the DNNs of the encoder 902 and decoder 906 are trained with back-propagation that includes a KL divergence loss term to encourage the latent space 904 to tend towards the Gaussian distribution of the AWGN channel W, i.e., $N(\mu, \sigma_W^2)$. The KL term measures the distance between the current latent distribution and the Gaussian distribution of the AWGN channel W. In this example, the training process may attempt to minimize this divergence in addition to the reconstruction loss. In addition, as shown at 940 in FIG. 11A, the training process may further take into account other channel conditions, such as SNR or multi-code interference (MCI).

Figure 11B:
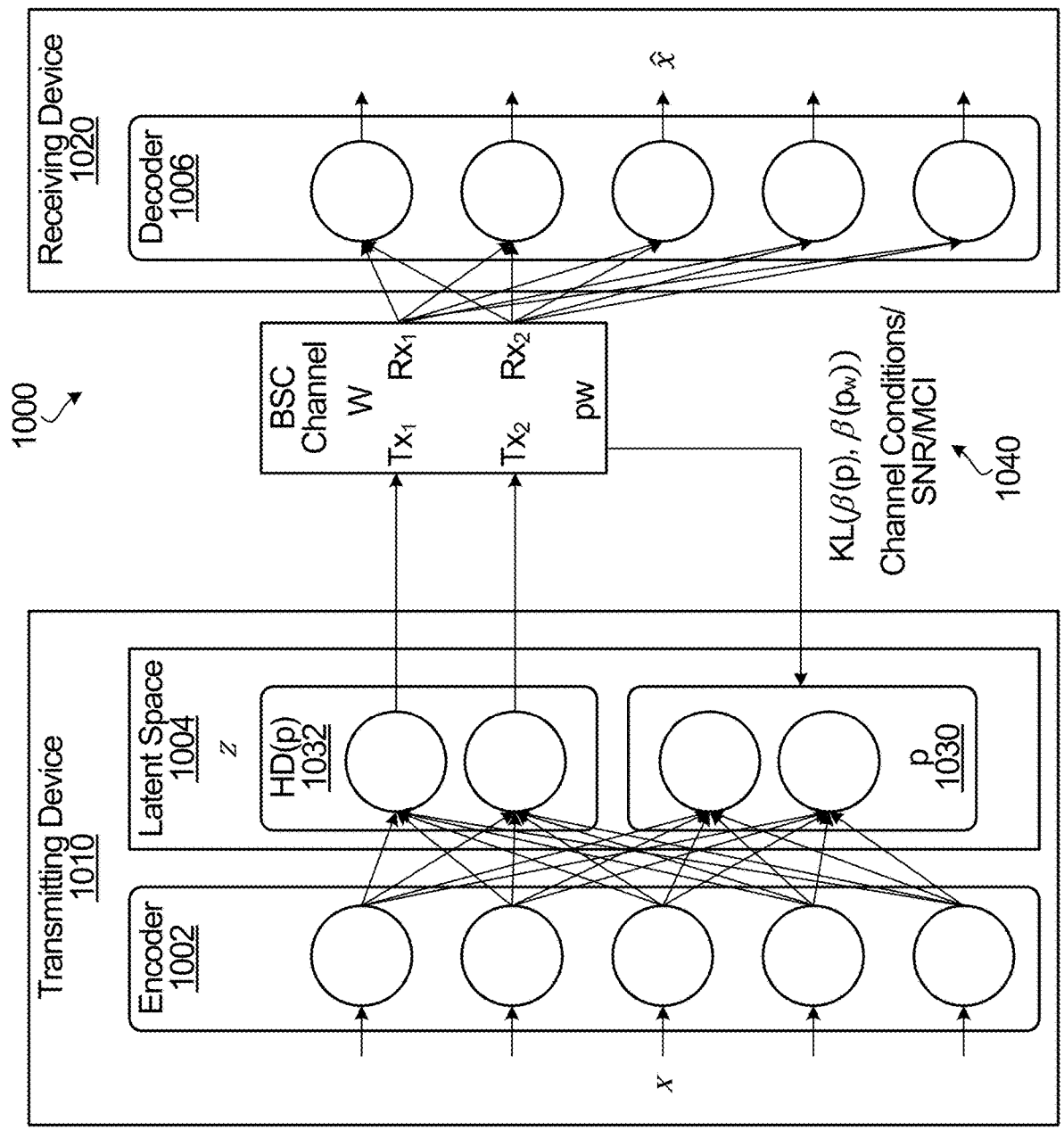
FIG. 11B illustrates an example of a VAE-based transceiver chain that includes a Bernoulli distributed latent space.

As noted above, VAEs are not required to have Gaussian-distributed latent spaces. For example, FIG. 11B illustrates an example of a VAE-based transceiver chain that includes a Bernoulli distributed latent space 1004. In particular, in this example the VAE-based transceiver chain 1000 is between a transmitting device 1010 and a receiving device 1020 and includes an encoder 1002 and latent space 1004 at the transmitting device 1010, a transmission channel W that is modeled as a Binary Symmetric Channel (BSC) having a bit flip probability of $p_w$, and a decoder 1006 at the receiving device 1020.

In operation, the encoder 1002 computes a set of features by computing a set of probabilities p 1030 from the input x. Each feature has a higher probability of resulting in either a "1" or a "0" depending on p. To transmit the features, they are "sampled" by taking the hard decision (HD) of p, as indicated at 1030, and then sent across the transmission channel W as binary values. Each feature has a Bernoulli probability of either $p_w$ or 1-$p_w$, where $p_w$ is the bit flip probability of the BSC channel W. As indicated at 1040 in FIG. 11B, the DNNs of the encoder 1002 and decoder 1006 are trained with back-propagation that includes a KL divergence loss term to encourage the latent space 1004 to tend towards the Bernoulli distribution of the transmission channel W, i.e., $B(p_w)$. The KL term measures the distance between the current latent distribution and the Bernoulli distribution of the BSC channel W. In this example, the training process may attempt to minimize this divergence in addition to the reconstruction loss.

The VAE-based source coding is not channel-ready. For each encoded feature, there must be an assurance that the channel is compliant with the feature distribution. In most communication schemes, a channel code is introduced to the data to mitigate channel uncertainty. In order to avoid the need for channel coding after source coding, the source coding scheme should ensure that the features into which the raw/source information are encoded by the source coding are compliant with the channel distribution. However, as described below with reference to FIG. 12, the existing VAE structure offers no method to accomplish this goal.

Figure 12:
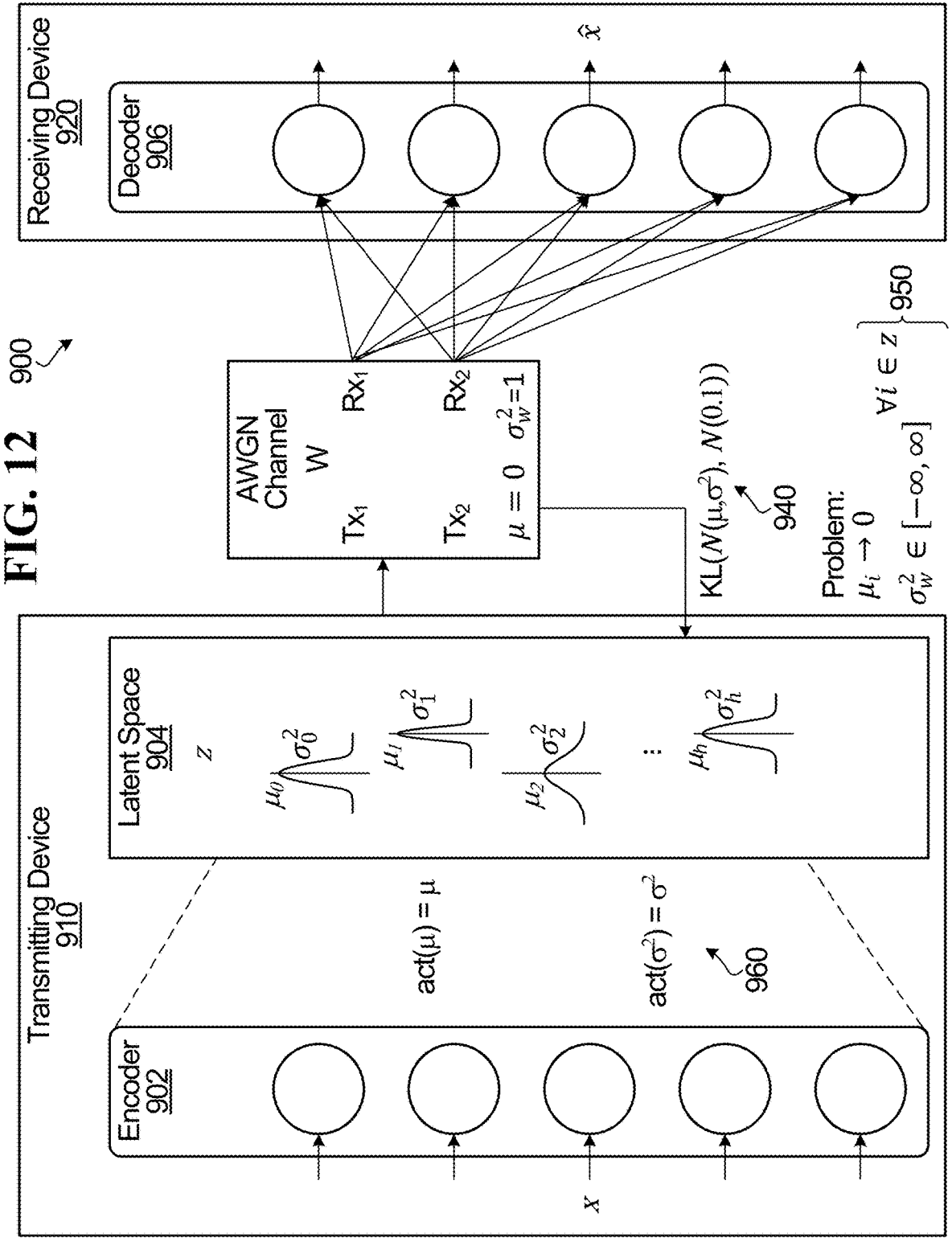
FIG. 12 illustrates the VAE-based transceiver chain of FIG. 11A after conventional VAE training using the unity Gaussian distribution, N(0,1), as the prior distribution.

Firstly, in a conventional VAE structure with a Gaussian distributed latent space, the latent space is encouraged during training to tend toward a unity Gaussian distribution, N(0,1), which is known as the prior distribution. For example, FIG. 12 illustrates the VAE-based transceiver chain 900 of FIG. 11A after conventional VAE training using the unity Gaussian distribution, N(0,1), as the prior distribution, i.e., $\mu=0$ and $\sigma_W^2=1$, as indicated at 940 in FIG. 12. The selection for this particular prior distribution offers certain simplicity for machine learning methods but is generally not useful for the feature-based communication model. For example, a mean target of 0 contains no useful feature information, particularly for a large feature space. Further, a constant variance of 1 will rarely accurately reflect the channel conditions.

Secondly, the NN architectures typical of a VAE encoder have final layers with linear activation functions, as indicated at 960 in FIG. 12. Linear activation functions produce unbounded outputs, which in the example depicted in FIG. 12 means that the values of the means, i.e., $\mu_i$, and the variances, i.e., $\sigma_i^2$, are unbounded. An unbounded mean in the Gaussian case assumes that the features can take on any real value, which may not be necessarily true in practice (e.g., physical transmission schemes will likely present constraints on transmissible alphabets/constellations). Also, an unconstrained variance suggests that the latent space may contain information that is more reliable than the transmission channel over which the features are to be transmitted, i.e., having a variance higher than the variance of the transmission channel. Transmitting any such feature could result in an error. Further, in the standard VAE structure, each encoded feature can include a unique variance, indicating that some features are more robust than others. For example, in the example shown in FIG. 12, the variances of the features differ such that $\sigma_2^2 > \sigma_0^2 > \sigma_1^2$. An inequality in reliability such as this may require transmission of different features on different channels or with different transmission schemes, such as the sub-channelization transmission scheme disclosed in G E et al., in order to accommodate the differences. This might require undesirable sorting procedures and additional signaling overhead. For example, in the sub-channelization transmission scheme disclosed in G E et al., in order to establish an efficient transmission of information over a given channel to fulfill a given task, a number of the sub-channels and their associated channel coding and modulation schemes have to be carefully established. Establishing the sub-channels between the transmitting device and the receiving device can involve the exchange of a significant amount of messages and control information related to the sub-channels between the two devices. Along with the increase in the complexity of the system, the signaling overhead associated with establishing the sub-channelization can become so significant that it degrades the efficiency of the system overall.

Embodiments of the present disclosure include methods and apparatuses that provide VAE-based source coding schemes that overcome or at least mitigate at least some of the problems of the conventional VAE-based source coding schemes discussed above.

For example, some embodiments of the present disclosure provide methods and apparatuses for VAE-based source coding in which the VAE-based source coding scheme can be optimized for any reference prior distribution. For example, rather than training based on divergence from a normal distribution N(0,1), in some embodiments of the present disclosure the DNN that implements the encoder of the VAE may be optimized for any variance (e.g. a variance reflective of the transmission channel over which features are to be transmitted), while allowing the means of the encoded features in the latent space to float freely without penalty.

Furthermore, in some embodiments of the present disclosure, the latent space of the VAE is constrained so that distribution parameters of the probability distributions of the encoded features in the latent space are bounded. For example, for a Gaussian distributed latent space in which each feature in the latent space is characterized by a mean and a variance, both the means and variances of the features may be constrained to predetermined bounds, as described in further detail below. For example, some embodiments of the present disclosure provide a variable-length but asymptotic equi-partition (AEP) source code in which every training features has an equal variance. As a result, there is no need for the sub-channelization that is done as part of the VAE-based feature-driven communication scheme described in G E et al.

Enforced Variational AutoEncoder (EVAE)

A VAE configured to enforce constraints on the distribution parameters of its latent space in accordance with the present disclosure is referred to herein as an enforced VAE (EVAE). This is a fundamental change that enables the VAE-based source coding scheme of the present disclosure to be used with legacy channel coding schemes rather than requiring the specialized sub-channelization described in G E et al. Moreover, the EVAE-based source coding scheme of the present disclosure can be used with a legacy channel coding scheme or directly on the channel. An EVAE in accordance with an embodiment of the present disclosure can potentially be trained for either scenario.

As noted above, most conventional VAE schemes make use of a Gaussian-distributed latent space. However, as also discussed above, in a conventional VAE scheme the latent space is under no constraint in its distribution parameters. The features can theoretically take on any variance with any mean, even if this is not likely to occur. As explained above, the cause for this is that the encoder of a VAE computes the means and variances of a Gaussian distributed latent space with linear activation functions. A linear activation can take on any real value, thus there are no bounds on the distribution parameters. The EVAE changes the encoder computation to provide user-defined restrictions on the distributions. In the Gaussian case, the EVAE can place hard bounds on the mean of the feature space, and can enforce a minimum variance. In the Bernoulli case, the EVAE can enforce a minimum flip probability, so that the resulting Bernoulli distributed latent space has features that bit flip at least as often as the channel. More generally, it is noted that the EVAE-based coding techniques disclosed herein can be applied to any type of distribution and are not limited to Gaussian or Bernoulli distributions. For example, the concepts disclosed herein can be applied to more complex distributions that represent different types of fading channels or MIMO applications. In general, an EVAE is configured so that the latent space is at least as, or equally as, unreliable as the channel, such that the transmitted features match the channel capacity or the entropy of the channel. For example, entropy is a measure of uncertainty, or unreliability, of a random process, and in some embodiments an EVAE is configured to enforce constraints on the latent space so that features of the latent space have an entropy that matches or exceeds that of the channel.

The sampled latent space of a VAE represents the channel over which features of the data space are to be transmitted. As discussed above, the KL term in the loss function for training a conventional VAE measures the difference between the latent space and a unit Gaussian distribution (or normal distribution) N(0,1), which is known as the prior distribution. In the context of a VAE-based feature-driven communication, the mean of the Gaussian distribution represents the value to be transmitted, and the variance represents the noisy channel conditions. In G E et al., the resulting latent distributions were sorted according to the variances (reliability) and then transmitted on physical channels (having corresponding modulation and coding scheme (MCS) indexes) configured to maintain that reliability. However, this approach neglects the cooperation between the source and the channel. In other words, although some existing coding schemes involve performing channel coding according to source conditions, they do not disclose performing source coding according to the channel conditions.

Some embodiments of the present disclosure provide VAE-based source coding in which both source and channel conditions are considered. For example, in some embodiments, a different prior distribution $N(0, \sigma_W^2)$ that is reflective of the channel conditions may be used rather than the typical unity distribution $N(0,1)$. In some embodiments, the sigma $\sigma_W$ may pertain to some particular SNR, such as the SNR of a transmission channel W over which features encoded by the VAE may be transmitted, for example. In general, it may be assumed that a higher variance corresponds to a deteriorated channel.

The KL divergence loss term used to train the DNNs of the VAE is changed to accommodate the new prior distribution. For example, when both the prior distribution $p(z) = N(0, \sigma_W^2)$ and the posterior approximation $q(z|x^{(i)})$ are Gaussian distributions, letting $\mu$ and $\sigma$ denote the latent space mean and standard deviation values evaluated at datapoint i, then:

$$\int q(z)\log p(z)dz =$$

$$\int N(\mu, \sigma^2)\log N(0, \sigma_W^2)dz = -\frac{1}{2}\log 2\pi\sigma_W - \frac{1}{2\sigma_W^2}(\mu^2 + \sigma^2)$$

And $$\int q(z)\log q(z)dz = \int N(\mu, \sigma^2)\log N(\mu, \sigma^2)dz = -\frac{1}{2}\log 2\pi - \frac{1}{2}(1 + \log \sigma^2)$$

Therefore $$-D_{KL}(q(z)\|p(z)) = \int q(z)(\log p(z) - \log q(z))dz =$$

$$-\frac{1}{2}\log 2\pi\sigma_W - \frac{1}{2\sigma_W^2}(\mu^2 + \sigma^2) + \frac{1}{2}\log 2\pi + \frac{1}{2}(1 + \log \sigma^2) =$$

$$-\frac{1}{2}\log \sigma_W - \frac{1}{2\sigma_W^2}(\mu^2 + \sigma^2) + \frac{1}{2}(1 + \log \sigma^2)$$

Here it can be seen that if the prior distribution is configured as the unity or normalized Gaussian distribution $N(0,1)$, i.e., if $\sigma_W^2=1$, then the generalized KL loss term, i.e., $-D_{KL}(q(z)\|p(z))$, reduces to $\frac{1}{2}(1+\log \sigma^2-\mu^2+\sigma^2)$ which is the original loss term for a normalized Gaussian prior distribution. Using this new generalized KL loss term, ineffective latent distributions (i.e., the collection of latent variables that do not take on unique means and variances) collapse to the desired prior distribution. In some cases, the feature space can be shrunk by omitting such "ineffective" latent variables/features.

This change to the KL term in the loss function offers more flexibility, and helps the neural network become close to optimal, but does not offer any guarantee of optimality nor any guarantee of the resulting distribution. This is due to the VAE network node architecture itself. Because the encoder side of the VAE predicts the Gaussian distributions using linear layers for both the means and log-variances, the distribution parameters of a conventional VAE are unbounded, i.e.:

$$\mu \in \{-\infty, \infty\}$$

$$\log \sigma^2 \in \{0, \infty\} \rightarrow \sigma^2 \in \{-\infty, \infty\}$$

The problem with this lack of bounds is that the mean could exist outside of some application-specific constraints, namely $[\mu_{min}, \mu_{max}]$. Further, the feature variance might be less than that of the channel, allowing the channel to disrupt feature values beyond the capacity of the decoder, i.e. $[0,\infty]\cap[\sigma_W^2,\infty]=[0,\sigma_W^2)<\sigma_W^2$.

In contrast, an EVAE in accordance with an aspect of the present disclosure provides a modified VAE that is able to guarantee some constraints on the latent space distribution which is typically uncontrolled in a conventional VAE.

For example, as discussed above with reference to FIG. 12, in a conventional VAE with a Gaussian latent space, the mean and variance are encoded by a latent hidden layer with linear activation functions, i.e., $act(\mu)=\mu$ and $act(\sigma^2)=\sigma^2$, as indicated at 960 in FIG. 12. In contrast, in an EVAE in accordance with an aspect of the present disclosure, these activation functions are changed to enforce constraints on the latent space distribution based on the requirements of a communication system in which the EVAE is intended to operate. For example, for a Gaussian distributed latent space, and EVAE in accordance with an embodiment of the present disclosure may be configured to enforce bounds on the means and variances of the probability distributions over the latent space. As will be discussed in further detail below, in some cases the EVAE uses non-linear activation functions to enforce the constraints on the distribution parameters of the probability distributions over the latent space.

Figure 13:
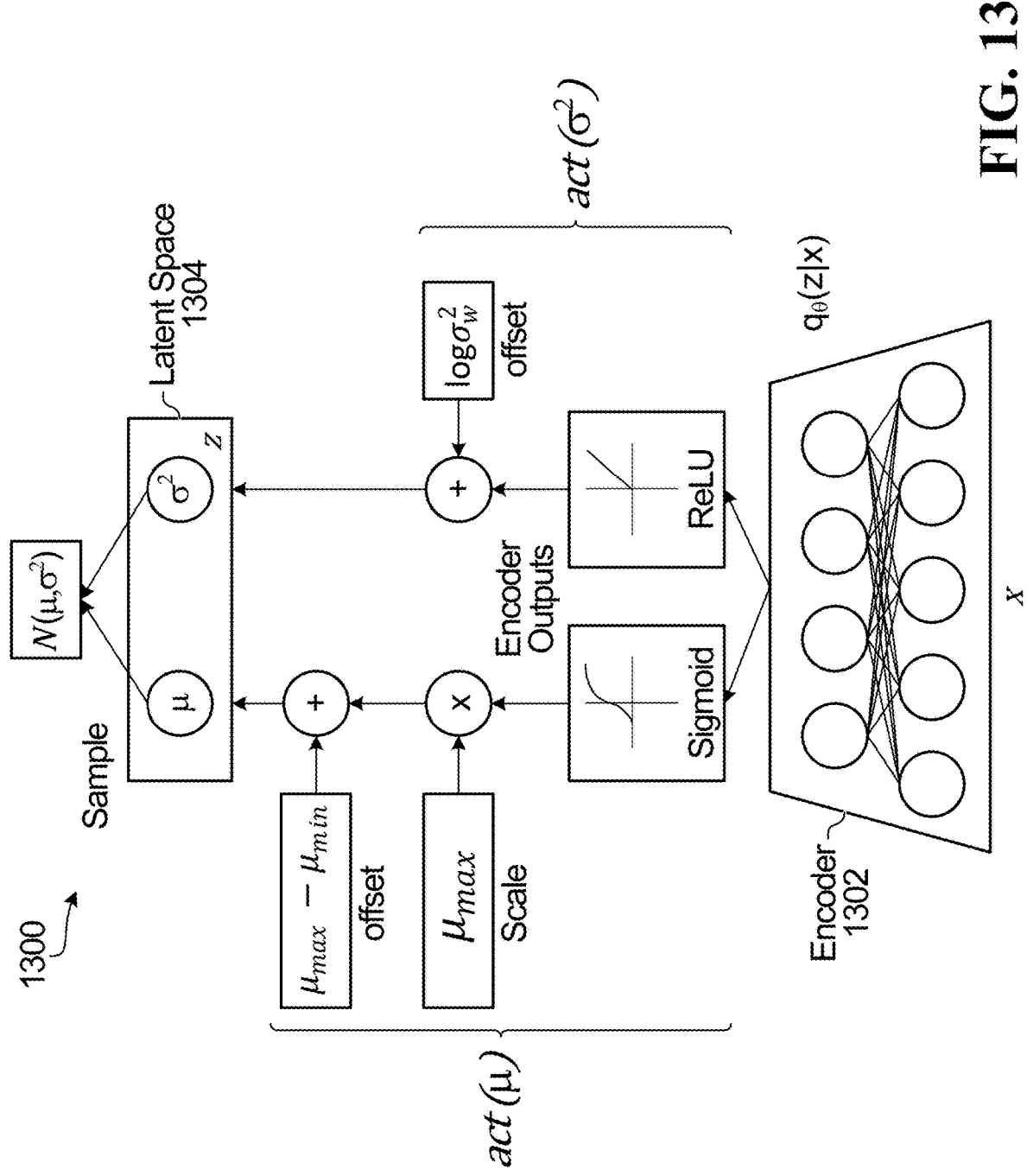
FIG. 13 illustrates an example of the encoder portion of an enforced VAE (EVAE) in accordance with an embodiment of the present disclosure.

For example, FIG. 13 illustrates an example of the encoder portion 1300 of an EVAE in accordance with an embodiment of the present disclosure in which non-linear activation functions $act(\mu)$ and $act(\sigma^{-2})$ are used to constrain the means $\mu$ and variances $\sigma^{-2}$ of probability distributions over a Gaussian distributed latent space 1304. In this example, the mean $\mu$ is encoded by an DNN encoder 1302 using a sigmoid function $\sigma(\ )$ that is scaled by desired bounds $[\mu_{min}, \mu max]$, e:

$$act(\mu)=(\mu_{max}-\mu_{min})\alpha(\mu)+\mu_{min}$$

This activation ensures that the mean will always remain within these bounds and maintain differentiability for training. The sigmoid function $\sigma(\mu)$ may be the logistics function:

$$\sigma(\mu) = \frac{1}{1+e^{-\mu}} = \frac{e^\mu}{e^\mu+1}$$

Other sigmoid functions that may be used in some embodiments of the present disclosure could include, but are not limited to, the hyperbolic tangent function, the arctangent function, the Gudermannian function, the error function, and the smoothstep function.

In this example, the variance $\sigma^2$ is encoded using a ReLU (rectified linear unit) activation plus an offset equal to the log of the variance $\sigma_W^2$ of the channel:

$$act(\sigma^2)=ReLU(\log \sigma^2)+\log \sigma_W^2$$

The latent space 1304 is then guaranteed to be at most as robust as the channel, i.e., the probability distributions in the latent space 1304 will have variances at least as large as the variance of the channel. Using these modified activations, we can ensure that:

$$\mu \in [\mu_{min}, \mu_{max}]$$
$$\sigma^2 \in [\sigma_W^2, \infty]$$

Thus, the NN architecture of the Gaussian EVAE ensures that the feature means sampled from the latent space 1304 (i.e., the values to be transmitted to a receiving device) adhere to some physical restrictions of any application. Similarly, the reliability of the features is guaranteed to match that of the channel.

An EVAE in accordance with an embodiment of the present disclosure offers a constraint on the distribution of the feature space, which was previously not available for VAEs. These constraints can be configured to suit the application. For example, the constraints could be configured to reflect the transmission channel conditions or any physical limitations of any wireless protocols. A VAE makes use of a feature space that is unbounded in distribution. In the case of Gaussian features, a VAE may produce means that are not physically permissible or variances that are more reliable than the channel can support. The unbounded VAE features would require additional overhead and careful algorithm design in order to be useful. The hard constraints imposed by an EVAE in accordance with an embodiment of the present disclosure can potentially allow this entire step to be bypassed. For example, the source coding scheme implemented using an EVAE can be designed directly for the channel or wireless protocols that are available. In the case of an AWGN channel W with a variance $\sigma_W^2$, the latent space of an EVAE in accordance with an embodiment of the present disclosure can be forced to have a minimum variance of $\sigma_W^2$. This ensures that a sufficiently trained EVAE decoder in accordance with an embodiment of the present disclosure is able to decode the encoded feature values transmitted across such a channel. Similarly, a particular wireless protocol may impose a restriction on what values are transmissible. For example, perhaps a certain modulation scheme only allows real values between 0 and 1 to be encoded into the wireless space. An EVAE in accordance with an embodiment of the present disclosure allows a bound to be placed on the means of the Gaussian features such that any such restrictions can be accommodated.

Further, unlike a conventional VAE, an EVAE in accordance with an embodiment of the present disclosure forces each feature to adhere to the same constraints. Because each feature must have the same minimum variance, all features can safely be transmitted across the same channel. No sorting or resource block allocation needs to be carried out for any individual features. In other words, an EVAE in accordance with an embodiment of the present disclosure can be configured so that the encoded features are all equally channel-ready.

Figure 14:
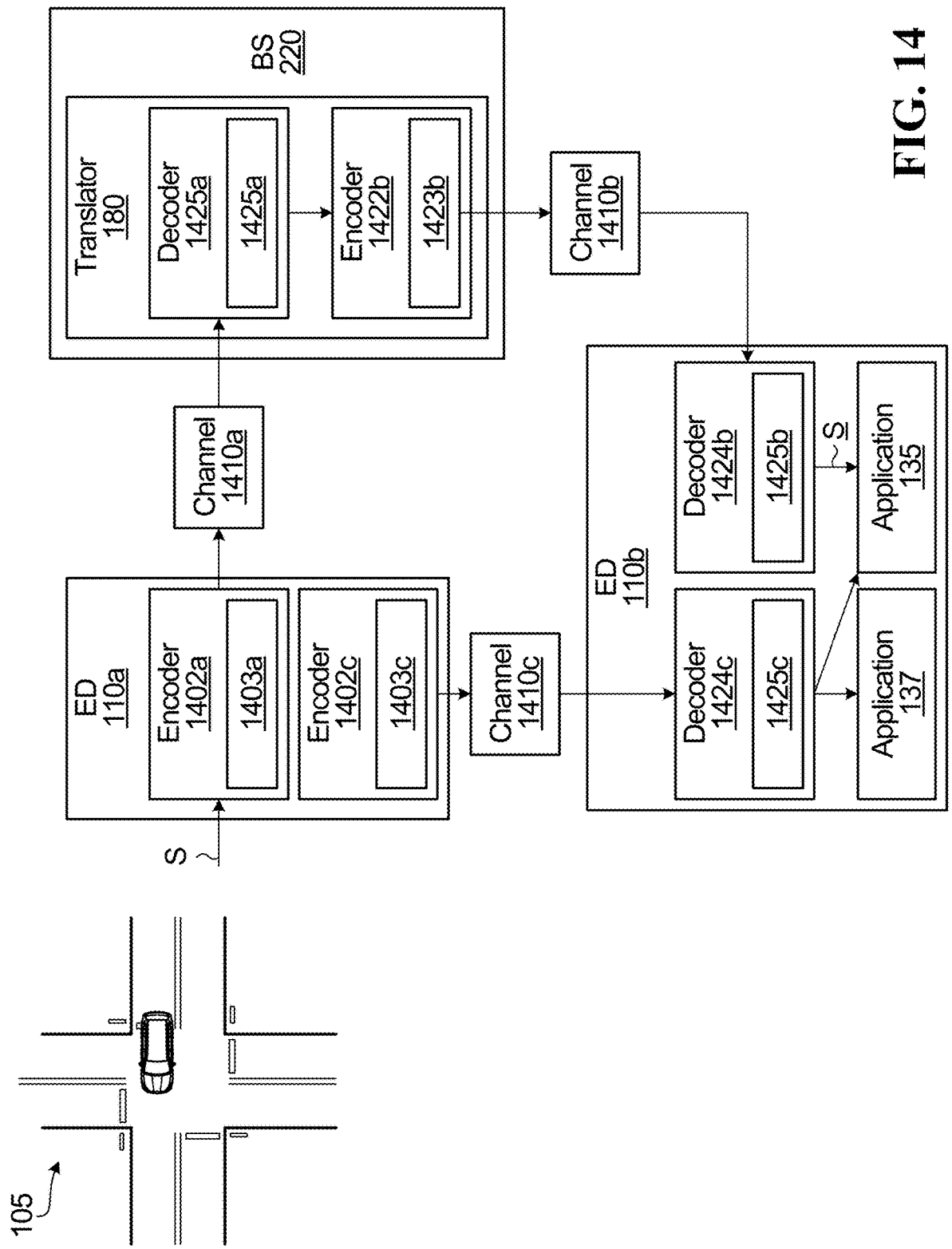
FIG. 14 is a simplified block diagram illustrating an example transceiver chain for EVAE-based feature-driven communications from a transmitting ED to a receiving ED.

An example of how the advantages of an EVAE may be leveraged for feature-based communication in the context of the system 100 shown in FIG. 5 will now be described with reference to FIG. 14. FIG. 14 is a simplified block diagram illustrating an example transceiver chain for EVAE-based feature-driven communications from the transmitting ED 110*a* to the receiving ED 110*b* of the system 100 shown in FIG. 5. It should be understood that the roles of transmitting and receiving may be reversed. FIG. 14 shows a single transmitting ED 110*a* and a single receiving ED 110*b* for simplicity only; in other examples there may be more than one transmitting ED 110*a* observing the same subject 105 and/or there may be more than one receiving ED 110*b* requesting information about the subject 105. The uplink (UL) transmission from the transmitting ED 110*a* to the BS 220 is transmitted over an UL channel 1410*a*, and downlink (DL) transmission from the BS 220 to the receiving ED 110*b* is transmitted over a DL channel 1410*b*. Any nodes that may be traversed by the UL or DL transmission may be modeled as part of the respective UL or DL channel 1410*a*, 1410*b*.

The receiving ED 110*b* may implement the machine application 135 for processing the information (or may forward the information to another entity for further processing). In this example, feature-driven transmission from the transmitting ED 110*a* to the receiving ED 110*b* is facilitated by the BS 220, which implements the translator 180.

In FIG. 14, the transmitting ED 110*a* obtains a set of collected information S about the observed subject 105. The transmitting ED 110*a* uses a probabilistic joint source-channel encoder 1402*a* that implements an EVAE encoder 1403*a* to extract features from the raw information to form a set of channel-ready transmission features as described herein. For example, if the uplink channel 1410*a* between the transmitting ED 110*a* and the BS 220 is an AWGN channel, the EVAE encoder 1403*a* of the joint source-channel encoder 1402*a* may be configured to enforce constraints on the means and variance of its latent space as described above with reference to FIG. 13. The joint source-channel encoder 1402*a* may be part of or referred to as a transmitter of the transmitting ED 110*a*.

The transmission passes through the UL channel 1410*a*, which represents all components between the UL joint source-channel encoder 1402*a* of the transmitting ED 110*a* and the translator 180 of the BS 220. The UL channel 1410*a* may represent, for example, any intervening nodes, relays, over-the-air channel and environmental factors that may affect the transmission. The UL channel 1410*a* may be considered to be hostile to the transmission in that the UL channel 1410*a* is expected to introduce noise to the transmission and also limits the transmission according to a channel capacity limit.

The transmission is received by the translator 180 of the BS 220 as a set of received features. The set of received features may be noisy, due to the effects of the UL channel 1410*a*. The translator 180 converts the set of received features to a second set of features for DL transmission. It should be noted that the translator 180 may change the dimensionality of the features. For example, there may be 20 features inputted into the translator 180 and 10 features outputted from the translator 180.

The converted features are transmitted to the receiving ED 110*b* through the DL channel 1410*b*, which represents all components between the BS 220 and a DL joint source-channel decoder 1424*b* at the receiving ED 110*b*. The DL joint source-channel decoder 1424*b* may be part of or referred to as the receiver of the receiving ED 110*b*. The DL channel 1410*b* may represent, for example, any intervening nodes, relays, over-the-air channel and environmental factors that may affect the transmission. Similarly to the UL channel 1410*a*, the DL channel 1410*b* may be considered to be hostile to the transmission.

The DL transmission is received by the DL joint source-channel decoder 1424*b* as another set of received features, which is decoded by a EVAE decoder 1425*b* implemented by the DL joint source-channel decoder 1424*b* of the receiving ED 110b to recover a set of recovered information S as described herein. This recovered information S may be further processed by a machine application 135, for example.

It should be noted that the conversion of features performed by the translator 180 may be simple (e.g., 1-to-1 or 2-to-1 mapping) and linear or may be complex and non-linear (e.g., implemented using a trained neural network). For example, in the example shown in FIG. 14, the translator 180 includes a probabilistic joint source-channel decoder 1424a and a probabilistic joint source-channel encoder 1422b. The joint source-channel encoder 1424a implements a EVAE decoder 1425a corresponding to the EVAE encoder 1403a implemented by the joint source-channel encoder 1402a of the transmitting ED 110a. The UL joint source-channel decoder 1424a may be part of or referred to as a receiver of the BS 220. The joint source-channel decoder 1422b implements an EVAE encoder 1423b corresponding to the EVAE decoder 1425b implemented by the joint source-channel decoder 1424b of the receiving ED 110b. The UL joint source-channel encoder 1422b may be part of or referred to as a transmitter of the BS 220.

Although FIG. 14 shows the translator 180 as being implemented in the BS 220, in other examples the translator 180 or functional components thereof, such as the joint source-channel decoder 1424a and/or the joint source-channel encoder 1422b, may be implemented in another component of the core network 130. For example, in other implementations, the joint source-channel decoder 1424a may be implemented in the BS 220, but the joint source-channel encoder 1422b may be implemented in another component of the core network 130, in which case the BS 220 may communicate with the core network 130 for at least part of the translator function. For simplicity, examples will be described in which the translator 180 is implemented in the BS 220, and the BS 220 is part of the core network 130, but it should be understood that this is not intended to be limiting.

Although the joint source-channel encoder 1402a in this example is configured to generate channel-ready transmission features that are ready to be transmitted to the BS 220 without any additional channel coding prior to transmission, in other embodiments an UL channel encoder (not shown) may be used to further encode the features generated by the joint source-channel encoder 1402a for UL transmission in accordance with an UL transmission scheme. For example, such an UL transmission scheme (which may be defined using a machine-learning approach) may define parameters such as segmentation, coding length, coding rate, the modulation and coding scheme (MCS) and signal waveform, among others. In such implementations, the BS 220 may include an UL channel decoder (not shown) that is aligned with the UL channel decoder of the transmitting ED using the same transmission scheme, such that the UL channel decoder at the BS 220 knows the MCS and waveform, etc. used by the UL channel encoder of the transmitting ED 110a for example.

In some embodiments, in addition or instead of transmitting to the receiving ED 110b via UL transmission to the BS 220 and DL transmission from the BS to the receiving ED 110b, the transmitting ED 110a may transmit information to the receiving ED 110b via sidelink (SL) transmission over a SL channel 1410c. Any intervening nodes that may be traversed by the SL transmission may be modeled as part of the SL channel 1410c. For example, as shown in FIG. 14, the transmitting ED 110a may include a second probabilistic joint source-channel encoder 1402C that implements an EVAE encoder 1403c, and the receiving ED 110b may include a second probabilistic decoder 1424c that implements a EVAE decoder 1425C corresponding to the EVAE encoder 1403c of the transmitting ED 110a in order to support EVAE-based feature-driven SL communication between the transmitting ED 110a and the receiving ED 110b. For example, SL transmissions received by the SL joint source-channel decoder 1424c may be decoded by the EVAE decoder 1425c implemented by the SL joint source-channel decoder 1424c to recover a second set of recovered information. The information recovered by the EVAE decoder 1425c may be further processed by another machine application 137 and/or by the same machine application 135 that may process the information recovered by the EVAE decoder 1425b, for example.

It should be noted that the raw information source may be a black box, meaning that neither the EDs 110a, 110b nor the BS 220 have any knowledge about the subject 105 or how the raw data is collected by the information source (e.g., little or no knowledge about organization, format, inherent structures, or sampling noise of the information source).

A machine-learning based approach for designing an EVAE-based joint source-channel coding scheme is now described, in the context of the UL transmission shown in FIG. 14 (i.e., from the transmitting ED 110a to the BS 220). It should be understood that a similar machine-learning based design approach may be used for the DL transmission (i.e., from the BS 220 to the receiving ED 110b) and the SL transmission (i.e., from the transmitting ED 110a to the receiving ED 110b).

Figure 15:
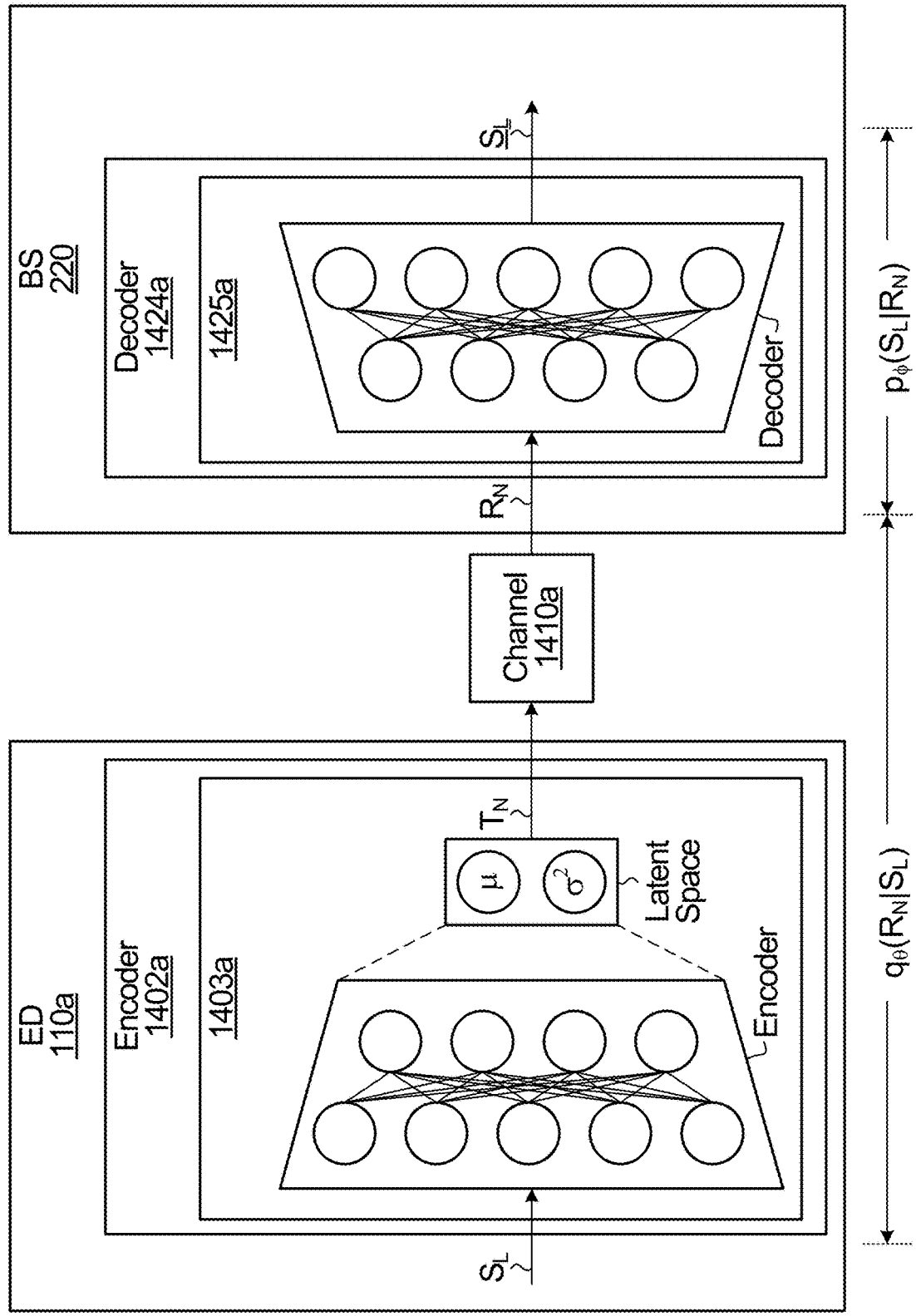
FIG. 15 illustrates an example model for training encoder and decoder DNNs for an uplink (UL) transceiver chain from a transmitting ED to the BS.

FIG. 15 illustrates a model that may be used for training the EVAE encoder 1403a and corresponding EVAE decoder 1425a of the uplink transceiver chain shown in FIG. 14. The present disclosure describes a machine-learning based approach to design the EVAE-based joint source-channel coding scheme to reduce (or compress) the amount of information that needs to be wirelessly transmitted. The EVAE-based joint source-channel coding scheme may be thought of as a dimension reduction algorithm at the probabilistic joint source-channel encoder 1402a. The EVAE-based joint source-channel coding scheme may be invertible to enable recovering of information at the joint source-channel decoder 1424a.

One approach for designing the EVAE encoder 1403a of the probabilistic joint source-channel encoder 1402a and the EVAE decoder 1425a of the probabilistic joint source-channel decoder 1424a to be invertible to each other is to consider an approach similar to training of a conventional autoencoder, in which the encoder and decoder are jointly optimized. However, as will be discussed below, the neural networks for implementing the EVAE encoder 1403a and the EVAE decoder 1425a cannot be trained exactly like a conventional autoencoder. One reason for this is that the feature space is sampled during the forward pass to emulate the noisy channel. The sampling operation is not differentiable, which makes computing the corresponding gradient, and thus back propagation, not possible. Another reason is that the characteristics of the channel and/or the observed subject itself can be always changing, meaning that the conditions are not stable enough.

The probabilistic joint source-channel decoder 1424a in the example of FIG. 15 implements the EVAE decoder 1425A that aims to recover the L-dimensional set of raw information $S_L$, given the N-dimensional set of received features $R_N$. Mathematically, the joint source-channel decoder 1424a outputs the L-dimensional set of recovered information $S_L$ given an N-dimensional set of received features $R_N$, based on the likelihood probability $p(S_L|R_N)$, and the received features $R_N$ may be treated as the latent layer of the EVAE encoder 1403a and EVAE decoder 1425a. Correspondingly, the probabilistic joint source-channel encoder 1402a implements the EVAE encoder 1403a that encodes the set of raw information $S_L$ into the set of received features $R_N$. Mathematically, the joint source-channel encoder 1402a outputs the set of received features $R_N$ based on the likelihood probability $q(R_N|S_L)$. Notably, as indicated in FIG. 15, the likelihood probability $q(\ )$ represents the likelihood of the received features $R_N$ at the input of the source decoder 1424a, given the raw information $S_L$ at the input of the source encoder 1402a. Thus, the likelihood probability $q(\ )$ encompasses the effects of the channel 1410a on the transmission (which may be unknown). Therefore, optimization of the probabilistic EVAE encoder 1403a for the source encoder 1402a necessarily takes into account the physical channel 1410a. This approach links design of the compression scheme with consideration of the physical channel 1410a For a reconstruction task, both the probabilistic joint source-channel encoder 1402a and the probabilistic joint source-channel decoder 1424a may be jointly optimized to maximize the likelihood between $S_L$ at the input of encoder 1402a and $S_L$ at the output of decoder 1424a and to minimize the mutual information between $S_L$ and $R_N$ for a given subject and channel capacity limit. Optimization may be performed using a machine-learning based approach, with the aim of transmitting as much essential information about the subject as possible and consuming as little physical radio resource as possible.

First, consider the joint source-channel decoder 1424a that receives an N-dimensional vector $\vec{R}_N$. It should be noted that, in some of the following mathematical discussions, $R_N$, $S_L$, and $S_L$ are denoted as vectors. The mathematical equations may operate on vectors. However, it should be understood that, in general, $R_N$, $S_L$, and $S_L$ may be "sets" of information or any other information structure. The joint source-channel decoder 1424a may assume the received signals are independent and identically distributed (iid) such that $\vec{R}_N$ contains N independent Gaussian distributions. The joint source-channel decoder 1424a uses the likelihood probability $p(\ )$ to decode (or decompress) $\vec{R}_N$ into a vector $\vec{S}_L$. $\vec{S}_L$ is an L-dimensional signal, each dimension independently following a particular probability distribution, e.g., a Gaussian distribution or a Bernoulli distribution. It should be noted that $L \neq N$, and typically $L > N$. For example, mathematically, this can be represented as:

$$\vec{R}_N = \begin{pmatrix} R_0 \\ \ldots \\ R_{N-1} \end{pmatrix}; p(\vec{R}_N) \sim N(\vec{\mu}_R, \Sigma_R)$$

$$\vec{S}_L = \begin{pmatrix} S_0 \\ \ldots \\ S_{L-1} \end{pmatrix}; p(\vec{S}_L) \sim N(\vec{\mu}_S, \Sigma_S)$$

Where, in this example, N0 is a Gaussian distribution, $\vec{\mu}_R$ is a vector of the mean (or expectation value) of each received feature Gaussian distribution, $\vec{\mu}_S$ is a vector of the mean (or expectation value) of each recovered information Gaussian distribution, and $\Sigma$ is a covariance matrix.

In this example, we assume that $\vec{S}_L$ has a Gaussian distribution; however, in other examples $\vec{S}_L$ may have, for example, a Bernoulli distribution. As shown, the joint source-channel decoder 1424a receives a set of N received features $\vec{R}_N$. Each of the features $R_0$ to $R_{N-1}$ describes a respective probability distribution in terms of mean and variance. The joint source-channel decoder 1424a converts $\vec{R}_N$ into a set of L recovered information $\vec{S}_L$. Because in this example $\vec{S}_L$ is assumed to be Gaussian distributed, each of the recovered information $S_0$ to $S_{L-1}$ describes a respective recovered probability distribution in terms of mean and variance. It should be noted that $L > N$, and the probability distributions recovered in $\vec{S}_L$ may be different from the probability distributions of the received features $\vec{R}_N$.

For a given $\vec{R}_N$, the probabilistic joint source-channel decoder 1424a outputs $\vec{S}_L$, using $p(\vec{S}_L|\vec{R}_N)$ Mathematically, it is hard to exhaustively find $p(\vec{S}_L|\vec{R}_N)$ in a high dimensional signal space. In examples described herein, a deep neural network (DNN) $p_\phi(\vec{S}_L|\vec{R}_N)$ implemented by the EVAE decoder 1425a is used to approximate the true $p(\vec{S}_L|\vec{R}_N)$, where $\phi$ is the set of the neuron weights and thresholds. The architecture of the DNN $p_\phi$ of the decoder EVAE 1425a (such as number of layers, connection among the neurons, and threshold functions on each neuron and so on) may be varied for individual implementation. For example, a CNN (convolutional-NN), RNN (recurrent-NN), and/or GNN (Graph-NN) may be used to describe the architecture of the DNN $p_\phi$. A loss/reward function can be designed based on maximum log likelihood, with the input samples $\vec{R}_N$ and output samples $\vec{S}_L$ as follows:

$$\phi^* = \underset{\phi}{\mathrm{argmax}}\left\{E_{\vec{R}_N \sim p(\vec{R}_N), \vec{S}_L \sim p(\vec{S}_L)}[\ln(p_\phi(\vec{S}_L|\vec{R}_N))]\right\}$$

In general, $p(\vec{S}_L)$ may be computed as either a cross-entropy measurement or maximum-log-likelihood depending on the task. If the task is pure input reconstruction, for example, then a mean square error (MSE) minimization may be used.

Similarly, the joint source-channel encoder 1402a may be implemented using another DNN $q_\theta(\vec{R}_N|\vec{S}_L)$ where $\theta$ is the set of the neuron weights and thresholds for a probabilistic encoder. Similarly, to the DNN $p_\phi$ of the EVAE decoder 1425a described above, the architecture of the DNN $q_\theta$ of the EVAE encoder 1403a (such as number of layers, connection among the neurons, and threshold functions on each neuron and so on) may be varied for individual implementation. For example, CNN, RNN, and/or GNN may be used to describe the architecture of the DNN $q_\theta$. $q_\theta(\vec{S}_L, \vec{R}_N)$ should meet the requirement that the information bottleneck is within the Shannon capacity of the channel. That is, $q_\theta(\vec{S}_L, \vec{R}_N)$ must compress $\vec{S}_L$ into an $\vec{R}_N$ that fits within the channel capacity $C_{limit}$. The information bottleneck may be conceptually thought of as the upper boundary of the mutual information between $\vec{S}_L$ and $\vec{R}_N$. Mathematically, this may be represented as:

$$I(\vec{S}_L|\vec{R}_N) \leq C_{limit}$$

where I( ) is mutual information, and where $C_{limit}$ can be calculated using the Shannon-Hartley theorem as follows:

$$C_{limit} = W \ln\left(1 + \frac{S}{N}\right)$$

where W represents the occupied bandwidth, S represents the signal power, and N represents the channel noise power. The ratio S/N may also be referred to as the signal-to-noise ratio (SNR).

The goal of the training is to make the joint probability $p_\phi(\vec{S}_L, \vec{R}_N)$ and the joint probability $q_\theta(\vec{S}_L, \vec{R}_N)$ as similar to each other as possible. The similarity between two probabilities can be indicated by their Kullback-Leibler (KL) divergence as follows:

$$KL(q_\theta(\vec{S}_L, \vec{R}_N) | p_\phi(\vec{S}_L, \vec{R}_N)) = \int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N$$

The aim of training the DNN is to find $\langle \theta^*, \phi^* \rangle$ that minimizes this KL divergence, where the notation * indicates the weights $\langle \theta^*, \phi^* \rangle$ have been found by this optimization. In particular, the ideal case is KL=0, $q_\theta(\vec{S}_L, \vec{R}_N) = p_\phi(\vec{S}_L, \vec{R}_N)$. The minimization function may be represented as:

$$\langle \theta^*, \phi^* \rangle = \underset{\langle \theta, \phi \rangle}{\operatorname{argmin}} \{KL(q_\theta(\vec{S}_L, \vec{R}_N) | p_\phi(\vec{S}_L, \vec{R}_N))\}$$

Returning to the previous equation, because:

$q_\theta(\vec{S}_L, \vec{R}_N) = q_\theta(\vec{S}_L, \vec{R}_N) \cdot p(\vec{S}_L)$ therefore a substitution may be made as follows:

$$KL(q_\theta(\vec{S}_L, \vec{R}_N) | p_\phi(\vec{S}_L, \vec{R}_N)) =$$

$$\int\int q_\theta(\vec{S}_L, \vec{R}_N) \cdot \ln\left(\frac{q_\theta(\vec{S}_L, \vec{R}_N)}{p_\phi(\vec{S}_L, \vec{R}_N)}\right) \cdot d\vec{S}_L \cdot d\vec{R}_N = \int_{\vec{S}_L} p(\vec{S}_L) \cdot$$

$$\left(\int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L, \vec{R}_N)}\right) \cdot d\vec{R}_N + \int_{\vec{R}_N} q_\theta(\vec{R}_N | \vec{S}_L) \cdot \ln(p(\vec{S}_L)) \cdot d\vec{R}_N\right) \cdot d\vec{S}_L$$

If a Monte-Carlo method is used on the $\vec{S}_L$ sampling set, this equation becomes:

$$= E_{\vec{S}_L \sim p(\vec{S}_L)}$$

$$\left[\int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L, \vec{R}_N)}\right) \cdot d\vec{R}_N + \int_{\vec{R}_N} q_\theta(\vec{R}_N | \vec{S}_L) \cdot \ln(p(\vec{S}_L)) \cdot d\vec{R}_N\right]$$

Substituting:

$\int \vec{R}_N q_\theta(\vec{R}_N | \vec{S}_L) \cdot \ln(p(\vec{S}_L)) \cdot d\vec{R}_N = \ln(p(\vec{S}_L)) \cdot \int \vec{R}_N q_\theta(\vec{R}_N | \vec{S}_L) \cdot d\vec{R}_N = \ln(p(\vec{S}_L))$, the equation becomes:

$$= E_{\vec{S}_L \sim p(\vec{S}_L)}\left[\int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L, \vec{R}_N)}\right) \cdot d\vec{R}_N + \ln(p(\vec{S}_L))\right] =$$

$$E_{\vec{S}_L \sim p(\vec{S}_L)}\left[\int_{\vec{R}_N} q_\theta(\vec{R}_N | \vec{S}_L) \cdot \ln\left(\frac{q_\theta(\vec{R}_N | \vec{S}_L)}{p_\phi(\vec{S}_L | \vec{R}_N) \cdot p(\vec{R}_N)}\right) \cdot d\vec{R}_N + \ln(p(\vec{S}_L))\right] =$$

$$E_{\vec{S}_L \sim p(\vec{S}_L)}\left[\int_{\vec{R}_N} q_\theta(\vec{R}_N | \vec{S}_L) \cdot \ln\left(\frac{q_\theta(\vec{R}_N | \vec{S}_L)}{p(\vec{R}_N)}\right) \cdot d\vec{R}_N - \int_{\vec{R}_N} q_\theta(\vec{R}_N | \vec{S}_L) \cdot \ln(p_\phi(\vec{S}_L | \vec{R}_N)) \cdot d\vec{R}_N + \ln(p(\vec{S}_L))\right]$$

If the Monte-Carlo method is applied on the $\vec{R}_N$ sampling set given a $\vec{S}_L$, the equation becomes:

$$= E\vec{S}_{L \sim p(}\vec{S}_{L)}[KL(q_\theta(\vec{R}_N | \vec{S}_L) | p(\vec{R}_N)) - E\vec{R}_{N \sim q_\theta(}\vec{R}_{N|}\vec{S}_{L)}[\ln(p_\phi(\vec{S}_L | \vec{R}_N))] + \ln(p(\vec{S}_L))]$$

Because $p(\vec{S}_L)$ is an inherent statistic of the raw source information $\vec{S}_L$, this cannot be changed. Thus, the aim of minimizing $KL(q_\theta(\vec{S}_L, \vec{R}_N) | p(\vec{S}_L, \vec{R}_N))$ becomes minimizing:

$$E\vec{S}_{L \sim p(}\vec{S}_{L)}[KL(q_\theta(\vec{R}_N | \vec{S}_L) | p(\vec{R}_N))] - E\vec{S}_{L \sim p(}\vec{S}_{L)}, \vec{R}_{N \sim q_\theta(}\vec{R}_{N|}\vec{S}_{L)}[\ln(p_\phi(\vec{S}_L | \vec{R}_N))]$$

At the end, the joint goal of connecting two DNNs $q_\theta(\vec{R}_N | \vec{S}_L)$ and $p_\phi(\vec{R}_N | \vec{S}_L)$ may be expressed as:

$$\langle \theta^*, \phi^* \rangle = \underset{\langle \theta, \phi \rangle}{\operatorname{argmin}}$$

$$\{E_{\vec{S}_L \sim p(\vec{S}_L)}[KL(q_\theta(\vec{R}_N | \vec{S}_L) | p(\vec{R}_N))] - E_{\vec{S}_L \sim p(\vec{S}_L), \vec{R}_N \sim q_\theta(\vec{R}_N | \vec{S}_L)}[\ln(p_\phi(\vec{S}_L | \vec{R}_N))]\}$$

Which may be further written as:

$$\langle \theta^*, \phi^* \rangle = \underset{\langle \theta \rangle}{\operatorname{argmin}}\{E_{\vec{S}_L \sim p(\vec{S}_L)}[KL(q_\theta(\vec{R}_N | \vec{S}_L) | p(\vec{R}_N))]\} +$$

$$\underset{\langle \phi \rangle}{\operatorname{argmax}}\{E_{\vec{S}_L \sim p(\vec{S}_L), \vec{R}_N \sim q_\theta(\vec{R}_N | \vec{S}_L)}[\ln(p_\phi(\vec{S}_L | \vec{R}_N))]\}$$

The second portion of this equation, $$\underset{\langle \phi \rangle}{\operatorname{argmax}}\{E_{\vec{S}_L \sim p(\vec{S}_L), \vec{R}_N \sim q_\theta(\vec{R}_N | \vec{S}_L)}[\ln(p_\phi(\vec{S}_L | \vec{R}_N))]\},$$

may be interpreted as a first rule that aims to jointly optimize both the encoder $q_\theta(\vec{R}_N | \vec{S}_L)$ and the feature decoder $p_\phi(\vec{S}_L | \vec{R}_N)$ to achieve the output $\underline{\vec{S}_L}$ that is as similar as possible to the original $\vec{S}_L$. This may be referred to as the maximum likelihood target. The first portion of the equation, $$\underset{(\theta)}{\operatorname{argmin}}\left\{E_{\vec{S}_L \sim p(\vec{S}_L)}\left[KL(q_\theta(\vec{R}_N|\vec{S}_L)|p(\vec{R}_N))\right]\right\}$$

may be interpreted as a second rule that aims to minimize the occupied channel capacity, and may be referred to as the minimize information bottleneck target, or the upper boundary of mutual information target. The information bottleneck may be expressed as the mutual information between $\vec{S}_L$ and $\vec{R}_N$ from an encoder $q_\theta(\vec{R}_N|\vec{S}_L)$ point of view:

$$I(\vec{S}_L, \vec{R}_N) = \iint_{\vec{S}_L, \vec{R}_N} q_\theta(\vec{S}_L, \vec{R}_N) \cdot \ln\left(\frac{q_\theta(\vec{S}_L, \vec{R}_N)}{p(\vec{S}_L) \cdot p(\vec{R}_N)}\right) \cdot d\vec{R}_N \cdot d\vec{S}_L =$$

$$\iint_{\vec{S}_L, \vec{R}_N} q_\theta(\vec{R}_N|\vec{S}_L) \cdot p(\vec{S}_L) \cdot \ln\left(\frac{q_\theta(\vec{R}_N|\vec{S}_L)}{p(\vec{R}_N)}\right) \cdot d\vec{R}_N \cdot d\vec{S}_L =$$

$$\int_{\vec{S}_L} p(\vec{S}_L) \left(\int_{\vec{R}_N} q_\theta(\vec{R}_N|\vec{S}_L) \cdot \ln\left(\frac{q_\theta(\vec{R}_N|\vec{S}_L)}{p(\vec{R}_N)}\right) \cdot d\vec{R}_N\right) \cdot d\vec{S}_L =$$

$$\int_{\vec{S}_L} p(\vec{S}_L)(KL(q_\theta(\vec{R}_N|\vec{S}_L)|p(\vec{R}_N))) \cdot d\vec{S}_L$$

The Monte-Carlo method may be applied to $\vec{S}_L$ samples, to arrive at:

$$I(\vec{S}_L, \vec{R}_N) = E\vec{S}_{L \sim p(\vec{S}_L)}[KL(q_\theta(\vec{R}_N|\vec{S}_L)|p(\vec{R}_N))]$$

Thus, for a given capacity limitation, the aim is to minimize $I(\vec{S}_L, \vec{R}_N)$.

Training is also performed for the DL transceiver chain. The order in which the UL transceiver chain and the DL transceiver chain may be different in different embodiments. For example, in some embodiments training for the DL transceiver chain may be performed before the training for the UL transceiver chain. In other embodiments, training is performed for the DL transceiver chain after the UL transceiver chain has been trained. In other embodiments, the training for the DL transceiver chain and the training for the UL transceiver chain may be performed at the same time.

Figure 16:
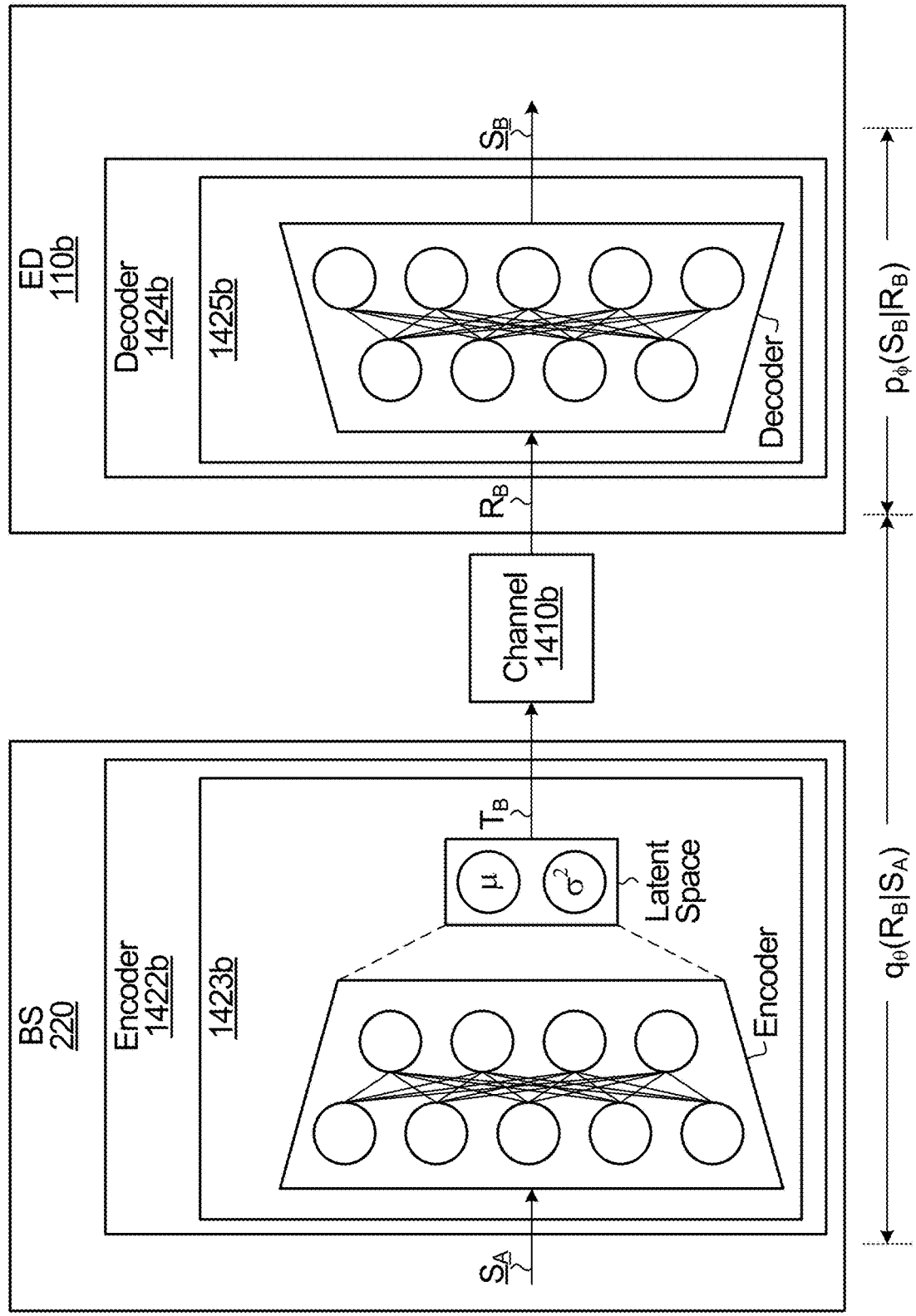
FIG. 16 illustrates an example model for training encoder and decoder DNNs for a downlink (DL) transceiver chain from the BS to the receiving ED.

FIG. 16 illustrates a model that may be used for training the EVAE encoder 1423b and corresponding EVAE decoder 1425b of the DL transceiver chain. The DL transceiver chain may be trained in a similar manner to the UL transceiver chain, but in the reverse direction and starting with the recovered information $S_A$ from the UL transceiver chain as the input for training. In this case, the probabilistic joint source-channel encoder 1422b at the BS 220 encodes $S_A$ into the set of features $T_B$. It should be noted that, for simplicity, the dimensional subscript is omitted here. However, it should be understood that, as discussed above, joint source-channel encoder 1422b performs dimensional reduction (i.e., compression). The transmission passes through the DL channel 1410b (which has a certain allocated channel capacity limit). At the receiving ED 110b, the probabilistic joint source-channel decoder 1424b receives a set of received features $R_B$, which as discussed above can be modeled as the set of transmitted features $T_B$ with additional noise from the channel 1410b. The received features are decoded by the EVAE decoder 1425b of the joint source-channel decoder 1424b into a set of recovered DL information $S_B$.

The joint optimization discussed above may be extended to the model of FIG. 16. The ML training target is to maximize likelihood between $S_B$ and $S_A$ (i.e., the original collected raw information from the UL transceiver chain). The KL training target is to minimize the upper boundary of mutual information between $R_B$ and $S_A$. Notably, the minimization target aims to keep the upper boundary of the mutual information to be within the capacity limit of the channel 1410b.

For training the DL transceiver chain, the recovered information $S_A$ is used as the input for training. The recovered information may be generated as part of the training for the UL transceiver chain, and stored (e.g., in a memory of the BS 220) as training samples for training the DL transceiver chain. The raw information $S_A$ collected for training of the UL transceiver chain may also be stored (e.g., in a memory of the BS 220), for the purpose of the ML training target.

If there are multiple receiving EDs 110b, the DL transceiver chain for each ED 110b may be trained separately, using the model of FIG. 16.

Figure 17:
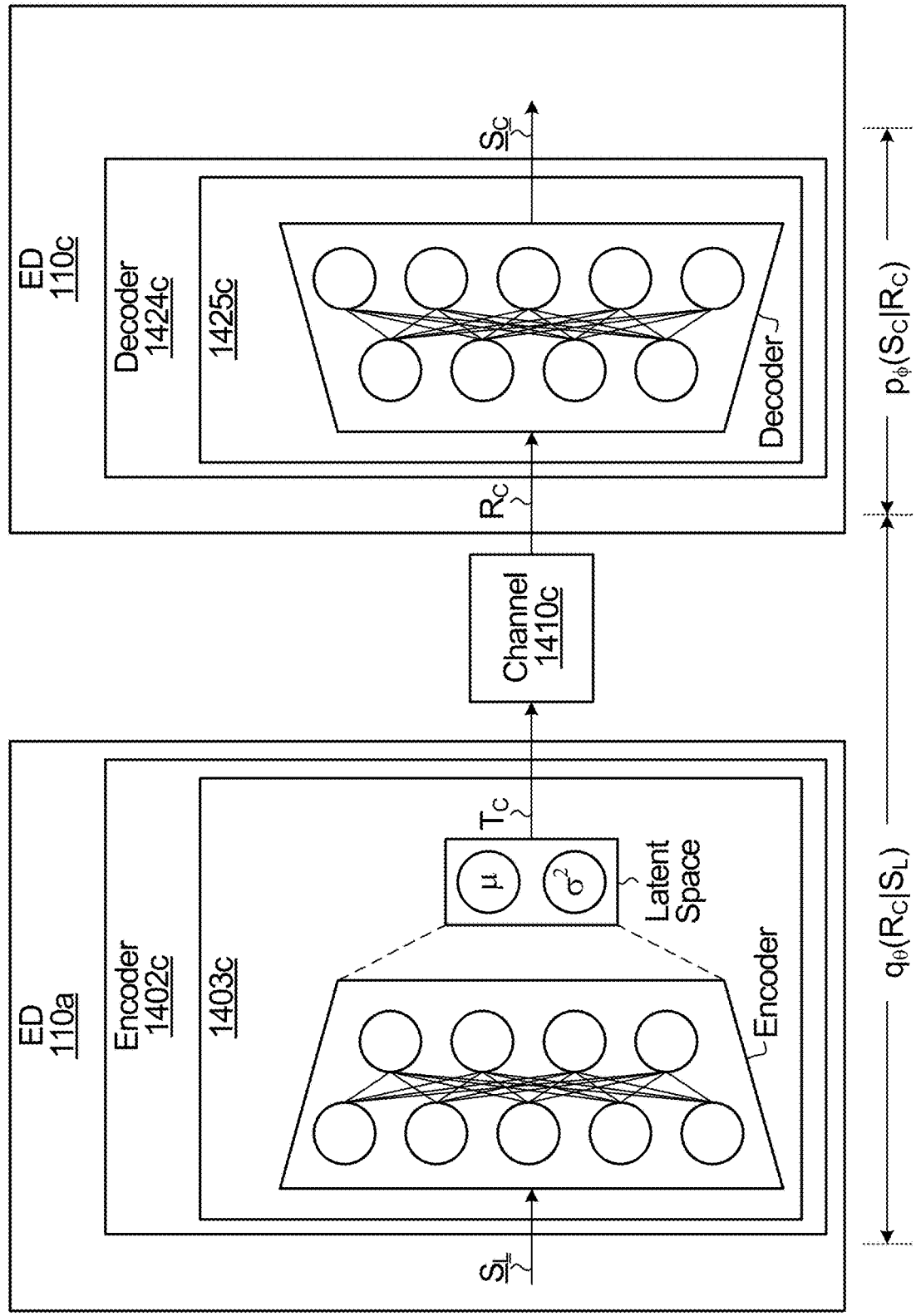
FIG. 17 illustrates an example model for training encoder and decoder DNNs for a sidelink (SL) transceiver chain from the BS to the receiving ED.

As described above and shown in FIG. 14, in addition or instead of transmitting to the receiving ED 110b via UL transmission to the BS 220 and subsequent DL transmission from the BS to the receiving ED 110b, the transmitting ED 110a may transmit information to the receiving ED 110b via SL transmission over the SL channel 1410c. FIG. 17 illustrates a model that may be used for training the EVAE encoder 1403c and corresponding EVAE decoder 1425c of the SL transceiver chain.

The SL transceiver chain may be trained in a similar manner to the UL transceiver chains, starting with the raw information $S_L$ as the input for training. In this case, the probabilistic joint source-channel encoder 1402c at the transmitting ED 110a encodes $S_L$ into a set of features $T_C$. It should be understood that, as discussed above, joint source-channel encoder 1402c performs dimensional reduction. The transmission passes through the $S_L$ channel 1410c (which may have a certain allocated channel capacity limit). At the receiving ED 110b, the probabilistic joint source-channel decoder 1424c receives a set of received features $R_C$, which can be modeled as the set of transmitted features $T_C$ with additional noise from the channel 1410c. The received features are decoded by the EVAE decoder 1425c of the joint source-channel decoder 1424c into a set of recovered $S_L$ information $S_L$.

The joint optimization discussed above may be extended to the model of FIG. 17. The ML training target is to maximize likelihood between $S_L$ and $S_L$. The KL training target is to minimize the upper boundary of mutual information between $R_C$ and $S_L$. Notably, the minimization target aims to keep the upper boundary of the mutual information to be within the capacity limit of the channel 1410C.

For training the $S_L$ transceiver chain, the original raw information $S_L$ is used as the input for training and may be stored (e.g., in a memory of the receiving ED 110b), for the purpose of the ML training target.

In the examples discussed above with reference to FIGS. 14-16 it has been assumed that the goal of a transmission from a transmitting device to a receiving device (e.g., from the transmitting ED 110a to the BS 220 over the UL channel 1410a, from the BS 220 to the receiving ED 110b over the DL channel 1410b, or from the transmitting ED 110a to the receiving ED 110b over the $S_L$ channel 1410c) is to enable the receiving device to reconstruct or recover the raw information that was probabilistically encoded at the transmitting device. One of the attractive aspects of the EVAE-based joint source-channel coding is that only the most important information required for the task is extracted for transmission. In this regard, the EVAE offers dimensionality reduction or information compression.

The majority of communication systems never consider the notion of task because the task is always the same: to reproduce the input at the output without errors as quickly as possible. Transmitting a message with errors typically induces a retransmission with increased resource utilization (higher code rate, smaller modulation scheme, etc).

However, it is possible that inferring further information embedded within the input might facilitate further compression. For example, the source may contain redundant information that need not be transmitted depending on the task at hand. The task of the communication system may be application-specific. For example, we can consider the well-known Modified National Institute of Standards and Technology (MNIST) handwritten digit dataset that is commonly used for training and testing image processing systems. It may be possible to obtain a smaller latent space (and hence greater compression ratio) when only classifying the output of an EVAE compared with full image reconstruction. In other words, rather than attempting to reconstruct the image on the decoder side of the EVAE, the decoder instead might attempt to determine what category that image might belong to from a finite list of possibilities (e.g., in the case of the MNIST database there may be ten possible classifications representing the numerals 0 to 9, respectively). Alternatively, the decoder might only be used to identify when images of a particular type are transmitted.

The reason why the communication task is important is that it may affect the size of the latent space. If some tasks require less information to be accomplished, the input can be encoded to a smaller latent space, or be further compressed. To exploit this, in some embodiments different joint source/channel EVAEs may be used to accomplish different tasks.

By acknowledging that different communication tasks are possible, different levels of source compression can be attained. Source compression in this context generally indicates some form of dimensionality reduction. Depending on the type of latent space distribution, different types of dimensionality reduction can occur. Typically, we can expect the inputs of the joint source/channel encoder to be real-valued, and as such the encoder is an analog system. The latent space of the encoder may be either real-valued with a domain-limited distribution or have a finite alphabet. Transforming the input source distribution to the latent space distribution may make for difficulty in measuring compression in a conventional manner using information theory. However, in the context of practical applications, we can measure compression in terms of the reduction of computer memory required to store the source and latent space in hardware. Given this definition, transforming a real-valued input distribution of dimensionality M to an arbitrary alphabet latent space distribution of dimensionality N<M indicates that compression is achieved.

Typically communication protocols operate on a principle of lossless information transfer. Given that reliable communication of information in a lossy manner is possible, the task of the communication dictates the level of information that may be lost in transfer to retain a successful transmission. Some tasks may require that the source be less compressed in order to be successfully carried out. As such, higher levels of compression can potentially be achieved given a task constraint, which in turn can save precious wireless communication resources.

Figure 18:
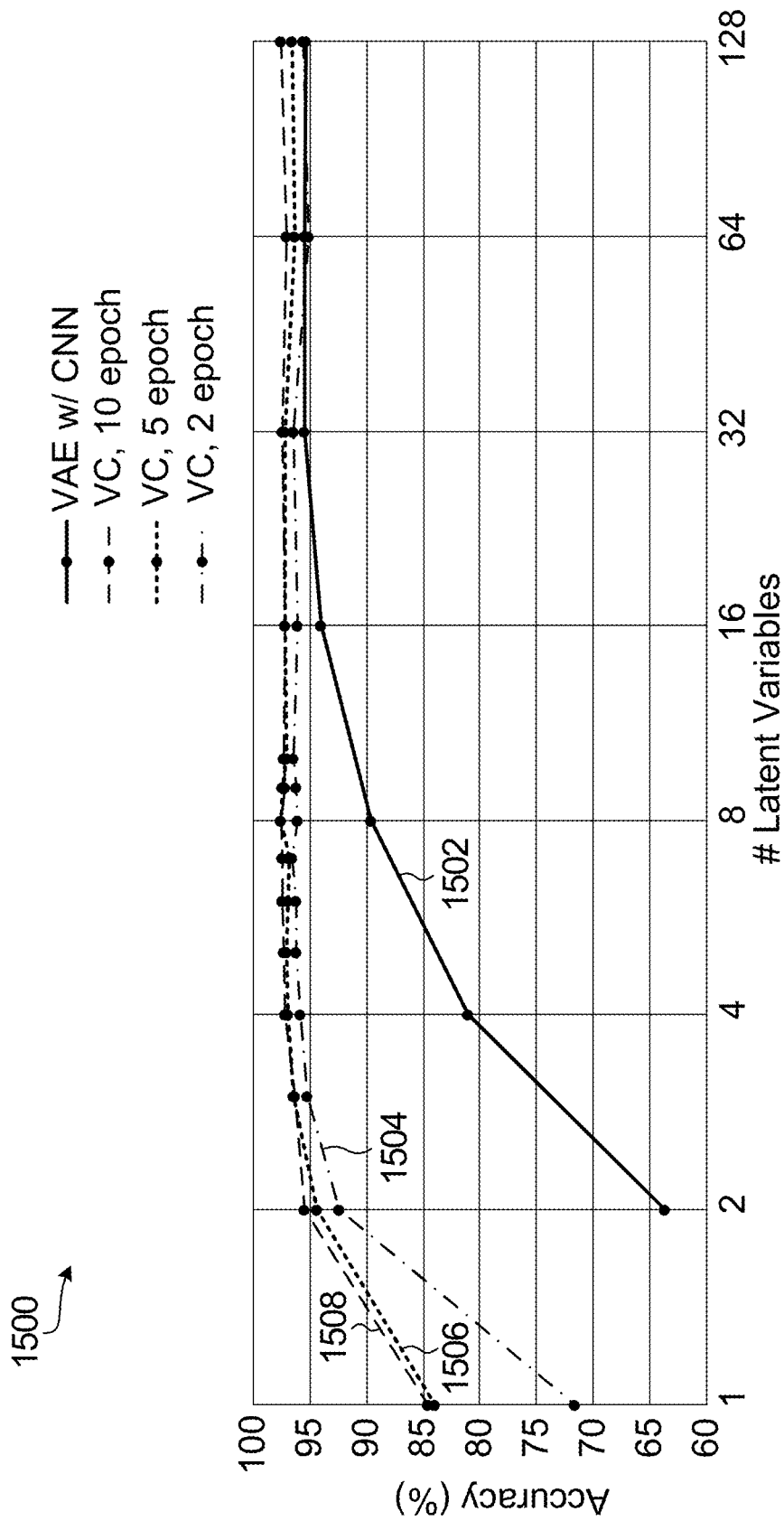
FIG. 18 is a plot of simulated accuracies vs. number of latent variable utilized for various VAE-based source coding schemes for a classification task in accordance with embodiments of the present disclosure.

For example, FIG. 18 is a plot 1500 of simulated accuracies vs. number of latent variables utilized for various VAE-based source coding schemes for a classification task in which the goal was to classify a source image from the MNIST handwritten digit dataset as 1 of 10 categories corresponding to the digits 0 to 9. In one scenario, labeled VAE w/ CNN and indicated at 1502, the input image is attempted to be reconstructed by the decoder of the VAE and then classified through an auxiliary pre-trained classifier. In the other scenario, labeled VC and indicated at 1504, the input image is directly classified by the decoder of the VAE without reconstruction. In FIG. 18, the simulated accuracy result indicated at 1504 was achieved with two training epochs for the DNNs of the encoder and decoder of the VAE. FIG. 18 also includes plots of the simulated accuracy results achieved with additional training epochs. In particular, the plotted simulation results indicated at 1506 and 1508 in FIG. 18 correspond to 5 and 10 training epochs for the VAE, respectively.

The simulated accuracy results of FIG. 18 demonstrate that classifying a reconstructed image requires 32 Gaussian-distributed latent variables to attain an overall classification accuracy of 95%, whereas classifying images directly from a latent space requires only 2 Gaussian-distributed latent variables to attain the same performance. This demonstrates that the task of image reconstruction cannot tolerate the same level of source compression that simple image classification can. In other words, by acknowledging the task of a communication, higher levels of compression can potentially be achieved.

However, alternate tasks can potentially result in a phenomenon referred to as posterior collapse during training due to imbalance in input and output dimensionality of the encoder and decoder of the VAE. An example of posterior collapse during the training of a VAE is described below with reference to FIGS. 19 to 21.

Figure 19:
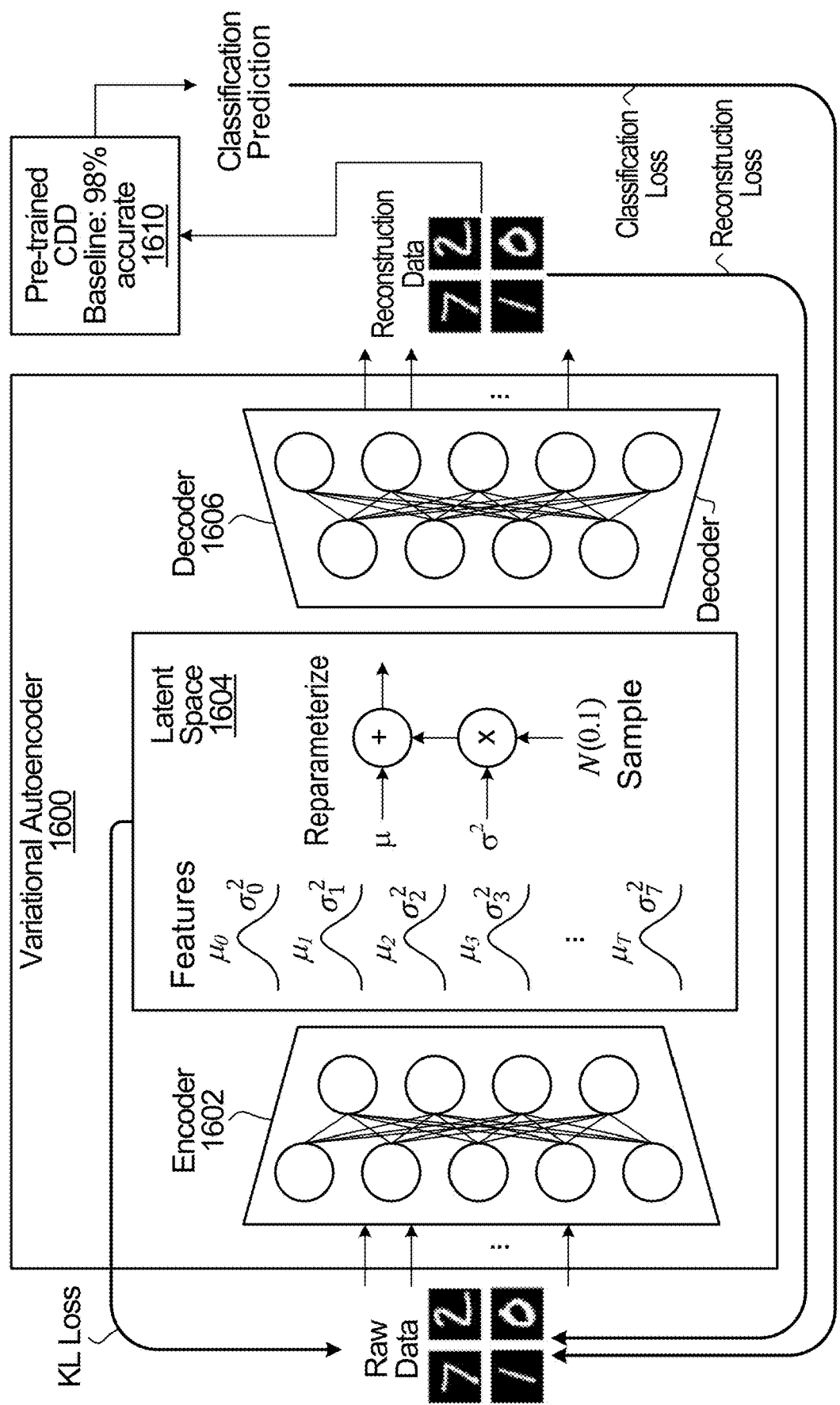
FIG. 19 illustrates an example model for training a VAE for joint source-channel coding the Modified National Institute of Standards and Technology (MNIST) handwritten digit dataset in accordance with an embodiment of the present disclosure.

FIG. 19 illustrates a model for training a VAE 1600 for source coding the MNIST data set. The VAE 1600 includes an encoder 1602, a Gaussian distributed latent space 1604 and a decoder 1606. In this example, in a first scenario, a pre-trained CNN 1610 may be used to estimate the information loss after the encoder 1602 encodes the raw data of MNIST images to the reduced Gaussian latent space 1604, the latent space 1604 is sampled, and the decoder 1606 decodes the sampled values to obtain reconstructed images. This setup is similar to the one that was used to obtain the simulation results for "VAE w/CNN" indicated at 1502 in FIG. 18. As a baseline, the CNN obtains 98% accuracy on the raw unprocessed MNIST test set. As indicated in FIG. 18, a 95% accuracy can be obtained in this scenario provided that a sufficient number of latent variables are used. In this scenario, the VAE is trained based on measuring the reconstruction loss between the input and output of the VAE 1600 and the KL loss between the Gaussian latent variables in the latent space 1604 and the standard unit Gaussian N(0,1) as a regularization term.

Figure 20B:
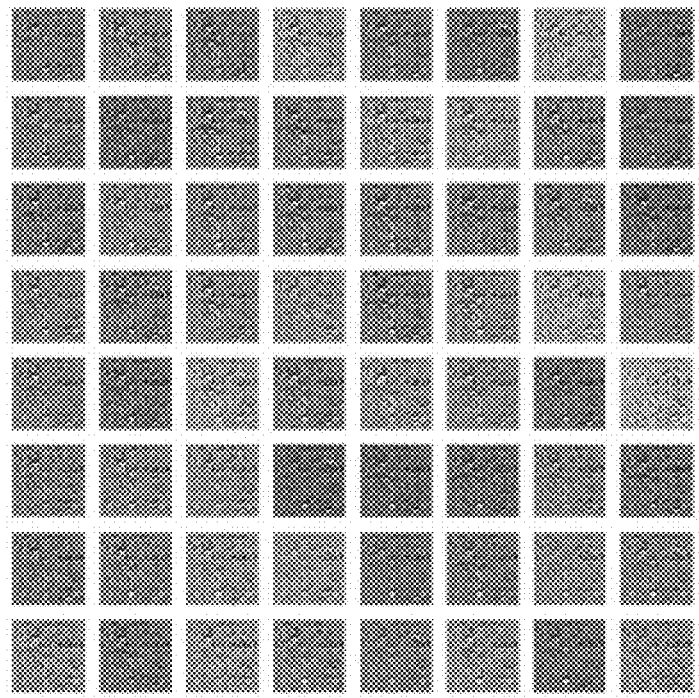
FIGS. 20A and 20B shows the MNIST handwritten digit input images and attempted image reconstructions outputs, respectively, of a VAE trained using classification prediction loss rather than reconstruction loss as a loss term.
Figure 20A:
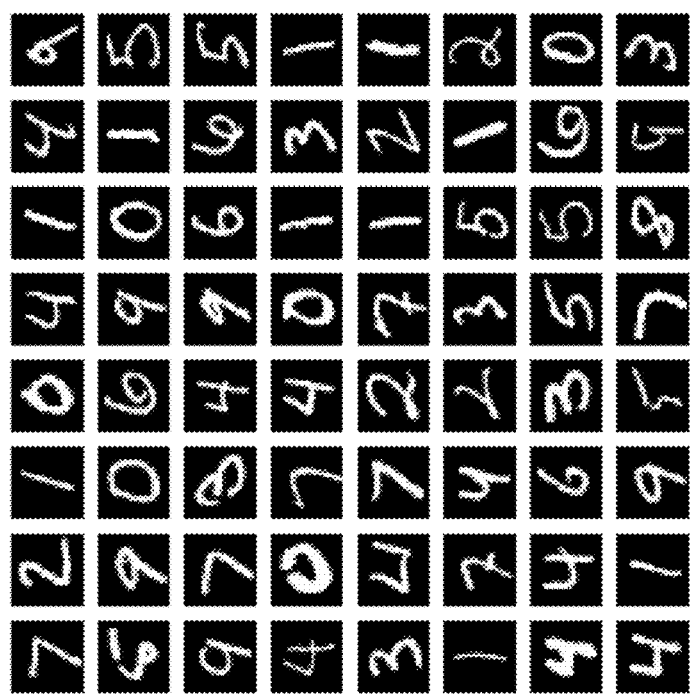

However, in an alternate training procedure the classification prediction could potentially be used as a loss term rather than the reconstruction of the image. In this scenario, the pre-trained CNN 1610 with frozen weights is included in the compute graph, and therefore the gradients are computed through the pre-trained CNN 1610, thereby neglecting the success of the image reconstruction, at least directly. However, FIGS. 20A and 20B show that attempted image reconstruction using classification loss as a loss term in the training of the VAE results in failure. In particular, FIG. 20A shows the MNIST input images and FIG. 20B shows the attempted image reconstruction based on the reconstructed data at the output of the trained VAE 1600 when the VAE has been trained using solely classification prediction loss and neglecting the reconstruction loss. As shown in FIG. 20B, almost all the "reconstructed" images under these training conditions look identical, and they look nothing like MNIST digits. Further, the classification performance here is about ~10% accurate.

This result is due to posterior collapse. The problem lies in the fact that using classification prediction loss rather than reconstruction loss results means that we are no longer dealing with a "balanced" training exercise. In contrast, in the first training scenario that used the reconstruction loss as a loss term in the training computations, both the neural network implementing the encoder 1602 and the neural network implementing the decoder 1606 were being penalized based on a loss which was roughly equally weighted for both neural networks. In particular, an image of 784 pixels was compressed down to a reduced number of latent variables (e.g., 8 latent variable), and then expanding those latent variables back to 784 pixels, and measuring the loss directly. In the second scenario, we are compressing the 784 pixels down to a reduced number of latent variables, and then expanding those latent variables back to 784 pixels, but rather than measuring the loss directly on the reconstructed data, the loss is instead measured directly on a one-hot encoded vector of size 10 (i.e., the classification prediction output of the pre-trained CNN 1610), corresponding to each of the 10 possible MNIST digits. This means that the gradient computation of the encoder 1602 and decoder 1606 of the VAE 1600 are no longer balanced, and the decoder 1606 is too "strong", because its average loss is always significantly lower. This results in the latent posterior distribution collapsing to the prior distribution for every class.

Figure 21:
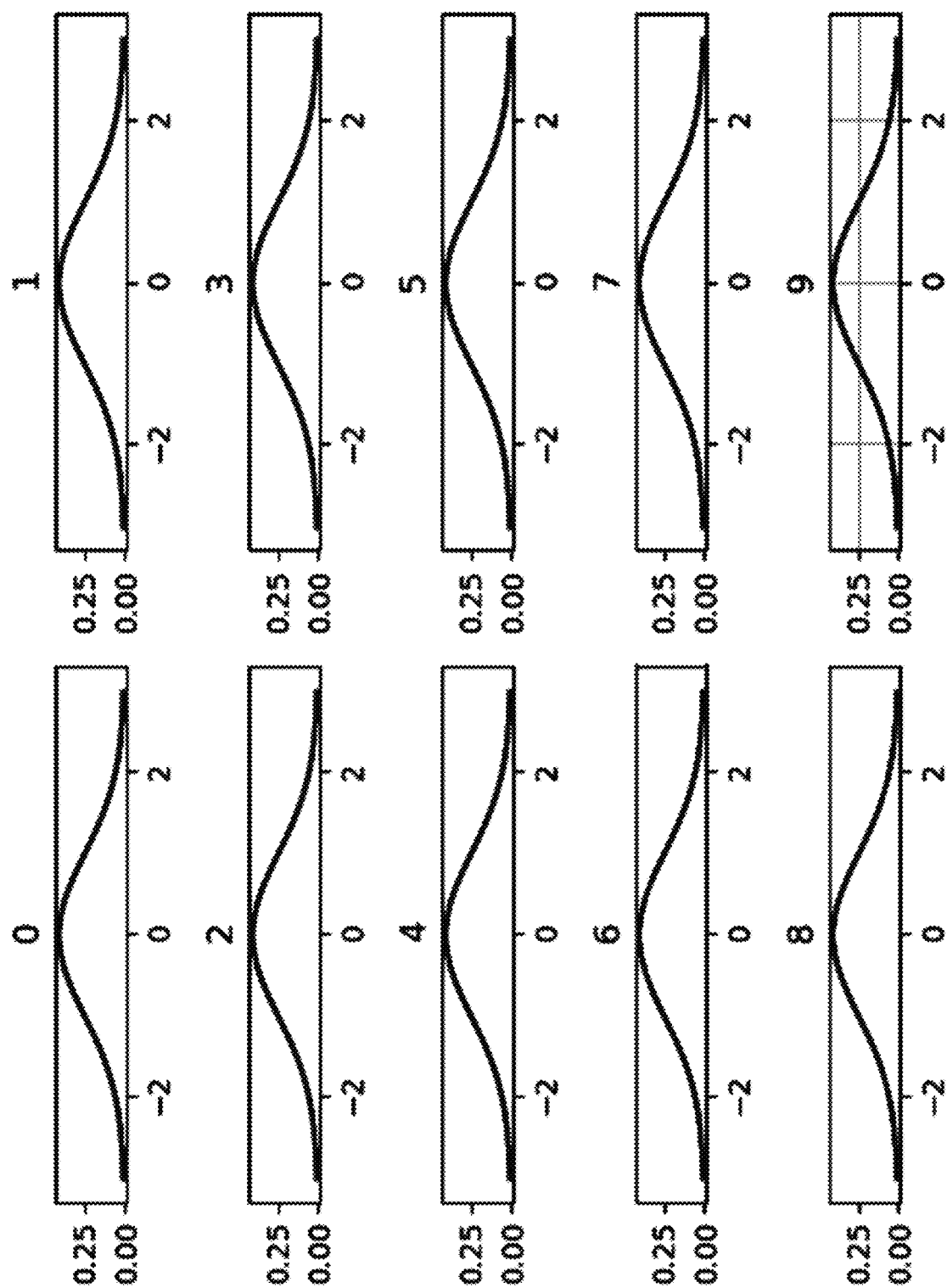
FIG. 21 depicts plots of the average Gaussian latent variable distributions for each of the ten digit classes for a VAE trained using classification prediction loss rather than reconstruction loss as a loss term.

We can visualize the posterior collapse by plotting the average Gaussian latent variable distributions for each of the ten digit classes (classes 0 to 9) separately. This should work because each class (or each digit) should have a similar latent distribution because the MNIST digit dataset is so simple. For example, FIG. 21 depicts plots of the average Gaussian latent variable distributions for each of the ten digit classes for the second training scenario discussed above. As noted above, it can be seen in FIG. 21 that the latent probability distributions for every class have collapsed to the prior distribution, which in this example is the normalized Gaussian distribution N(0,1).

This implies two underlying issues with VAE-based source coding schemes:
Some tasks are simpler than others. Some complicated tasks may require complete information recovery, whereas some simpler tasks may request only detection. If the same training model is used for all tasks, the simple tasks may suffer from this posterior collapse.
If a VAE is trained with a full information covering task for a simple detection task, the trained features are actually "overdesigned" for the simple task.

In reality, many IoT applications involve relatively simple tasks for machines, such as error-detection or alarm system tasks, that might not require complete information recovery. If a VAE-based source coding scheme is used without considering the task then there is a risk of either encountering posterior collapse or utilizing an "over-designed" source coding scheme.

Figure 22:
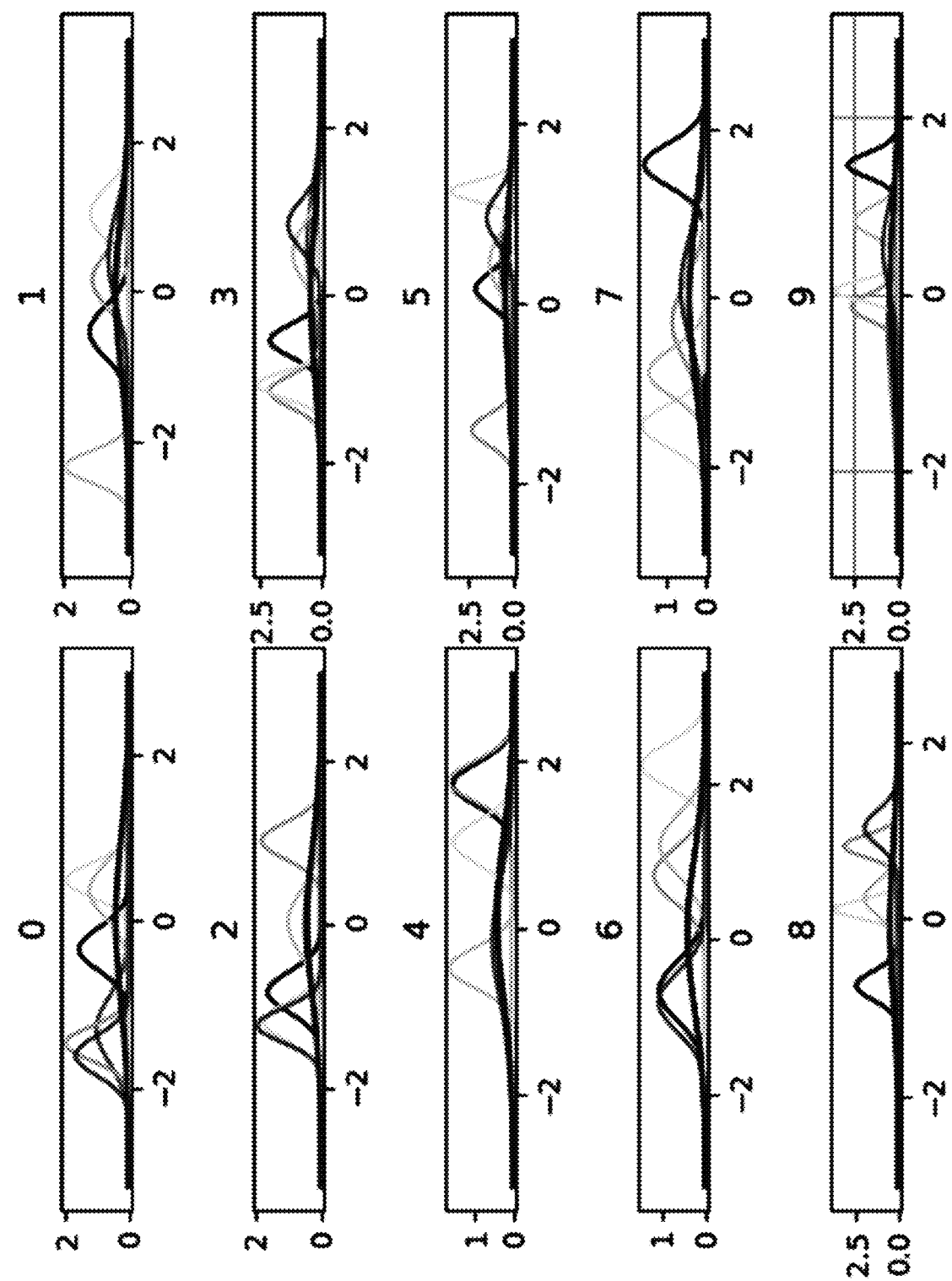
FIG. 22 depicts plots of the average Gaussian latent variable distributions for each of the ten digit classes for a VAE trained using a loss function to which a scaling term $\alpha$ has been added in accordance with an embodiment of the present disclosure.

One way to mitigate the risk of posterior collapse is to introduce a scaling term α to the loss function L(x) used for training the VAE. For example, FIG. 22 shows the affect that adding a scaling term α to the loss function L(x) has on the plots of the average Gaussian latent variable distributions for each of the ten digit classes compared to the posterior collapse of those same distributions shown in FIG. 21. In particular, in this example the loss function L(x) satisfies the following equation:

$$L(x) = \alpha BCE(\text{target}, y) - KL(\mu, \ln\sigma^2)$$

and $$\alpha = \frac{\|x\|}{\|y\|}$$

Where x is the input to the VAE, y is the output of the VAE, KL( ) is the KL loss term, and BCE( ) is a binary cross-entropy loss term based on the output y and the training target. If a scaling term, such as the example scaling term α identified above, is not used and the result of the BCE( ) function and KL( ) function are not of similar numeric scale, then one of the functions tends to "take over" or dominate the loss function, and the feature space tends to collapse to the prior distribution (posterior collapse described earlier). The two terms need to be in balance in order for the weights to be well trained. The use of a scaling term, such as the example scaling term α identified above, serves to keep that balance to result in a well-trained feature space.

In contrast to FIG. 21, in which all eight "features" (or latent probability distributions) collapsed to the prior distribution for every class, in FIG. 21 the eight features are dispersed and take on meaningful values for every class, which means the classes can potentially be differentiated from one another.

Another way to mitigate the risk of posterior collapse while also taking advantage of the higher compression levels that may be tolerated by simpler tasks is to employ different EVAE-based source coding schemes for different tasks. For example, as previously noted, a machine perceptor that counts the number of trucks passing a crossroad based on image data probably requires much lower resolution images than a machine that detects drivers' ID of each passing vehicle. For example, referring again to FIG. 14, the EVAE implemented by the EVAE encoder 1403c and the EVAE decoder 1425c may be trained for a relatively simple task, such as object detection in image data, and the EVAE implemented by the EVAE encoder 140a and the EVAE decoder 1425a may be trained for a relatively more complex task requiring full image reconstruction.

Several examples of EVAE-based transceiver chains that include EVAE encoders and decoders trained for different tasks in accordance with embodiments of the present disclosure will now be described with reference to FIGS. 23 to 25.

Figure 23:
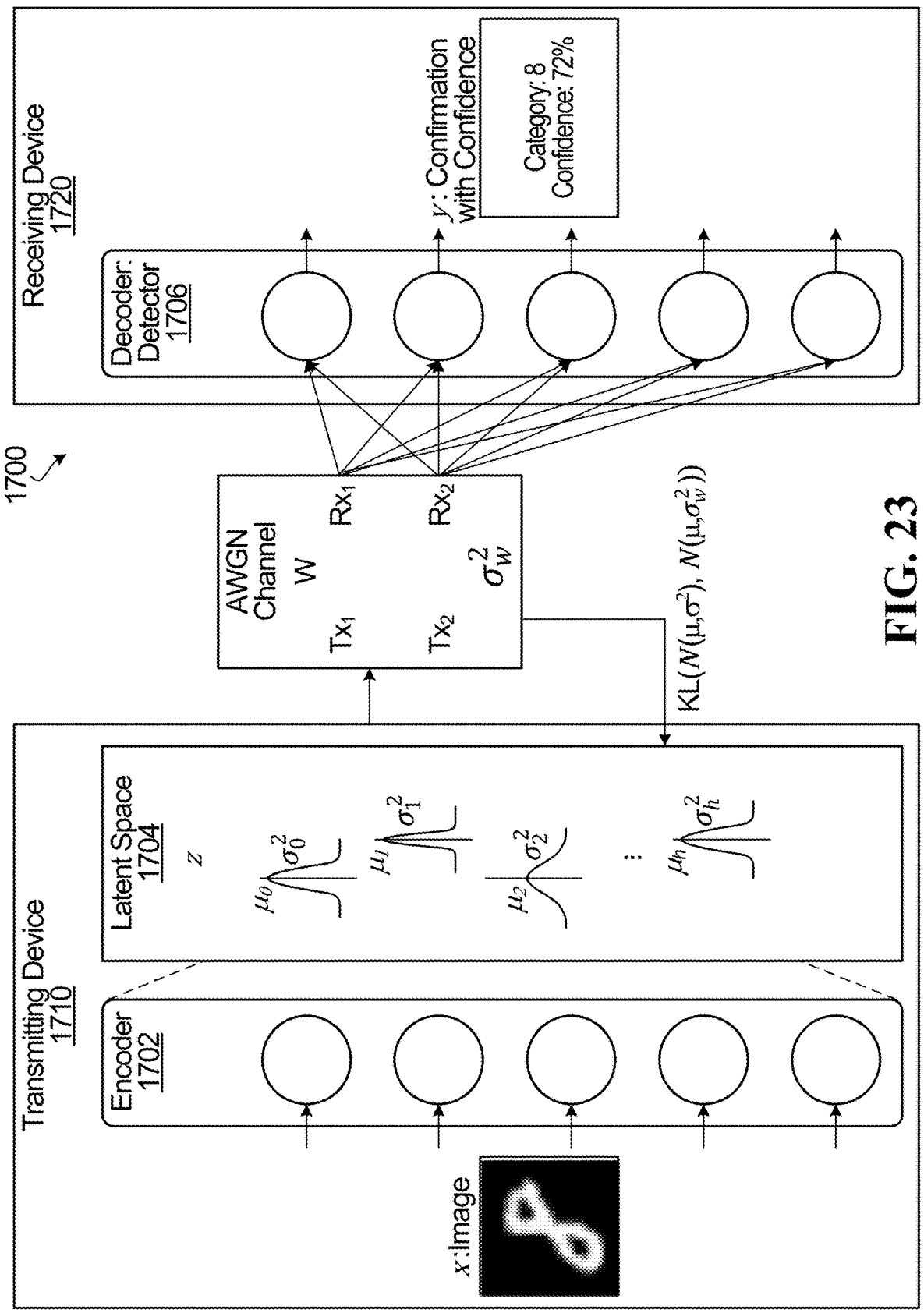
FIG. 23 illustrates an example of an EVAE-based transceiver chain configured for image classification in accordance with an embodiment of the present disclosure.

FIG. 23 illustrates an example of an EVAE-based transceiver chain 1700 configured for image classification in accordance with an embodiment of the present disclosure. The EVAE-based transceiver chain 1700 is between a transmitting device 1710 and a receiving device 1720 and includes an encoder 1702 and a Gaussian distributed latent space 1704 at the transmitting device 1710, an AWGN transmission channel W, and a decoder 1706 at the receiving device 1720. The encoder 1702 and the decoder 1706 each implement a DNN, although only one layer of each DNN is shown in order to simplify the drawing. In this example the encoder 1702 and the decoder 1706 have been trained using the MNIST handwritten digit dataset.

In operation, the encoder 1702 accepts a 2D grey scale image as an input and encodes the image to the Gaussian-distributed latent space 1704 that is compatible with the AWGN channel W. The means μ of the latent space 1704 are transmitted across W by the transmitting device 1710. The received corrupted values that are received by the receiving device 1720 then serve as the input to the decoder 1705. The decoder 1706 is trained to transform the received features into category predictions. In the case of the MNIST handwritten digit dataset, there are 10 categories: one for each single digit from 0 to 9. In this example implementation, the decoder 1706 is configured to compute the probability of each of the categories based on the received features, and to offer the most likely as the output along with its probability. Thus, the class of the image has been communicated from the transmitting device 1710 to the receiving device 1720 without transmitting the raw image data.

Figure 24:
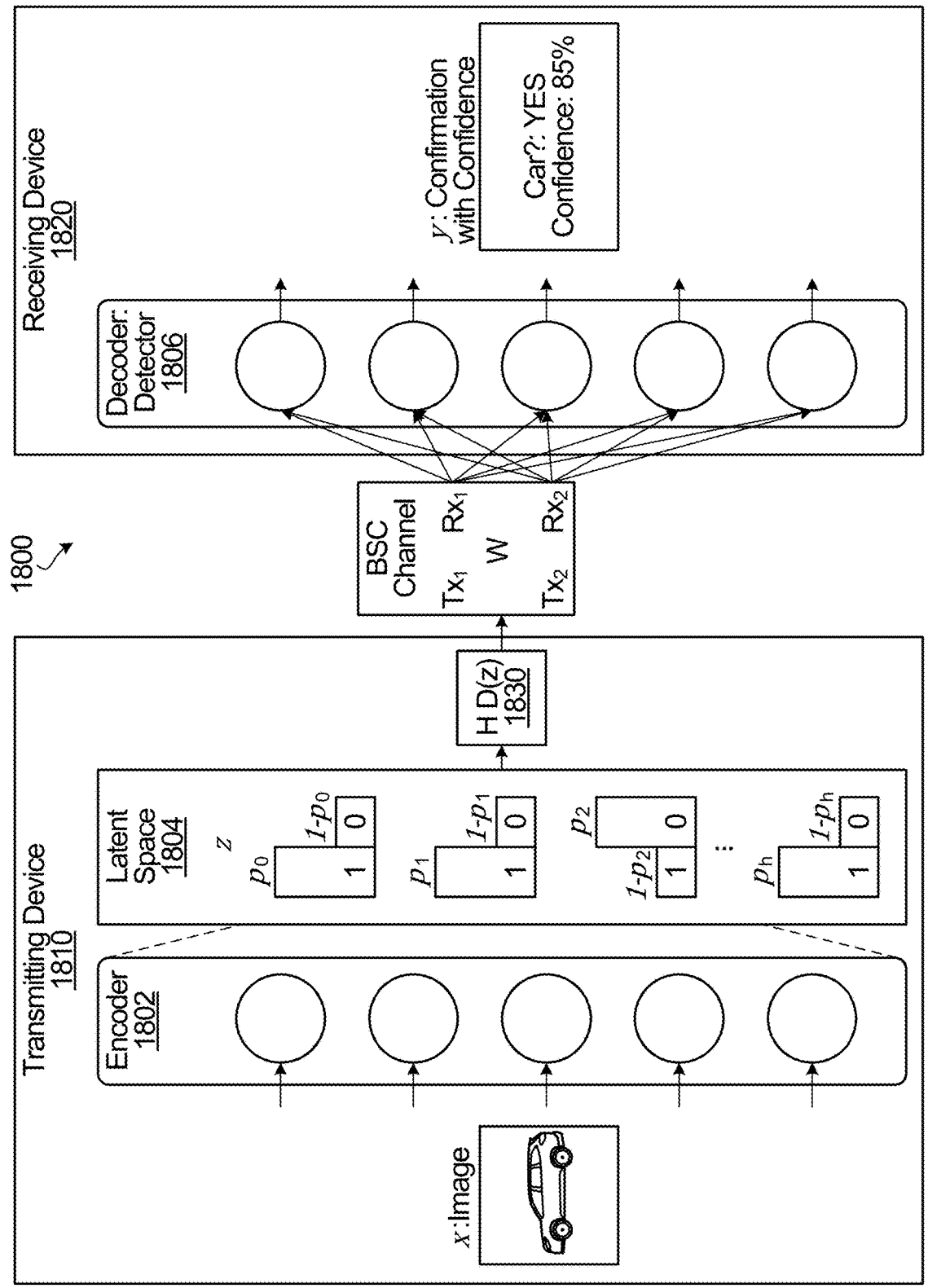
FIG. 24 illustrates an example of an EVAE-based transceiver chain configured for object detection in image data in accordance with an embodiment of the present disclosure.

FIG. 24 illustrates an example of an EVAE-based transceiver chain 1800 configured for object detection in image data in accordance with an embodiment of the present disclosure. The EVAE-based transceiver chain 1800 is between a transmitting device 1810 and a receiving device 1820 and includes an encoder 1802 and a Bernoulli-distributed latent space 1804 at the transmitting device 1810, a BSC transmission channel W, and a decoder 1806 at the receiving device 1820. The encoder 1802 and the decoder 1806 each implement a DNN, although again only one layer of each DNN is shown in order to simplify the drawing. In this example the encoder 1802 and the decoder 1806 have been trained using the Canadian Institute For Advanced Research (CIFAR-10) natural images dataset, and more specifically the decoder 1806 has been trained to detect whether or not an image of a car has been encoded. For example, the decoder 1806 may be trained to return a YES output when an image of a car is detected and otherwise will return a NO output for all other images.

In operation, the encoder 1802 accepts a 3D RGB image as an input and encodes the image to the Bernoulli-distributed feature space 1804. Each feature has a Bernoulli probability of either $p_w$ or $1-p_w$, where $p_w$ is the bit flip probability of the BSC channel W. Each feature has a higher probability of resulting in either a "1" or a "0" depending on p. To transmit the features, they are "sampled" by taking the hard decision (HD) of p, as indicated at 1830, and then sent across the BSC channel W as binary values. The decoder 1806 receives the channel bits and transforms them into a probability of whether or not the encoded image was a car. If the probability is greater than 50%, then the result can be considered a YES. Thus, car image detection is performed over a noisy channel without transmitting a raw image.

Figure 25:
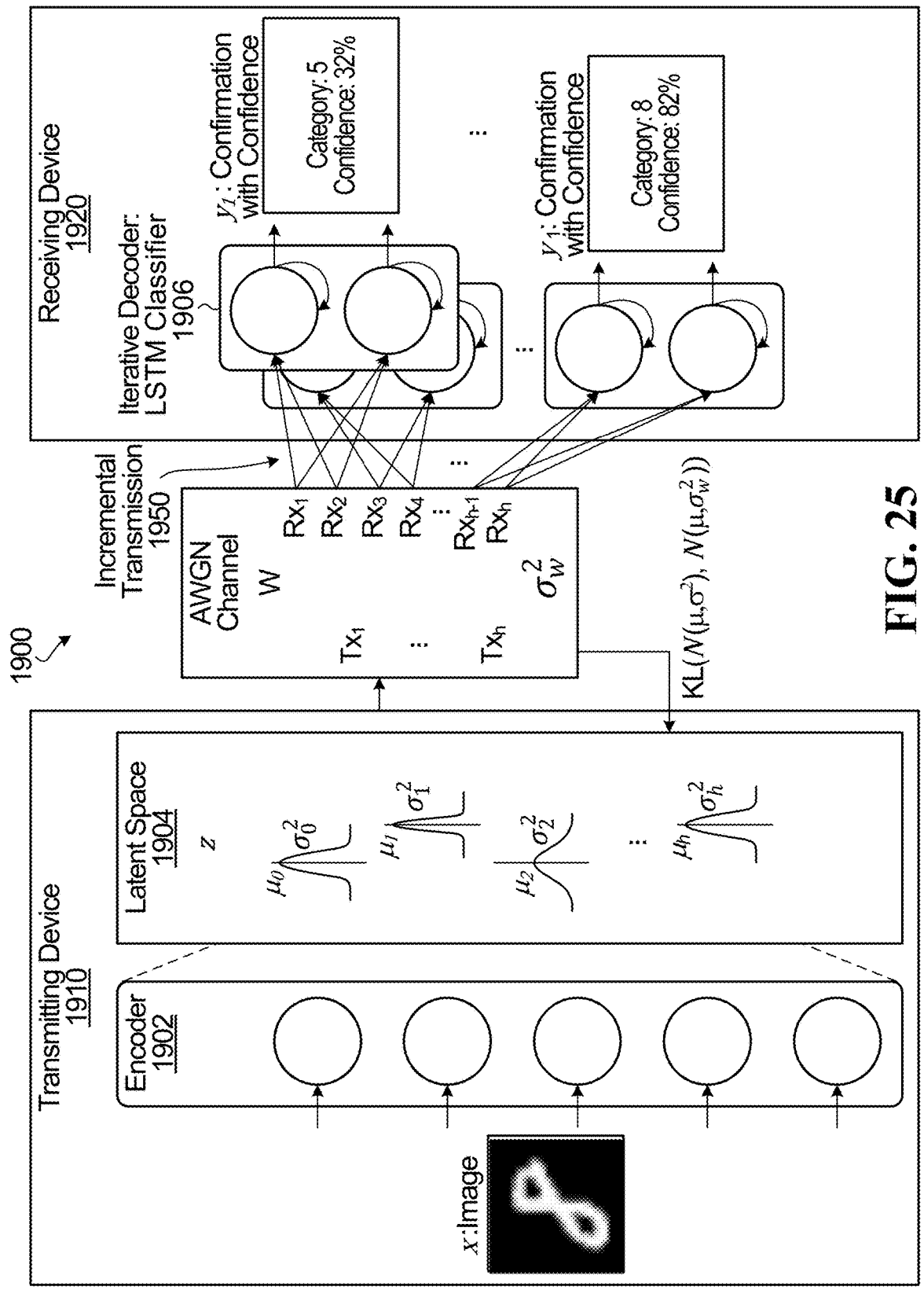
FIG. 25 illustrates an example of a recurrent EVAE-based transceiver chain configured for object detection in image data in accordance with an embodiment of the present disclosure.

FIG. 25 illustrates an example of a recurrent EVAE-based transceiver chain 1900 configured for object detection in image data in accordance with an embodiment of the present disclosure. The recurrent EVAE-based transceiver chain 1900 is between a transmitting device 1910 and a receiving device 1920 and includes an encoder 1902 and a Gaussian-distributed latent space 1904 at the transmitting device 1910, an AWGN transmission channel W, and a decoder 1906 at the receiving device 1920. The encoder 1902 and the decoder 1906 each implement a DNN, although again only one layer of each DNN is shown in order to simplify the drawing. In this example the encoder 1802 and the decoder 1806 have been trained using the MNIST handwritten digit images dataset. The DNNs of the encoder 1902 and the decoder 1906 are configured as RNNs using long short term memory (LSTM) neurons. This configuration facilitates a hybrid automatic repeat request (HARQ) mechanism. For example, an initial subset of encoded features may be transmitted and decoded and if there is insufficient confidence in the decoded result (e.g., if the confidence is below some threshold value), additional features can be transmitted to attempt another round of decoding with more information. Additional parameters may be required to implement the HARQ mechanism; for example, a minimum confidence percentage C and a maximum number of transmissions, t, as described below.

In operation, the encoder accepts a 2D grey scale image as an input and encodes the image to the Gaussian-distributed feature space 1904 of dimensionality h that is compatible with the AWGN channel W. In this example, an initial subset of h/t means μ of the latent space 1904 are transmitted across the AWGN channel W. The received corrupted values then serve as the input to the first decoding iteration. The decoder 1906 is trained to transform the received features into category predictions. In the case of MNIST, there are 10 categories: one for each single digit from 0 to 9. The decoder 1906 computes the probability of each of the categories based on the received features, and offers the most likely as the output along with its probability. If the most likely probability is less than the minimum required confidence C, then the next h/t means are transmitted, and a second decoding iteration is attempted. Because the decoder 1906 is of a recurrent nature, the hidden states of the LSTM units aid in the second decoding attempt. Ostensibly, the second decoding attempt utilizes all previously transmitted features, and thus has access to more information. The second decoding iteration provides a new category prediction along with a new probability. The successive transmission process, which is indicated at 1950 in FIG. 25, is repeated until the category prediction confidence meets or exceeds C, and is permitted up to a maximum of t transmissions. Thus, the class of the image has been communicated from the transmitting device to the receiving device without transmitting the raw data.

In order to reach the point where an EVAE-based transceiver chain is able to provide ultra-low bandwidth communication for m2m applications, a certain amount of overhead may be needed in the form of setup phases. An example of a protocol to make use of the EVAE as a wireless communication device for ultra-low bandwidth communication for m2m applications will now be described with reference to FIGS. 26A-26C.

Figure 26A:
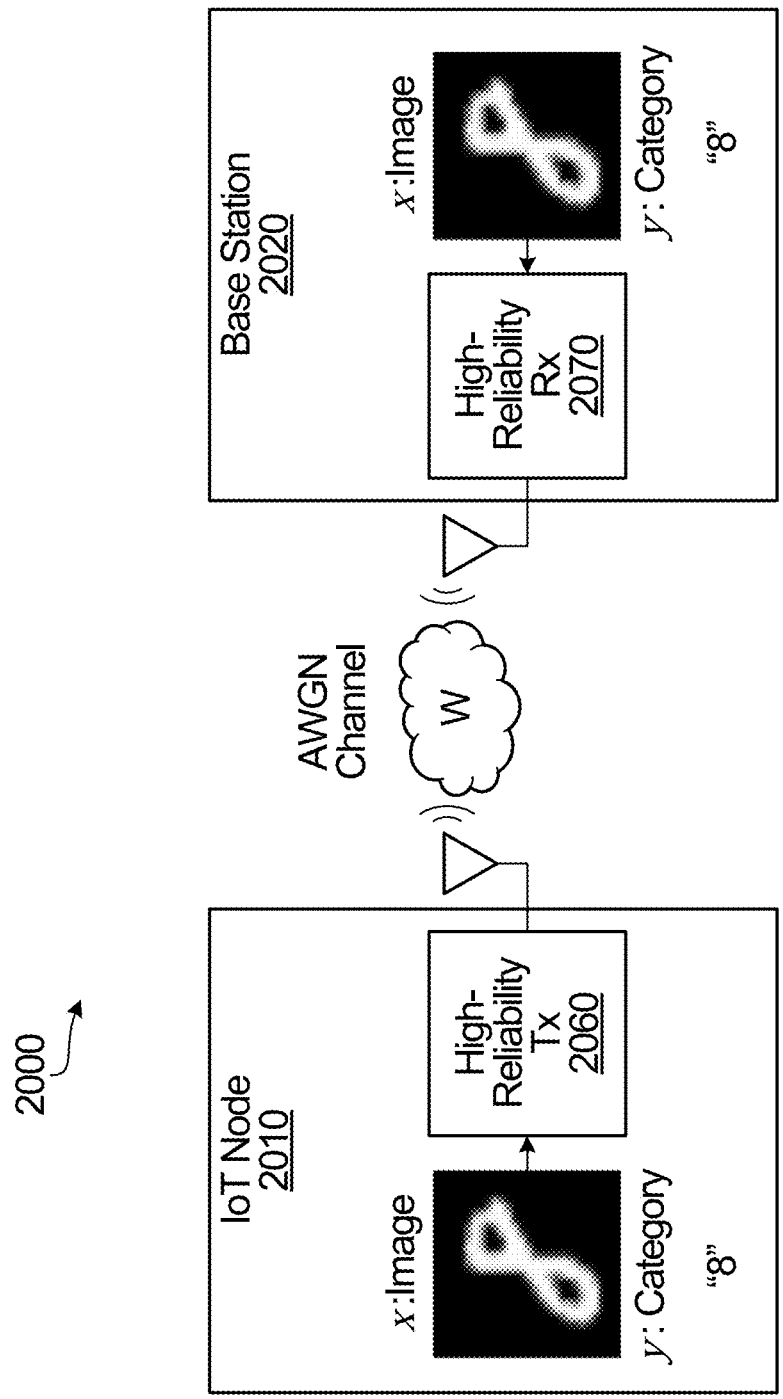
FIGS. 26A, 26B and 26C depict three phases, respectively, of an example protocol to configure an EVAE as a wireless communication device for low bandwidth communication in accordance with an embodiment of the present disclosure.
Figure 26B:
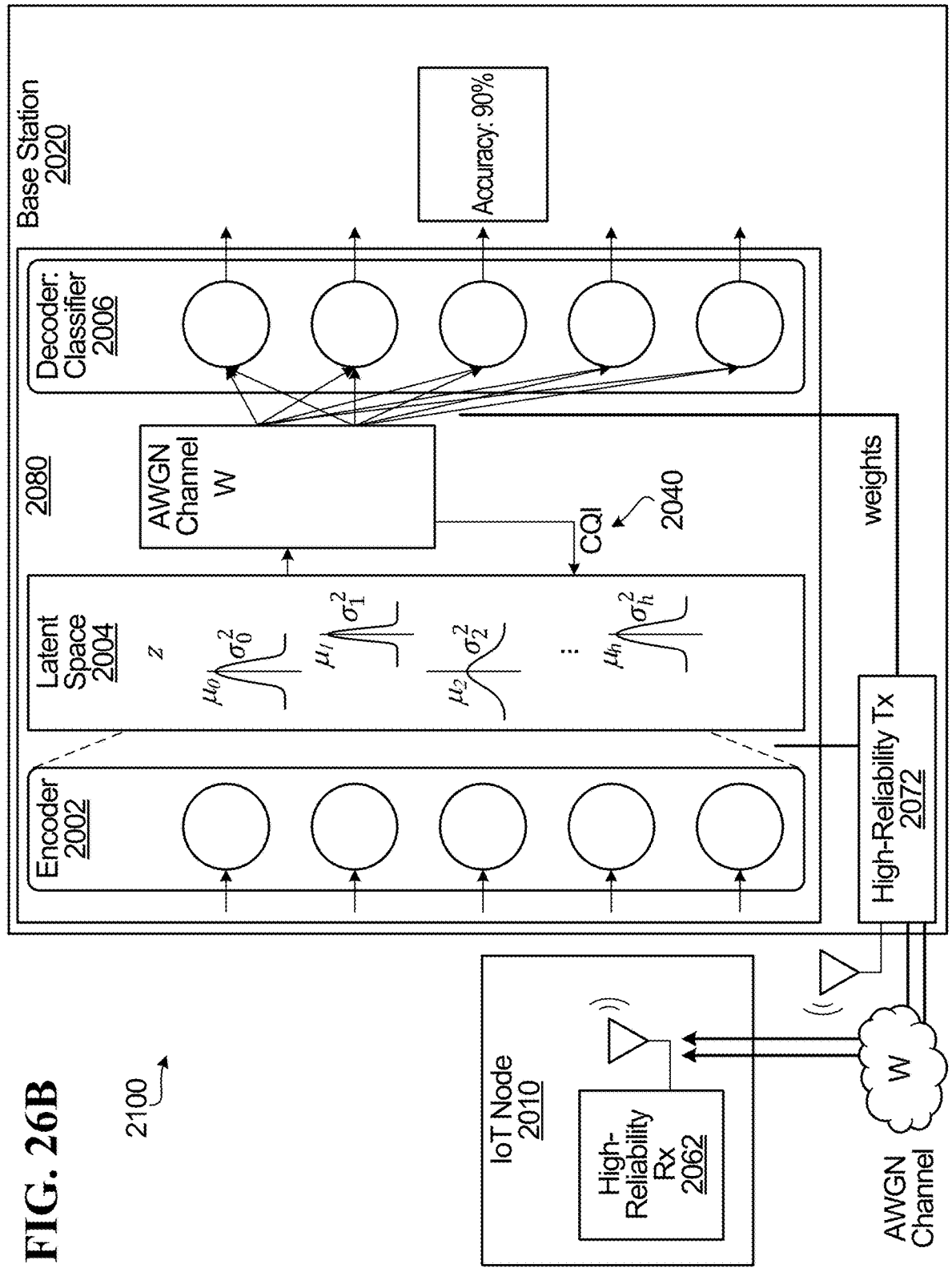
Figure 26C:
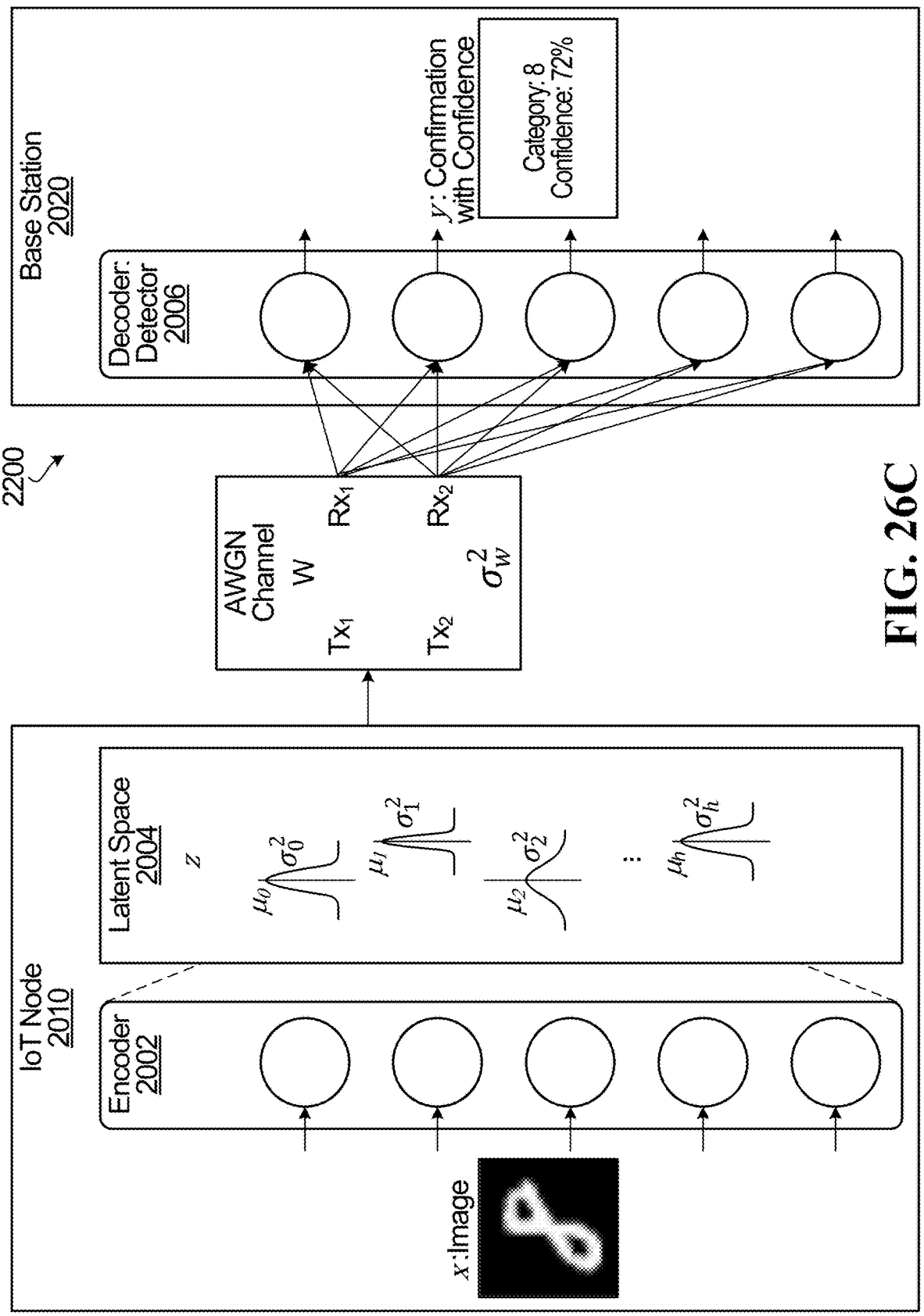

The following protocol uses three separate phases which are depicted in FIGS. 26A, 26B and 26C respectively. In this example, the participating devices are referred to as the IoT node 2010 and the base station 2020. For example, the IoT node 2010 may be capturing raw data from its environment from which essential information will eventually be extracted to transmit to the base station 2020 using low bandwidth transmissions. We can also assume that the base station 2020 may wish to receive essential information about the data captured from the IoT node 2010. Further, the base station 2020 may have much higher raw computing power, which can be utilized for AI/ML training procedures.

FIG. 26A depicts the first phase 2000, which may be referred to as the data collection phase. During this phase, the IoT node 2010 transmits raw data it captures to the base station 2020 using a conventional high-reliability (HR) communication protocol, such as 4G LTE or 5G NR, over the noisy channel W using an HR transmitter 2060 at the IoT node 2010 and a corresponding HR receiver 2070 at the base station 2020. The source/channel code design exists in the form of NN training, but it may not be practical to implement such NN training in an efficient manner directly on an IoT device such as the IoT node 2010 due to power and/or computational limitations of the IoT device. As such, as shown in the illustrated example, the IoT node 2010 transmits the raw data to the base station 2020 for use in NN training at the base station 2020 or elsewhere in the network. Using conventional HR communication schemes in the first phase 2000 facilitates two goals: Firstly, HR ensures that the raw data is effectively sent to the base station 2020 error-free. Second, HR communication schemes allow for measurements of the channel conditions to obtain a channel quality index (CQI). After a number of data samples have been transmitted to the base station 2020, the protocol can transition into the second phase 2100, which is depicted in FIG. 26B.

The second phase 2100 may be referred to as the source/channel code training phase. During this phase, the architecture and weights of an EVAE 2080 are optimized in the base station 2020 using a common NN training algorithm such as stochastic gradient descent. The architecture of the EVAE 2080 may be selected according to the needs of the source, channel, and task conditions as described herein. In this example, the EVAE 2080 includes an encoder 2002, a Gaussian-distributed latent space 2004 compatible with an AWGN channel W and a decoder 2006 that is to be trained to transform received features into category predictions. The EVAE 2080 may be trained according to the channel conditions. For example, the parameters of the latent space distribution for the latent space 2004 may be chosen based on a channel quality indicator (CQI) value or some other metric indicative of a level of disruption in the channel. For example, as indicated at 2040 in FIG. 26B, the latent space 2004 of the EVAE 2080 is constrained according to CQI. During this time, there may be no significant communication between the IoT node 2010 and the base station 2080. NN training may continue until a minimum desired accuracy is attained. In some cases, if the training procedure will not converge within a specified amount of time, training may be paused. In that case, the protocol may return to the first phase 2000 in order to collect more data to use as a basis for training. Upon additional data capture, the second phase 2100 may then resume. This iterative cycle may be repeated until the training procedure is able to converge to a desired performance level. Once the training is completed, the base station 2020 transmits all EVAE architecture and weight data to the IoT node 2010 in order to allow the IoT Node 2010 to implement the trained encoder 2002 and latent space 2004 of the EVAE 2080. As shown in FIG. 22B, in some embodiments the EVAE architecture and weight data may be transmitted to the IoT node 2010 using HR communication over the noisy channel W using an HR transmitter 2072 at the base station 2020 and a corresponding HR receiver 2062 at the IoT node 2010. The protocol then proceeds to the third phase 2200, which is depicted in FIG. 26C.

The third phase 2200 implements the communication procedures found in the embodiments described earlier. Specifically, this is the phase where low bandwidth communication is obtained. The IoT node 2010 will capture a new sample of raw data. The IoT node 2010 will then encode the raw data into the latent space 1904 that is compatible with the AWGN wireless channel W using the appropriate EVAE architecture design and the weights received from the base station 2020 in the second phase 2100. The means μ of the latent space 2004 are transmitted across W by the IoT node 2010. The base station 2020 then receives the distorted latent space features and decodes it using the corresponding EVAE decoder 2006 to compute an output according to the specified communication task, which in this example involves transforming the received features into category predictions. Thus, the protocol including phases 2000, 2100 and 2200 establishes low-bandwidth communication between an IoT node 2010 and a base station 2020 according to a specific source, channel, and task.

This embodiment contains within it aspects of several of the earlier embodiments, and as such retains the benefits of those embodiments. This protocol does take on some additional overhead in the form of the first phase 2000 and the second phase 2100. For example, the first phase 2000 may involve a large amount of raw data to be transmitted using a conventional high reliability scheme, and the second phase 2100 may require a large amount of computation power in order to train the joint source/channel coding scheme. However, phase 3 is potentially able to achieve reliable communication with very low bandwidth requirements by transmitting only the minimum or near-minimum required latent information given the conditions of each of the source, the channel, and the task. Because this protocol makes use of computationally expensive neural network training, it may take advantage of the function approximation capabilities of the EVAE. The source distribution is directly transformed to the channel distribution using a set of modulation symbols that are unique to the data and task. This protocol potentially offers significantly reduced bandwidth usage over a conventional and costly high reliability scheme which might require the transmitter to send raw data to the receiver.

The above description discloses a machine-learning based approach for designing a source encoder DNN and source decoder DNN, which is able to account for the conditions of the source, the channel and the task. The source encoder and source decoder are both probabilistic, meaning that they encode/decode probabilistic distributions rather than any particular sample from the raw information. The joint source/channel coding is selected based on features extracted from the source information, where the features represent probability distributions and the encoder is configured to enforce constraints on the probability distribution of the latent space from which the features are sampled. For example, the features may represent Gaussian distributions (or Bernoulli distributions). The transmitted features may be quantized mean values representing the distributions.

Both the encoder and decoder DNNs may be trained as a DNN pair, with joint optimization goals. As discussed above, one goal is to maximize the likelihood (which may be considered a kind of entirety or fidelity metric) between the raw information and the recovered information; and another goal may be to minimize the mutual information between the transmitted features and the received features. This joint optimization may aim to design the encoder and decoder DNNs to use the minimum physical channel capacity to reach the maximum likelihood, for example.

It should be noted that the probabilistic machine-learning based approach disclosed above may enable encoding/decoding and transmission of any feature-driven information, without requiring prior knowledge about the raw information. It is not necessary to know the format and organization of the raw information, for example. Rather, raw information may be used as training samples for training the encoder and decoder DNNs. However, in some embodiments, knowledge about the raw information and the task may permit further optimization of the communication protocol, e.g., by allowing for a higher compression ration by taking into account the task.

Some embodiments described herein provide a practical HARQ mechanism allowing for incremental redundancy by incrementally transmitting needed latent information until a success condition is met.

Embodiments of the present disclosure are not specific or limited to any particular protocol or communication application. Aspects of the present disclosure may be applied to any communication scenario where information about a source and task are known, and sufficient computation power is available for AI/ML training.

It should be understood that examples disclosed herein may not be limited to applications for machine-to-machine communications. Machine-to-human communications, human-to-machine communications, or human-to-human communications may benefit from the examples disclosed. In general, the feature-based approach to communications may enable compression on a feature-level (rather than the raw information level), and may enable reduction of some redundancies as discussed above. For human-to-machine or human-to-human communications, conversion of the human input to machine-understandable input (e.g., voice-to-text conversion or machine reading of input text) may facilitate extraction of features from the human input.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. An apparatus for feature-based communications, the apparatus comprising:
a probabilistic encoder for encoding source information into a set of probability distributions over a latent space, each probability distribution representing one or more aspects of a subject of the source information;
a transmitter for transmitting over a transmission channel, to a receiving electronic device (ED), a set of transmission features representing the subject, each transmission feature providing information about a respective one of the probability distributions in the latent space, the probabilistic encoder being configured to enforce constraints on distribution parameters of the probability distributions over the latent space based on a condition of the transmission channel,
wherein the latent space is a Gaussian distributed latent space and the probabilistic encoder is configured to enforce bounds on the means and variances of the probability distributions over the latent space, and
wherein the probabilistic encoder is configured to enforce a minimum variance of the probability distributions over the latent space based on a variance value of a Gaussian distributed model of the transmission channel.

2. The apparatus of claim 1, wherein the probabilistic encoder is implemented using an encoder deep neural network (DNN), and the probabilistic encoder uses non-linear activation functions to enforce the constraints on the distribution parameters of the probability distributions over the latent space.

3. The apparatus of claim 2, wherein the non-linear activation functions enforce the following constraints on a mean value, $\mu$, and a variance value, $\sigma^2$, of each probability distribution in the latent space:

$$\mu \in [\mu_{min}, \mu_{max}],$$
$$\sigma^2 \in [\sigma_W^2, \infty],$$

wherein $\mu_{min}$ and $\mu_{max}$ are lower and upper bounds, respectively, on the mean value and $\sigma_W^2$ is the variance value of the Gaussian distributed model of the transmission channel.

4. The apparatus of claim 3, wherein the encoder DNN is trained using a prior distribution and a Kullback-Leibler (KL) divergence loss term that are functions of the variance value, $\sigma_W^2$, of the Gaussian distributed model of the transmission channel between the apparatus and the receiving ED.

5. The apparatus of claim 1, wherein:
the probabilistic encoder is a first probabilistic encoder for encoding source information into a set of probability distributions over a first latent space to support a first task;
the apparatus further comprises a second probabilistic encoder for encoding source information into a set of probability distributions over a second latent space to support a second task, the second task being different from the first task, and dimensionality of the second latent space being different from dimensionality of the first latent space.

6. The apparatus of claim 1, wherein the transmitter is configured to:
transmit a first set of transmission features to the receiving ED, each transmission feature in the first set of transmission features providing information about a respective one of the probability distributions in a first subset of less than all of the probability distributions in the latent space; and subsequent to transmitting the first set of transmission features, transmit a second set of transmission features to the receiving ED, each transmission feature in the second set of transmission features providing information about a respective one of the probability distributions in a second subset of the probability distributions in the latent space, the second subset being different than the first subset.

7. The apparatus of claim 6, wherein the second subset is non-overlapping with the first subset.

8. The apparatus of claim 6, wherein the transmitter is configured to successively transmit different sets of transmission features providing information about different subsets of the probability distributions in the latent space until either a confirmation message is received from the receiving ED or a predetermined number of transmissions have been made.

9. The apparatus of claim 1, wherein the transmitter is configured to transmit the transmission features providing information about respective ones of the probability distributions in the latent space without applying channel coding to the transmission features.

10. The apparatus of claim 1, wherein the probabilistic encoder is configured to enforce constraints on distribution parameters of the probability distributions over the latent space such that the transmission features each have an entropy that matches or exceeds an entropy of the transmission channel.

11. A method for feature-based communications, the method comprising:

encoding source information into a set of probability distributions over a latent space, each probability distribution representing one or more aspects of a subject of the source information;

transmitting over a transmission channel, to a receiving electronic device (ED), a set of transmission features representing the subject, each transmission feature providing information about a respective one of the probability distributions in the latent space, wherein constraints are enforced on distribution parameters of the probability distributions over the latent space based on a condition of the transmission channel, wherein the latent space is a Gaussian distributed latent space and bounds are enforced on the means and variances of the probability distributions over the latent space, and wherein a minimum variance of the probability distributions over the latent space is enforced based on a variance value of a Gaussian distributed model of the transmission channel.

12. The method of claim 11, wherein the encoding is implemented using an encoder deep neural network (DNN), and non-linear activation functions are used to enforce the constraints on the distribution parameters of the probability distributions over the latent space.

13. The method of claim 12, wherein the non-linear activation functions enforce the following constraints on a mean value, $\mu$, and a variance value, $\sigma^2$, of each probability distribution in the latent space:

$$\mu \in [\mu_{min}, \mu_{max}],$$

$$\sigma^2 \in [\sigma_W^2, \infty],$$

wherein $\mu_{min}$ and $\mu_{max}$ are lower and upper bounds, respectively, on the mean value and $\sigma_W^2$ is the variance value of the Gaussian distributed model of the transmission channel.

14. The method of claim 13, wherein the encoder DNN is trained using a prior distribution and a Kullback-Leibler (KL) divergence loss term that are functions of the variance value, $\sigma_W^2$, of the Gaussian distributed model of the transmission channel.

15. The method of claim 11, wherein:

encoding source information into a set of probability distributions over a latent space comprises encoding source information into a set of probability distributions over a first latent space to support a first task; and the method further comprises encoding source information into a set of probability distributions over a second latent space to support a second task, the second task being different from the first task, and dimensionality of the second latent space being different from dimensionality of the first latent space.

16. The method of claim 11, wherein:

transmitting a set of transmission features representing the subject comprises transmitting a first set of transmission features to the receiving ED, each transmission feature in the first set of transmission features providing information about a respective one of the probability distributions in a first subset of less than all of the probability distributions in the latent space; and the method further comprises, subsequent to transmitting the first set of transmission features, transmitting a second set of transmission features to the receiving ED, each transmission feature in the second set of transmission features providing information about a respective one of the probability distributions in a second subset of the probability distributions in the latent space, the second subset being different than the first subset.

17. The method of claim 16, wherein the second subset is non-overlapping with the first subset.

18. The method of claim 16, further comprising successively transmitting different sets of transmission features providing information about different subsets of the probability distributions in the latent space until either a confirmation message is received from the receiving ED or a predetermined number of transmissions have been made.

19. The method of claim 11, wherein the transmitter is configured to transmit the transmission features providing information about respective ones of the probability distributions in the latent space without applying channel coding to the transmission features.

20. An apparatus for feature-based communications, the apparatus comprising:

a probabilistic encoder for encoding source information into a set of probability distributions over a latent space, each probability distribution representing one or more aspects of a subject of the source information;

a transmitter for transmitting over a transmission channel, to a receiving electronic device (ED), a set of transmission features representing the subject, each transmission feature providing information about a respective one of the probability distributions in the latent space, the probabilistic encoder being configured to enforce constraints on distribution parameters of the probability distributions over the latent space based on a condition of the transmission channel, wherein the transmitter is configured to transmit the transmission features providing information about respective ones of the probability distributions in the latent space without applying channel coding to the transmission features.

21. The apparatus of claim 20, wherein the latent space is a Bernoulli distributed latent space and the probabilistic encoder is configured to enforce a maximum bit flip probability of the probability distributions over the latent space based on a bit flip probability of a Bernoulli distributed model of the transmission channel.

22. The apparatus of claim 20, wherein the probabilistic encoder is implemented using an encoder deep neural network (DNN), and the probabilistic encoder uses non-linear activation functions to enforce the constraints on the distribution parameters of the probability distributions over the latent space.

23. The apparatus of claim 20, wherein:

the probabilistic encoder is a first probabilistic encoder for encoding source information into a set of probability distributions over a first latent space to support a first task;

the apparatus further comprises a second probabilistic encoder for encoding source information into a set of probability distributions over a second latent space to support a second task, the second task being different from the first task, and dimensionality of the second latent space being different from dimensionality of the first latent space.

24. The apparatus of claim 20, wherein the transmitter is configured to:

transmit a first set of transmission features to the receiving ED, each transmission feature in the first set of transmission features providing information about a respective one of the probability distributions in a first subset of less than all of the probability distributions in the latent space; and subsequent to transmitting the first set of transmission features, transmit a second set of transmission features to the receiving ED, each transmission feature in the second set of transmission features providing information about a respective one of the probability distributions in a second subset of the probability distributions in the latent space, the second subset being different than the first subset.

25. The apparatus of claim 24, wherein the second subset is non-overlapping with the first subset.

\* \* \* \* \*